(12) United States Patent
Jean et al.

(10) Patent No.: US 10,266,215 B2
(45) Date of Patent: Apr. 23, 2019

(54) TRACK SYSTEM FOR TRACTION OF AN OFF-ROAD VEHICLE

(71) Applicant: CAMSO INC., Magog (CA)

(72) Inventors: Bernard Jean, Saint-Mathieu-du-Parc (CA); Jeremie Zuchoski, Sherbrooke (CA); Tommy Leduc, Sherbrooke (CA)

(73) Assignee: Camso Inc., Magog, QC (CA)

( * ) Notice: Subject to any disclaimer, the term of this patent is extended or adjusted under 35 U.S.C. 154(b) by 0 days.

(21) Appl. No.: 14/987,441

(22) Filed: Jan. 4, 2016

(65) Prior Publication Data

US 2016/0194038 A1    Jul. 7, 2016

Related U.S. Application Data

(60) Provisional application No. 62/099,242, filed on Jan. 2, 2015.

(51) Int. Cl.
| | | |
|---|---|---|
| *B62D 55/08* | (2006.01) | |
| *B62D 55/084* | (2006.01) | |
| *B62D 55/14* | (2006.01) | |
| *B62D 55/065* | (2006.01) | |
| *B62D 55/24* | (2006.01) | |
| *B62D 55/30* | (2006.01) | |

(52) U.S. Cl.
CPC ......... *B62D 55/084* (2013.01); *B62D 55/065* (2013.01); *B62D 55/14* (2013.01); *B62D 55/244* (2013.01); *B62D 55/305* (2013.01)

(58) Field of Classification Search
CPC .... B62D 55/084; B62D 55/065; B62D 55/14; B62D 55/305; B62D 55/104; B62D 55/116
See application file for complete search history.

(56) References Cited

U.S. PATENT DOCUMENTS

| | | | | |
|---|---|---|---|---|
| 3,869,805 A | * | 3/1975 | Dieringer | G01C 9/18 33/338 |
| 4,420,272 A | * | 12/1983 | Ingalls | B62D 17/00 280/86.756 |
| 4,650,208 A | * | 3/1987 | Mason | B62D 17/00 280/86.757 |
| 4,681,177 A | * | 7/1987 | Zborowski | B62D 55/084 180/9.52 |
| 4,831,744 A | * | 5/1989 | Specktor | B62D 17/00 280/86.755 |
| 4,970,801 A | * | 11/1990 | Specktor | B62D 17/00 280/86.755 |
| 5,033,179 A | * | 7/1991 | Specktor | B62D 65/12 29/402.01 |

(Continued)

*Primary Examiner* — Joseph M Rocca
*Assistant Examiner* — Michael R Stabley
(74) *Attorney, Agent, or Firm* — Fish & Richardson P.C.

(57) ABSTRACT

Track systems for traction of an off-road vehicle, such as an all-terrain vehicle (ATV), a snowmobile, etc. The track systems may have various features to enhance their traction and/or other aspects of their use and/or performance, such as, for example, to better adapt to a suspension of the off-road vehicle (e.g., by compensating for and/or otherwise adapting to alignment settings, namely camber, caster and/or toe), to improve ride quality (e.g., by better absorbing impacts or vibrations within the track systems), and/or to facilitate their installation and/or adjustment on the off-road vehicle.

55 Claims, 42 Drawing Sheets

(56) References Cited

U.S. PATENT DOCUMENTS

| | | | | |
|---|---|---|---|---|
| 5,607,210 | A * | 3/1997 | Brazier | B62D 55/04 305/131 |
| 6,073,304 | A * | 6/2000 | Knowlton | A47L 11/30 15/320 |
| 6,282,799 | B1 * | 9/2001 | Warkotsch | G01B 5/255 33/203 |
| 6,712,549 | B2 * | 3/2004 | Roth | B62D 55/104 404/118 |
| 7,296,862 | B2 * | 11/2007 | Albright | B62D 55/12 305/143 |
| 7,568,711 | B2 * | 8/2009 | Houser | B60G 7/008 280/86.751 |
| 8,245,800 | B2 * | 8/2012 | Hansen | B62D 55/04 180/9.21 |
| 8,297,383 | B2 | 10/2012 | Després | |
| 8,776,931 | B2 * | 7/2014 | Boivin | B62D 55/12 180/198 |
| 9,505,454 | B1 | 11/2016 | Kautsch | |
| 2007/0180719 | A1 * | 8/2007 | Donnelly | G01C 9/06 33/366.11 |
| 2010/0139994 | A1 | 6/2010 | Hansen | |
| 2012/0242142 | A1 * | 9/2012 | Kautsch | B62D 55/02 305/142 |
| 2013/0221738 | A1 | 8/2013 | Boivin | |
| 2014/0125118 | A1 * | 5/2014 | Nagorcka | B62D 55/14 305/125 |
| 2015/0125252 | A1 * | 5/2015 | Berzen Ratzel | B62D 12/02 414/800 |
| 2015/0129329 | A1 * | 5/2015 | Cox | B62D 55/10 180/9.62 |
| 2015/0321708 | A1 * | 11/2015 | Van Mill | B62D 55/305 280/28.5 |
| 2017/0274946 | A1 | 9/2017 | Vik et al. | |

* cited by examiner

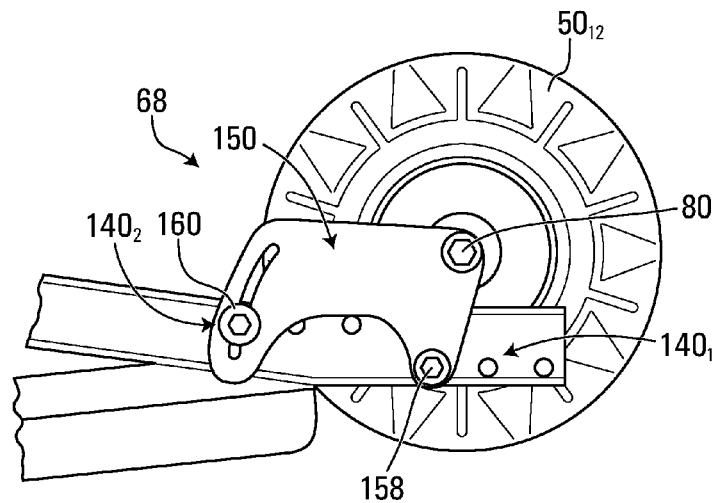
FIG. 37
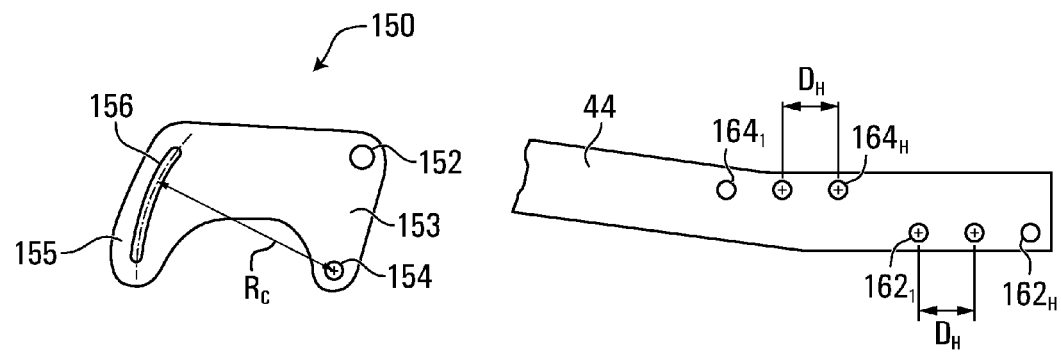
FIG. 38  FIG. 39

TRACK SYSTEM FOR TRACTION OF AN OFF-ROAD VEHICLE

CROSS-REFERENCE TO RELATED APPLICATION

This application claims the benefit under 35 USC 119(e) of U.S. Provisional Patent Application No. 62/099,242 filed on Jan. 2, 2015 which is hereby incorporated by reference herein.

FIELD OF THE INVENTION

The invention relates generally to off-road vehicles such as all-terrain vehicles (ATVs) and snowmobiles and, more particularly, to track systems for providing traction to ATVs, snowmobiles and other off-road vehicles.

BACKGROUND

Certain off-road vehicles, such as snowmobiles and all-terrain vehicles (ATVs), may be equipped with track systems which enhance their traction and floatation on soft, slippery and/or irregular grounds (e.g., soil, mud, sand, ice, snow, etc.) on which they operate.

For instance, an ATV may be equipped with track systems in place of ground-engaging wheels with tires for which it may have been originally designed. Traction, floatation and other performance aspects of the ATV depends on various factors, including the track systems.

For example, amongst other things, the traction that the ATV's track system has on the ground depends on a contact interface between the ground and a track of the track system. In some cases, the contact between the ground and the track may be reduced because of the ATV's suspension which may have been designed or set for the ground-engaging wheels with tires, instead of the track systems. For instance, the ATV's suspension may have one or more alignment settings (e.g., a camber angle, a caster angle, etc.) that can negatively affect the traction of the track system on the ground.

Tensioning of the track also plays an important role in performance of the ATV's track system. Although many track systems implement a tensioner to adjust the tension of the track, the tensioner typically provides only a limited adjustment capability that fails to properly take into account various configurations that the track system can have, such as drive wheels (e.g., sprockets) of different sizes depending on the ATV.

Shock absorption is a performance aspect which affects a ride quality of the ATV. Typically, the suspension of the ATV allows a certain degree of shock absorption. However, existing track systems may offer little to no shock absorption for certain impacts and can consequently affect the ride quality of the ATV.

Furthermore, proper installation of the track system on the ATV is essential in ensuring optimal track system performance. For example, when installing the track system on the ATV, certain alignment parameters (e.g., a caster angle, etc.) of the track system should be properly set. To this end, techniques involving measuring are commonly used for properly setting the alignment parameters of the track system. However, these techniques involve an extra step in the installation of the track system and can sometimes be overlooked or incorrectly applied by a person installing the track system. As a result, the track system may be subjected to abnormal wear and a reduced performance.

Similar considerations may arise in other types of tracked vehicles in certain situations.

For these and other reasons, there is a need to improve track systems for ATVs, snowmobiles, and other off-road vehicles.

SUMMARY OF THE INVENTION

According to various aspects of the invention, there are provided track systems for traction of an off-road vehicle, such as an all-terrain vehicle (ATV), a snowmobile, etc. The track systems may have various features to enhance their traction and/or other aspects of their use and/or performance, such as, for example, to better adapt to a suspension of the off-road vehicle (e.g., by compensating for and/or otherwise adapting to alignment settings, namely camber, caster and/or toe), to improve ride quality (e.g., by better absorbing impacts or vibrations within the track systems), and/or to facilitate their installation and/or adjustment on the off-road vehicle.

For example, according to an aspect of the invention, there is provided a track system for traction of an off-road vehicle. The track system comprises a track comprising a ground-engaging outer surface for engaging the ground and an inner surface opposite to the ground-engaging outer surface. The track system comprises a track-engaging assembly around which the track is disposed. The track-engaging assembly comprises a drive wheel for driving the track. The track system comprises a compensator to compensate for an alignment setting of a suspension of the off-road vehicle. For instance, the alignment setting may be a camber implemented by the suspension of the off-road vehicle.

According to another aspect of the invention, there is provided a track system for traction of an off-road vehicle. The track system comprises a track comprising a ground-engaging outer surface for engaging the ground and an inner surface opposite to the ground-engaging outer surface. The track system comprises a track-engaging assembly around which the track is disposed. The track-engaging assembly comprises a drive wheel for driving the track and a plurality of idler wheels spaced apart in a longitudinal direction of the track system. The track-engaging assembly is configured to allow movement of an axis of rotation of a given one of the idler wheels relative to the drive wheel such that, upon an impact on the given one of the idler wheels, the axis of rotation of the given one of the idler wheels is movable relative to the drive wheel from a rest position in a plurality of directions that are transversal to one another.

According to another aspect of the invention, there is provided a track system for traction of an off-road vehicle. The track system comprises a track comprising a ground-engaging outer surface for engaging the ground and an inner surface opposite to the ground-engaging outer surface. The track system comprises a track-engaging assembly around which the track is disposed. The track-engaging assembly comprises a frame, a drive wheel for driving the track, a plurality of idler wheels spaced apart in a longitudinal direction of the track system, and a link carrying given ones of the idler wheels and pivotable relative to the frame about a pivot axis. The track-engaging assembly is configured to allow movement of the pivot axis of the link relative to the drive wheel such that, upon an impact on the given one of the idler wheels, the pivot axis of the link is movable relative to the drive wheel from a rest position in a plurality of directions that are transversal to one another.

According to another aspect of the invention, there is provided a track system for traction of an off-road vehicle. The track system comprises a track comprising a ground-engaging outer surface for engaging the ground and an inner surface opposite to the ground-engaging outer surface. The track system comprises a track-engaging assembly around which the track is disposed. The track-engaging assembly comprises a drive wheel for driving the track and a tensioner for tensioning the track. The tensioner comprises a plurality of adjusters that allow different degrees of adjustment of a tension of the track.

According to another aspect of the invention, there is provided a track system for traction of an off-road vehicle. The track system comprises a track comprising a ground-engaging outer surface for engaging the ground and an inner surface opposite to the ground-engaging outer surface. The track system comprises a track-engaging assembly around which the track is disposed. The track-engaging assembly comprises a drive wheel for driving the track. The track system comprises an indicator for providing an indication of an orientation of the track system relative to a frame of the off-road vehicle.

According to another aspect of the invention, there is provided an off-road vehicle comprising a frame and a plurality of track systems for traction of the off-road vehicle. Each track system comprises a track comprising a ground-engaging outer surface for engaging the ground and an inner surface opposite to the ground-engaging outer surface. The track system comprises a track-engaging assembly around which the track is disposed. The track-engaging assembly comprises a drive wheel for driving the track. The off-road vehicle comprises an indicator for providing an indication of an orientation of the track system relative to the frame of the off-road vehicle.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 37 shows a close-up view of the track adjusters of the tensioner;

FIG. 38 shows an adjustment structure of the tensioner;

FIG. 39 shows a portion of the frame to which is mounted the adjustment structure of the tensioner;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
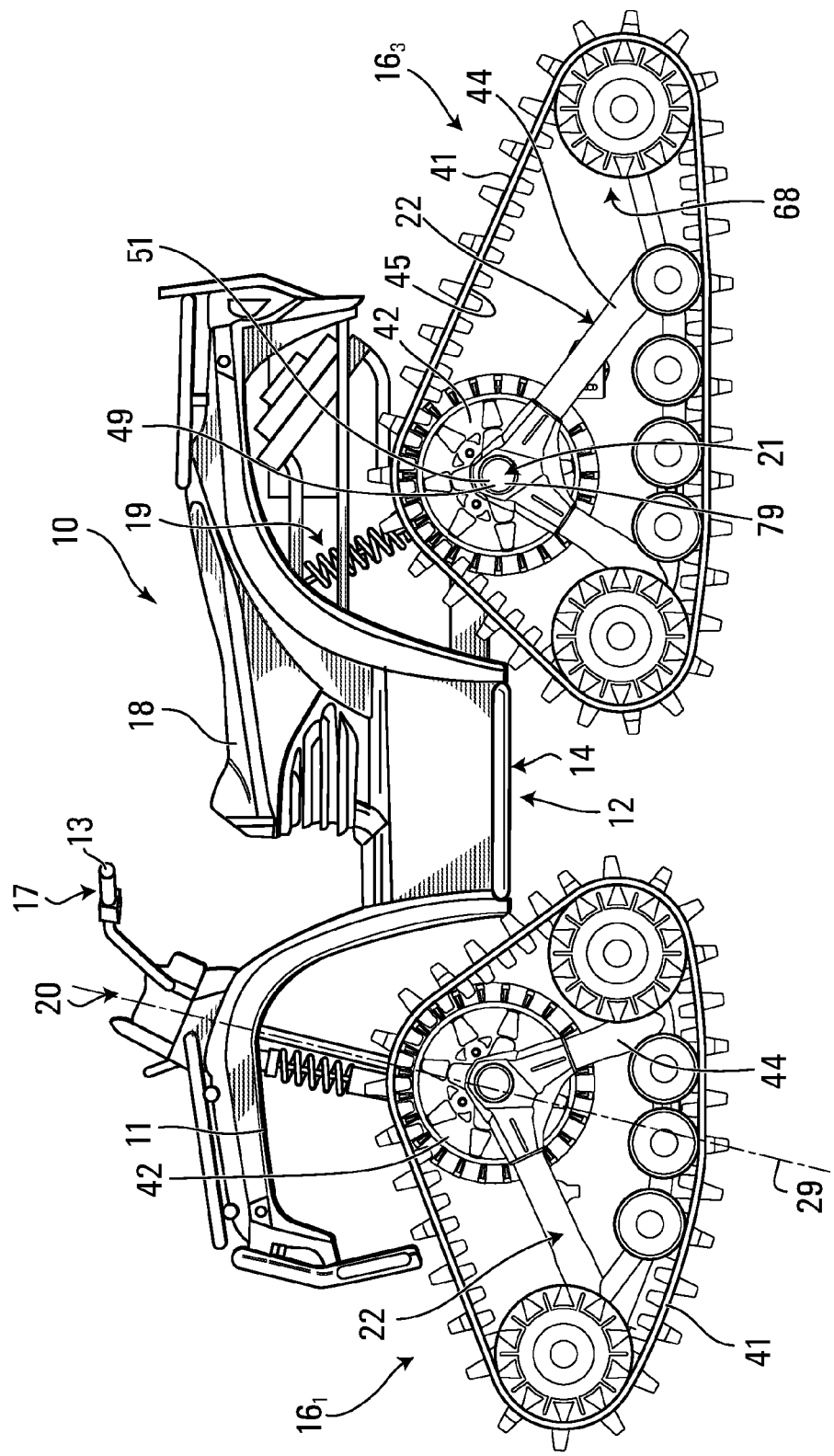
FIGS. 1A and 1B show an example of an all-terrain vehicle (ATV) comprising track systems in accordance with an embodiment of the invention.
Figure 1B:
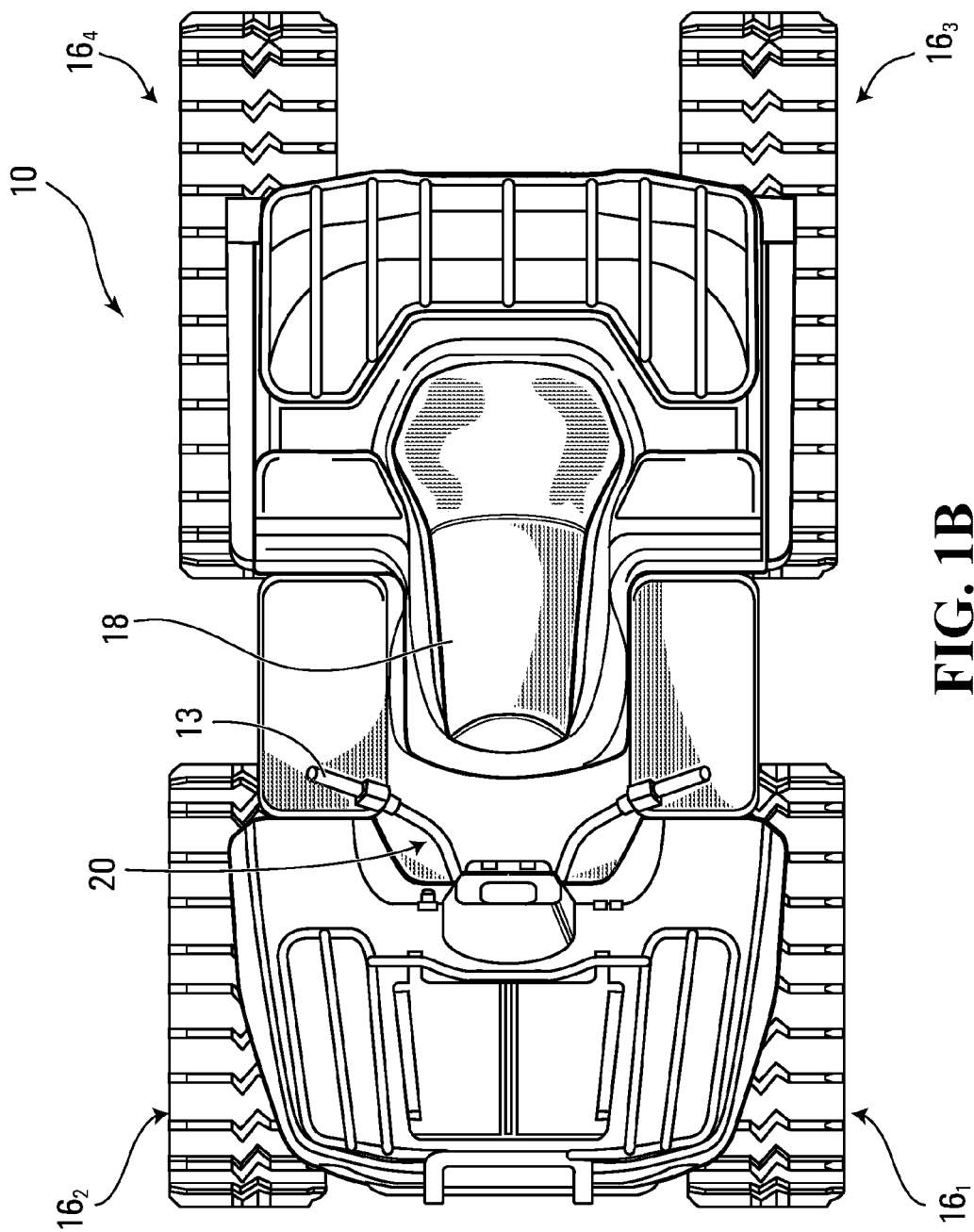

FIGS. 1A and 1B show an example of an all-terrain vehicle (ATV) 10 in accordance with an embodiment of the invention. The ATV 10 is a small open vehicle designed to travel off-road on a variety of terrains, including roadless rugged terrain, for recreational, utility and/or other purposes.

In this embodiment, the ATV 10 comprises a frame 11, a powertrain 12, a steering system 17, a suspension 19, a plurality of track systems $16_1$-$16_4$, a seat 18, and a user interface 20, which enable a user of the ATV to ride the ATV 10 on the ground. The ATV 10 has a longitudinal direction, a widthwise direction, and a height direction.

As further discussed later, in various embodiments, the track systems $16_1$-$16_4$ may have various features to enhance their traction and/or other aspects of their use and/or performance, such as, for example, to better adapt to the suspension 19 of the ATV 10 (e.g., by compensating for and/or otherwise adapting to alignment settings, namely camber, caster and/or toe), to improve ride quality (e.g., by better absorbing impacts or vibrations within the track systems $16_1$-$16_4$), and/or to facilitate their installation and/or adjustment on the ATV 10.

The powertrain 12 is configured for generating motive power and transmitting motive power to the track systems $16_1$-$16_4$ to propel the ATV 10 on the ground. To that end, the powertrain 12 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with one or more of the track systems $16_1$-$16_4$. That is, the powertrain 12 transmits motive power generated by the prime mover 14 to one or more of the track systems $16_1$-$16_2$ (e.g., via a transmission and/or a differential) in order to drive (i.e., impart motion to) these one or more of the track systems $16_1$-$16_2$.

The steering system 17 is configured to enable the user to steer the ATV 10 on the ground. To that end, the steering system 17 comprises a steering device 13 that is operable by the user to direct the ATV 10 along a desired course on the ground. In this embodiment, the steering device 13 comprises handlebars. The steering device 13 may comprise a steering wheel or any other steering component that can be operated by the user to steer the ATV 10 in other embodiments. The steering system 17 responds to the user interacting with the steering device 13 by turning some of the track systems $16_1$-$16_4$ to change their orientation relative to the frame 11 of the ATV 10 in order to cause the ATV 10 to move in a desired direction. In this example, front ones of the track systems $16_1$-$16_4$ are turnable in response to input of the user at the steering device 13 to change their orientation relative to the frame 11 of the ATV 10 in order to steer the ATV 10 on the ground. More particularly, in this example, each of the front ones of the track systems $16_1$-$16_4$ is pivotable about a steering axis 29 of the ATV 10 in response to input of the user at the steering device 10 in order to steer the ATV 10 on the ground. Rear ones of the track systems $16_1$-$16_4$ are not turned relative to the frame 11 of the ATV 10 by the steering system 17.

The suspension 19 is connected between the frame 11 and the track systems $16_1$-$16_4$ to allow relative motion between the frame 11 and the track systems $16_1$-$16_4$ as the ATV 10 travels on the ground. The suspension 19 enhances handling of the ATV 10 on the ground by absorbing shocks and helping to maintain traction between the track systems $16_1$-$16_4$ and the ground. The suspension 19 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas suspension device).

In this embodiment, the seat 18 is a straddle seat and the ATV 10 is usable by a single person such that the seat 18 accommodates only that person driving the ATV 10. In other embodiments, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "utility task vehicle" (UTV).

The user interface 20 allows the user to interact with the ATV 10. More particularly, the user interface 20 comprises an accelerator, a brake control, and the steering device 13 that are operated by the user to control motion of the ATV 10 on the ground. The user interface 20 also comprises an instrument panel (e.g., a dashboard) which provides indicators (e.g., a speedometer indicator, a tachometer indicator, etc.) to convey information to the user.

The track systems $16_1$-$16_4$ engage the ground to provide traction to the ATV 10. More particularly, in this example, the front ones of the track systems $16_1$-$16_4$ provide front traction to the ATV 10 while the rear ones of the track systems $16_1$-$16_4$ provide rear traction to the ATV 10.

Figure 2A:
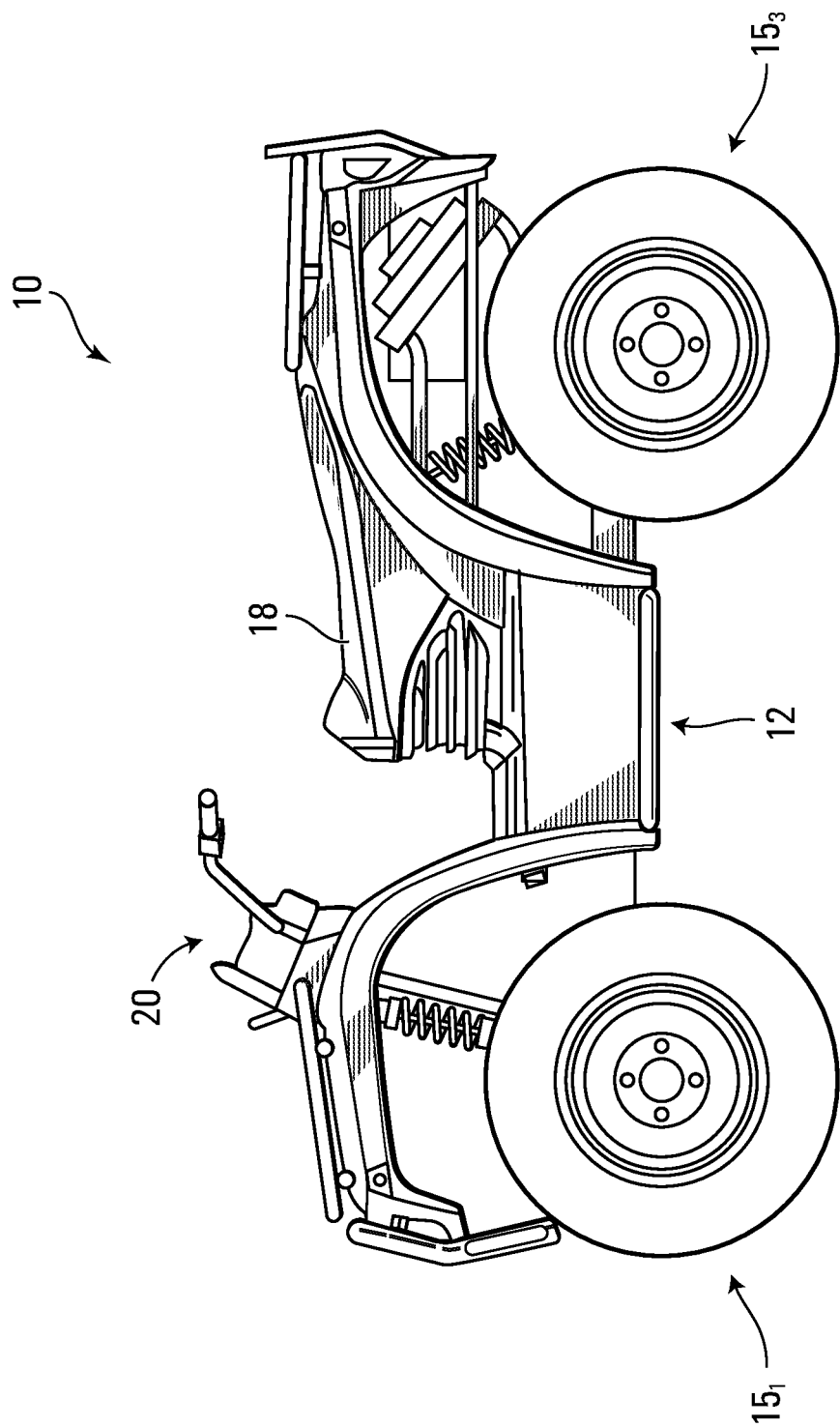
FIGS. 2A and 2B show the ATV equipped with ground-engaging wheels instead of the track systems.
Figure 2B:
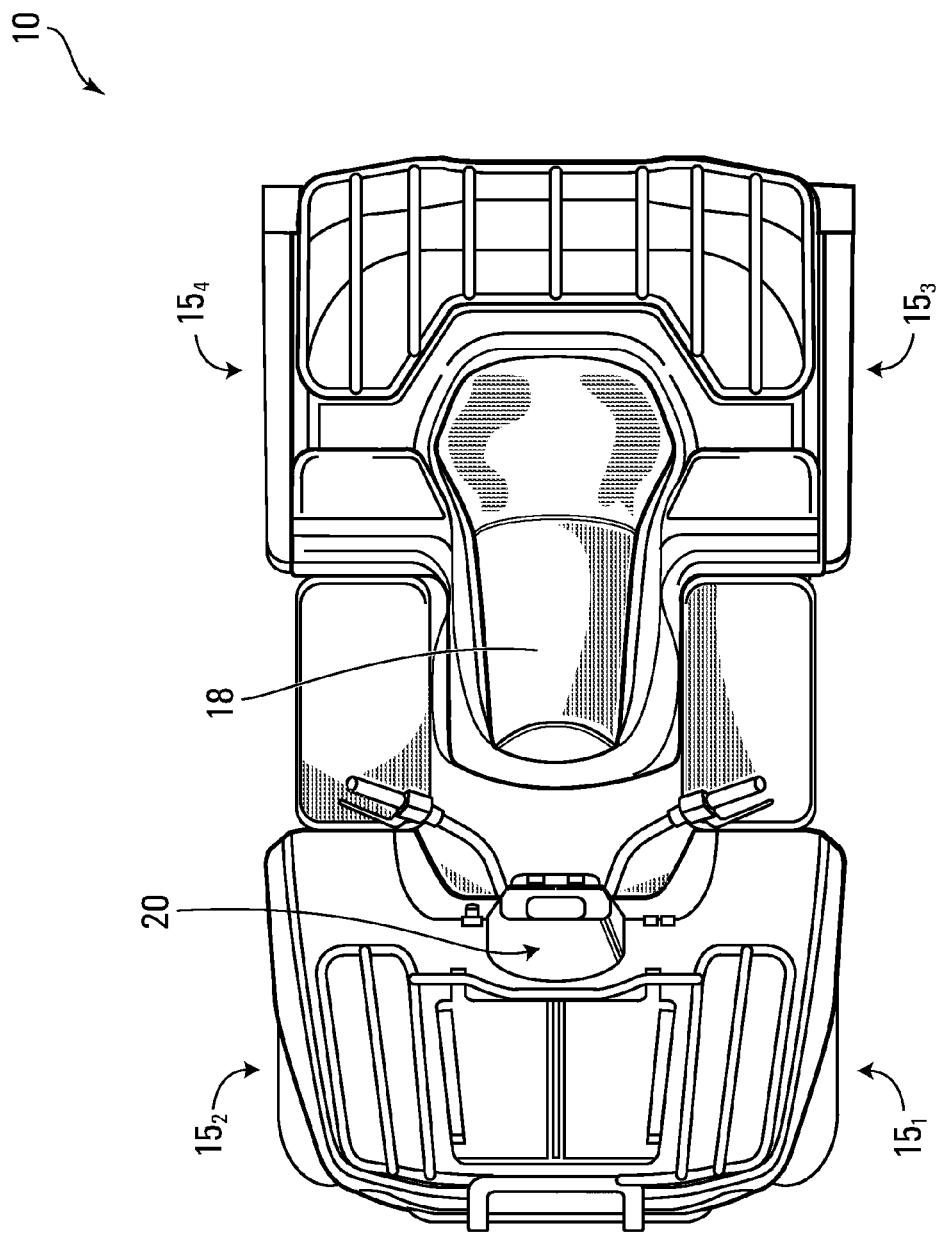
Figure 3:
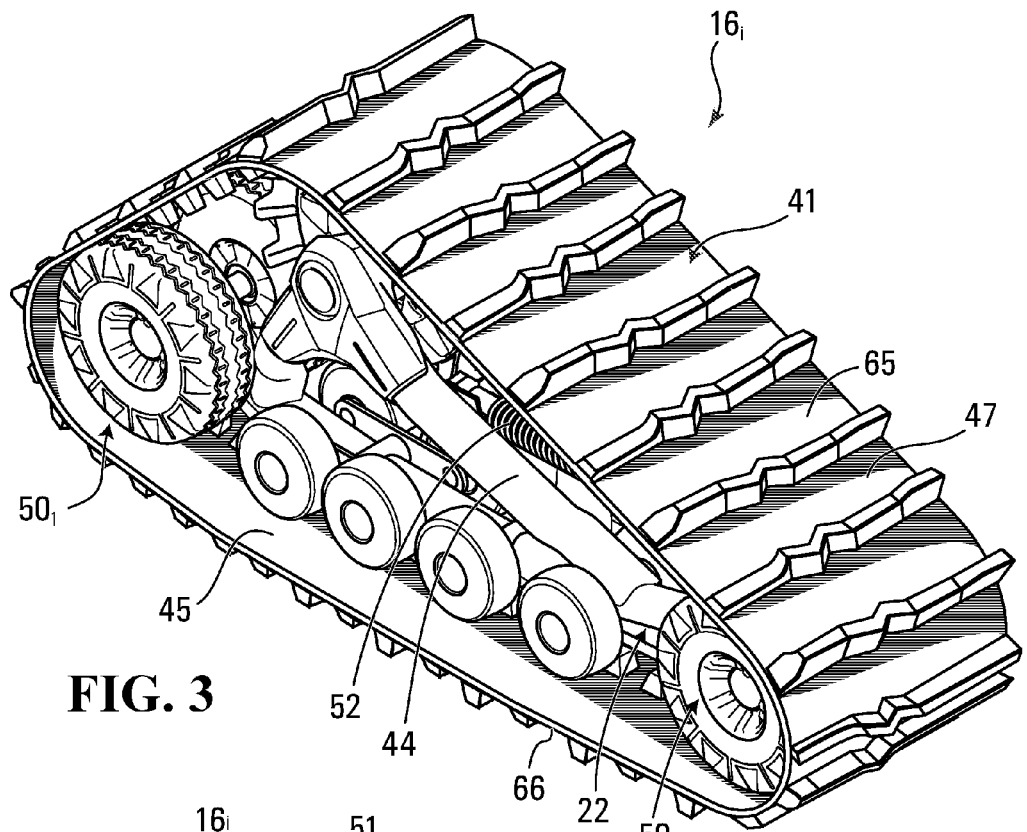
FIGS. 3 and 4 respectively show perspective and side views of a rear one of the track systems.
Figure 4:
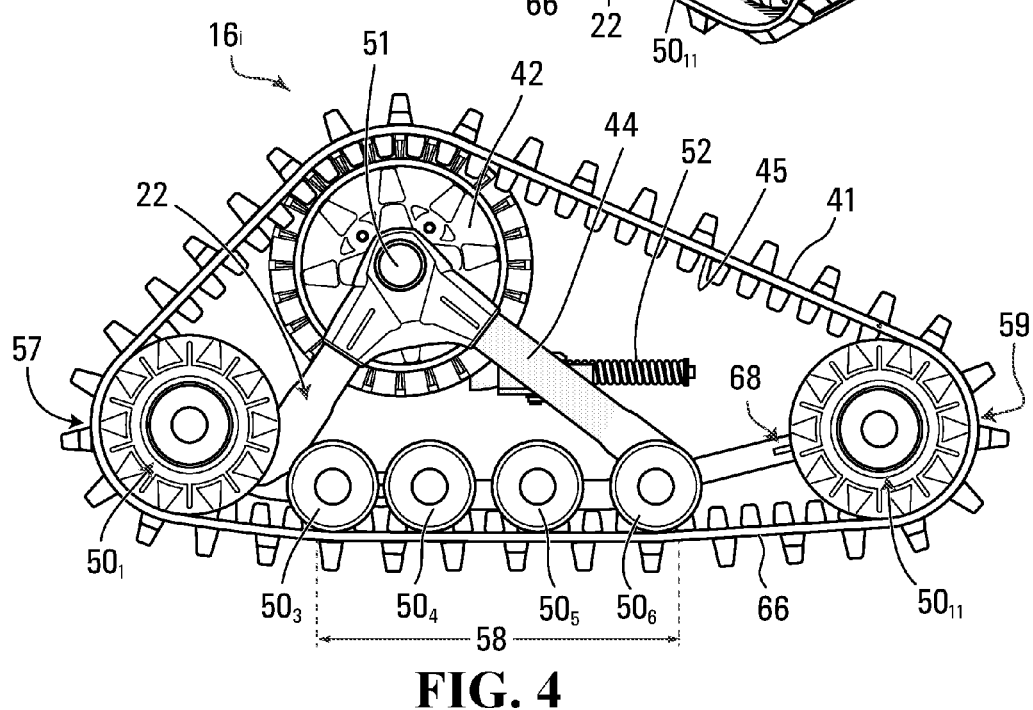
Figure 5:
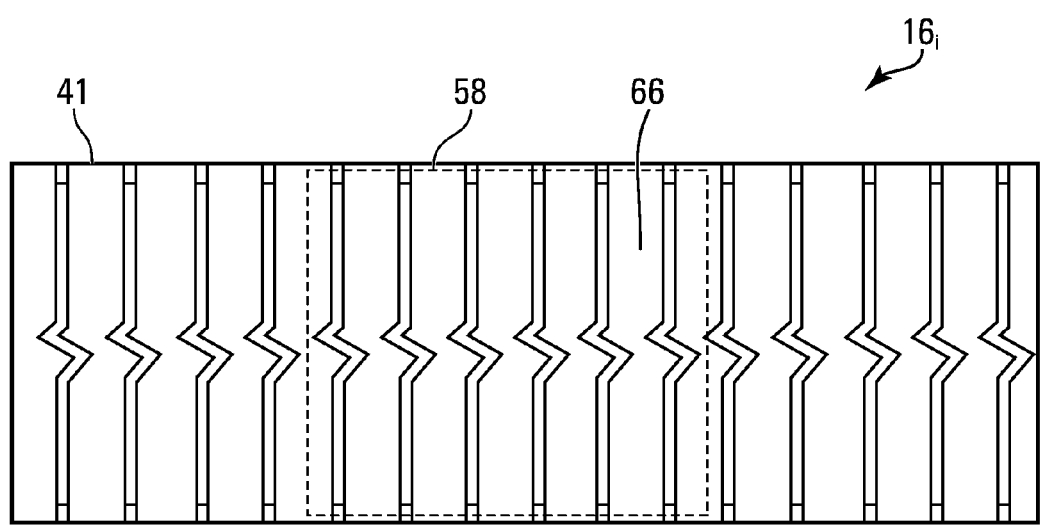
FIG. 5 shows a bottom view of the track system.
Figure 6:
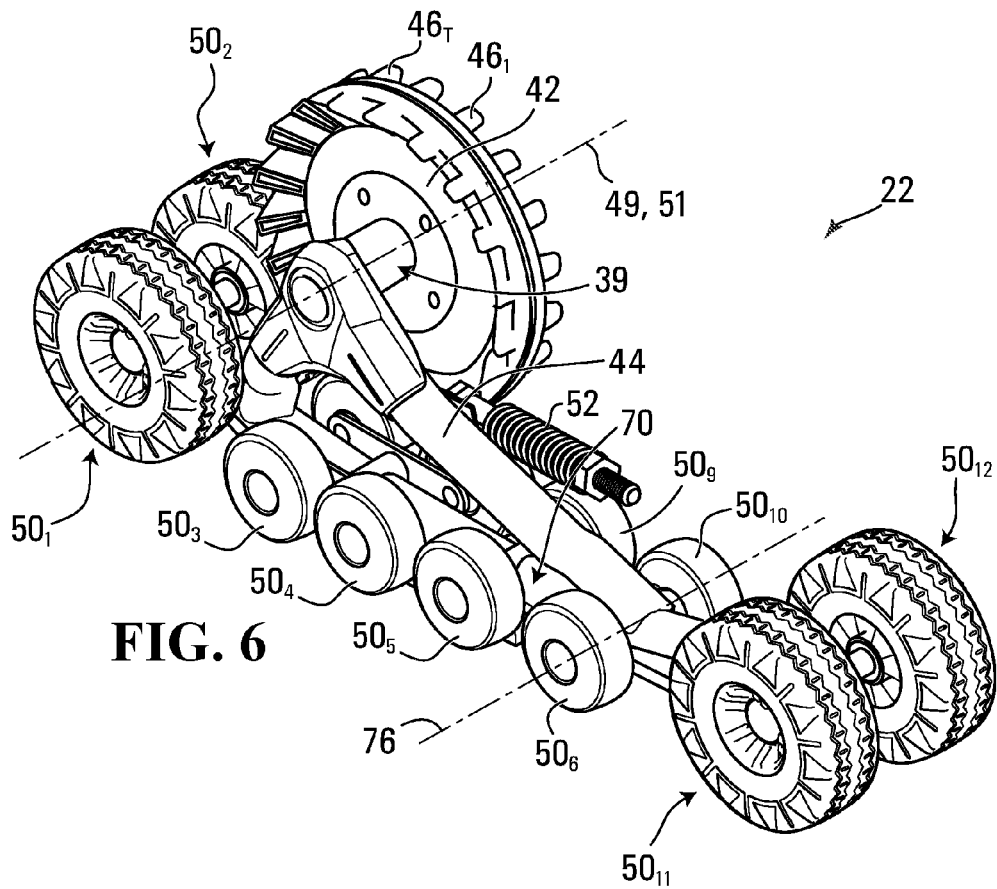
FIGS. 6 and 7 respectively show perspective and side views of the track system without its track.

In this embodiment, each track system $16_i$ is mounted in place of a ground-engaging wheel that may otherwise be mounted at a position of the track system $16_i$ to propel the ATV 10 on the ground. For example, as shown in FIGS. 2A and 2B, the ATV 10 may be propelled on the ground by four ground-engaging wheels $15_1$-$15_4$ having tires instead of by the track systems $16_1$-$16_4$. Basically, in this embodiment, the track systems $16_1$-$16_4$ may be used to convert the ATV 10 from a wheeled vehicle into a tracked vehicle, thereby enhancing its traction and floatation on the ground.

With additional reference to FIGS. 3 to 7, in this embodiment, each track system $16_i$ comprises a track-engaging assembly 22 and a track 41 disposed around the track-engaging assembly 22. In this example, the track-engaging assembly 22 comprises a frame 44 and a plurality of track-contacting wheels which includes a drive wheel 42 and a plurality of idler wheels $50_1$-$50_{12}$. The track system $16_i$ has a front longitudinal end 57 and a rear longitudinal end 59 that define a length of the track system $16_i$. A width of the track system $16_i$ is defined by a width of the track 41. An envelope of the track system $16_i$ is defined by a length of the track 41. The track system $16_i$ has a longitudinal direction, a widthwise direction, and a height direction.

The track 41 engages the ground to provide traction to the ATV 10. The length of the track 41 allows the track 41 to be mounted around the track-engaging assembly 22. In view of its closed configuration without ends that allows it to be disposed and moved around the track-engaging assembly 22, the track 41 can be referred to as an "endless" track. Referring additionally to FIGS. 8 to 12, the track 41 comprises an inner side 45 facing the wheels 42, $50_1$-$50_{12}$ and defining an inner area of the track 41 in which these wheels are located. The track 41 also comprises a ground-engaging outer side 47 opposite the inner side 45 for engaging the ground on which the ATV 10 travels. Lateral edges $63_1$, $63_2$ of the track 41 define the track's width. The track 41 has a top run 65 which extends between the longitudinal ends 57, 59 of the track system $16_i$ and over the drive wheel 42, and a bottom run 66 which extends between the longitudinal ends 57, 59 of the track system $16_i$ and under the idler wheels $50_1$-$50_{12}$. The bottom run 66 of the track 41 defines an area of contact 58 of the track 41 with the ground which generates traction and bears a majority of a load on the track system $16_i$, and which will be referred to as a "contact patch" of the track 41 with the ground. The track 41 has a longitudinal direction, a widthwise direction, and a thickness direction.

The track 41 is elastomeric in that it comprises elastomeric material allowing it to flex around the wheels 42, $50_1$-$50_{12}$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_{12}$.

Figure 11:
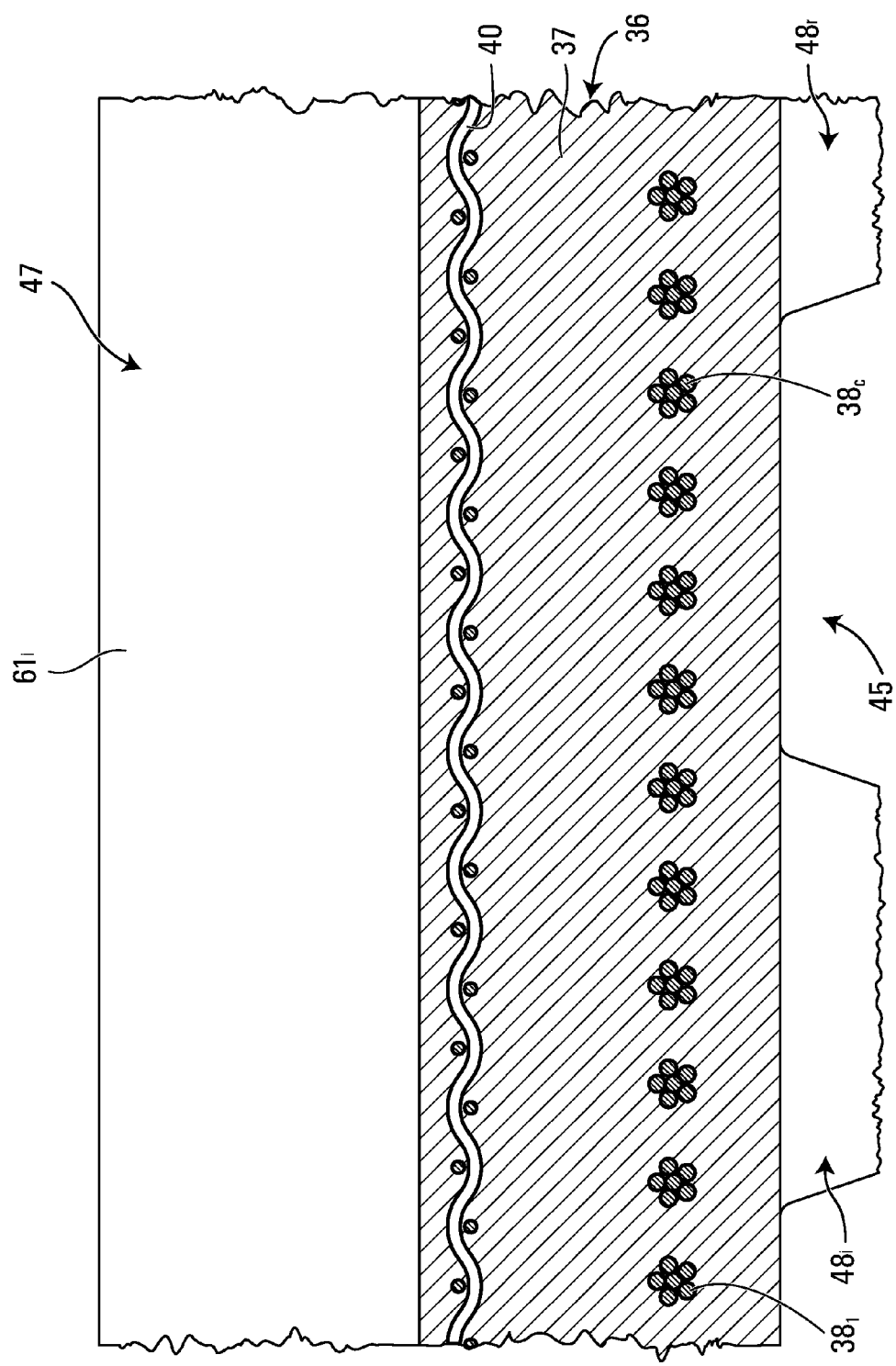
FIG. 11 shows a partial cross-sectional view of the track of the track system.

As shown in FIG. 11, in this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_{10}$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_{12}$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 67. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

Each traction projection $61_i$ extends transversally to the longitudinal direction of the track 41. That is, the traction projection $61_i$ has a longitudinal axis 54 extending transversally to the longitudinal direction of the track 41. In this example, the longitudinal axis 54 of the traction projection $61_i$ is substantially parallel to the widthwise direction of the track 41. In other examples, the longitudinal axis 54 of the traction projection $61_i$ may be transversal to the longitudinal direction of the track 41 without being parallel to the widthwise direction of the track 41.

In this embodiment, the traction projection $61_i$ extends across at least a majority of the width of the track 41. More particularly, in this example, the traction projection $61_i$ extends across substantially an entirety of the width of the track 41. The traction projection $61_x$ has longitudinal ends $60_1$, $60_2$ adjacent to respective ones of the lateral edges $63_1$, $63_2$ of the track 41. The traction projection $61_i$ may extend across any suitable part of the width of the endless track 41 in other embodiments.

Also, in this embodiment, the traction projection $61_i$ varies in cross-sectional shape along its longitudinal axis 54. That is, cross-sections of the traction projection $61_i$ at different positions along the longitudinal axis 54 of the traction projection $61_i$ are different.

The traction projections $61_1$-$61_M$ may be configured in various other ways in other embodiments.

In this example, the carcass 36 has a thickness $T_c$ which is relatively small. The thickness $T_c$ of the carcass 36 is measured from the inner surface 32 to the ground-engaging outer surface 31 of the carcass 36 between longitudinally-adjacent ones of the traction projections $61_1$-$61_M$. For example, in some embodiments, the thickness $T_c$ of the carcass 36 may be no more than 0.250 inches, in some cases no more than 0.240 inches, in some cases no more than 0.230 inches, in some cases no more than 0.220 inches, in some cases no more than 0.210 inches, in some cases no more than 0.200 inches, and in some cases even less (e.g., 0.180 or 0.170 inches). The thickness $T_c$ of the carcass 36 may have any other suitable value in other embodiments.

Figure 12:
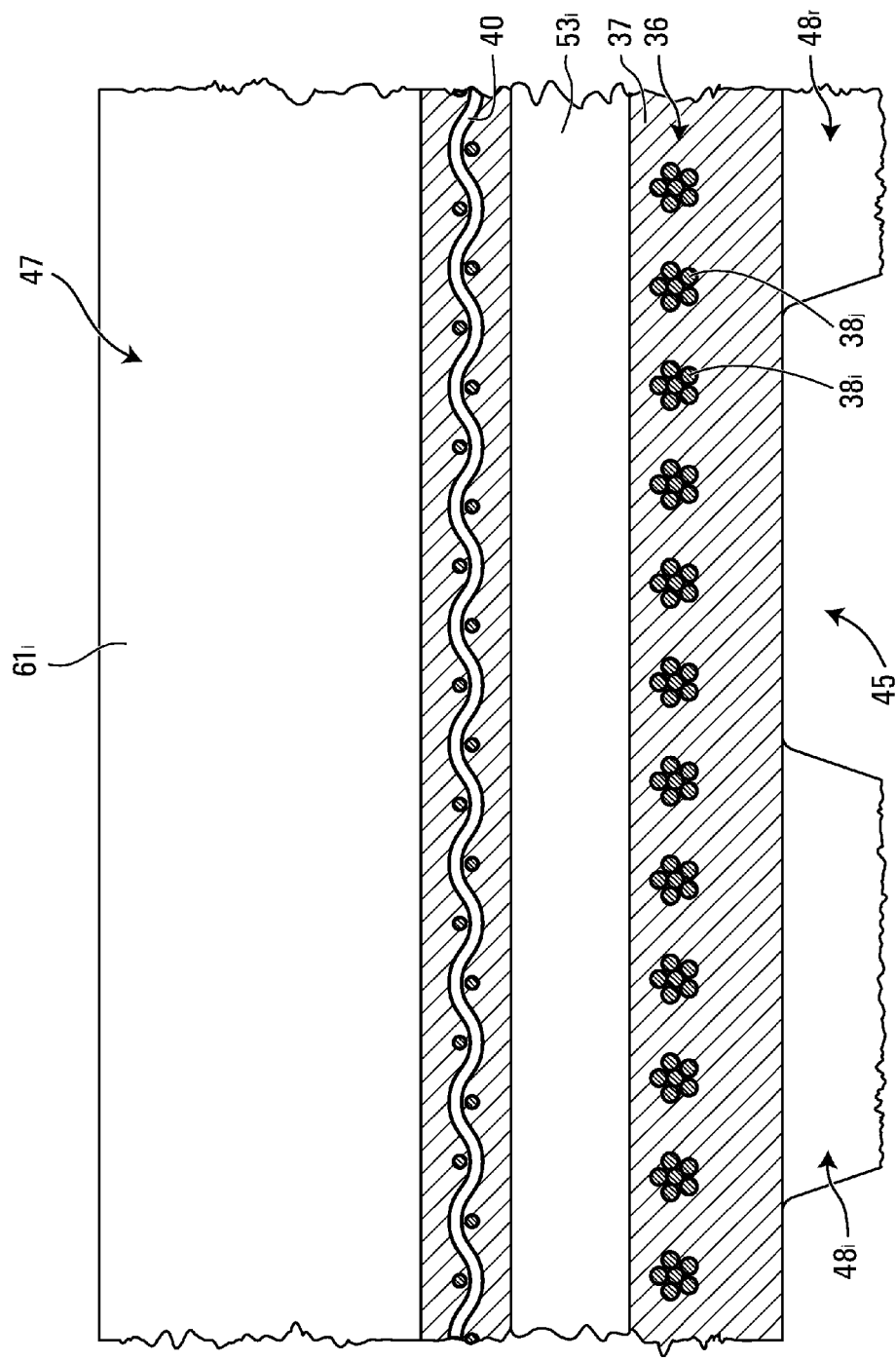
FIG. 12 shows a partial cross-sectional view of a variant of the track of the track system.

In this embodiment, as shown in FIG. 11, the track 41 is free of transversal stiffening rods embedded in its elastomeric material. That is, the track 41 does not comprise transversal stiffening rods embedded in its elastomeric material and extending transversally to its longitudinal direction. FIG. 12 shows a variant in which the track 41 may comprise transversal stiffening rods $53_1$-$53_M$ embedded in its elastomeric material and extending transversally to its longitudinal direction in other embodiments. This absence of transversal stiffening rods in some embodiments, such as shown in FIG. 11, makes the track 41 more flexible in its widthwise direction than if the track 41 had the transversal stiffening rods $53_1$-$53_M$ but was otherwise identical.

Figure 7:
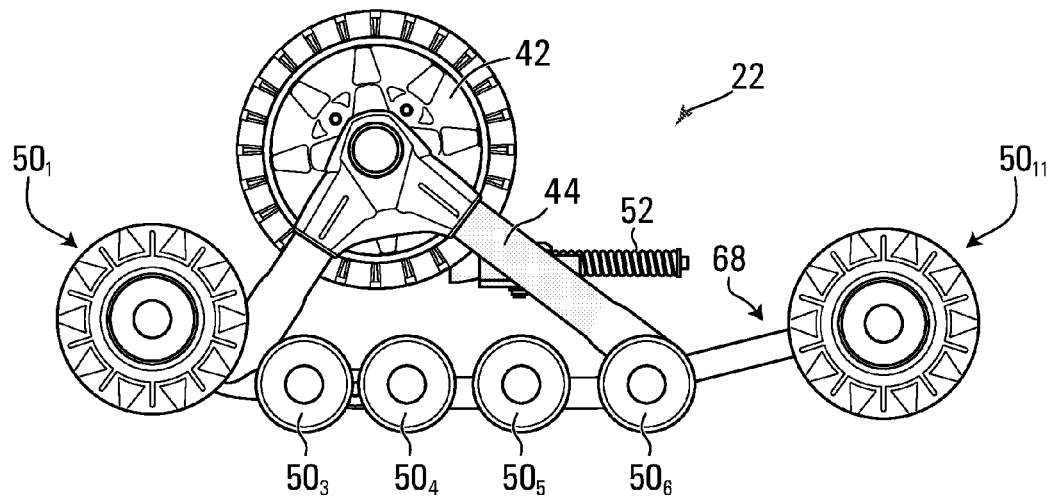
Figure 8:
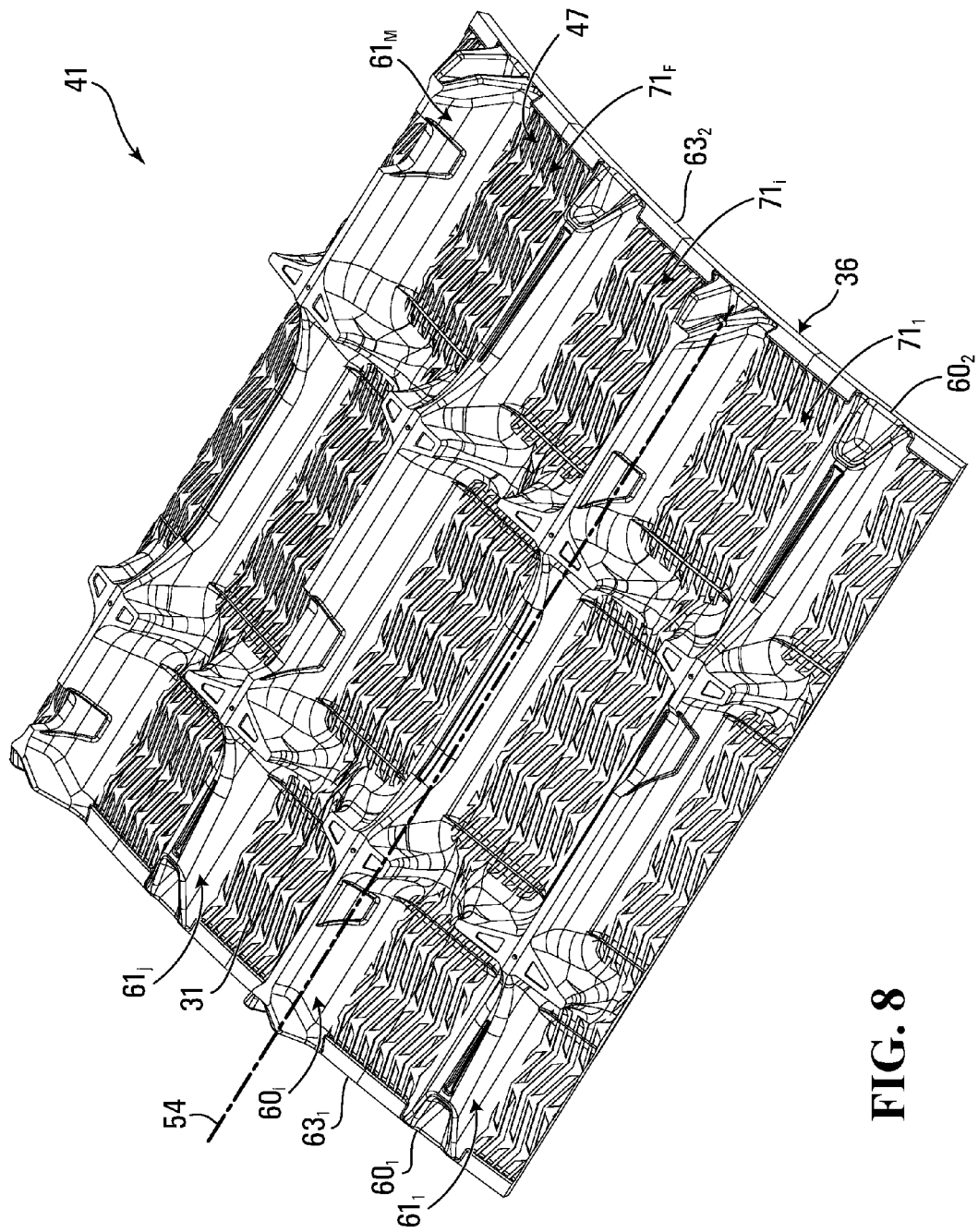
FIGS. 8 and 9 show perspective views of a segment of the track of the track system, which depict features of an inner side and a ground-engaging outer side of the track.
Figure 9:
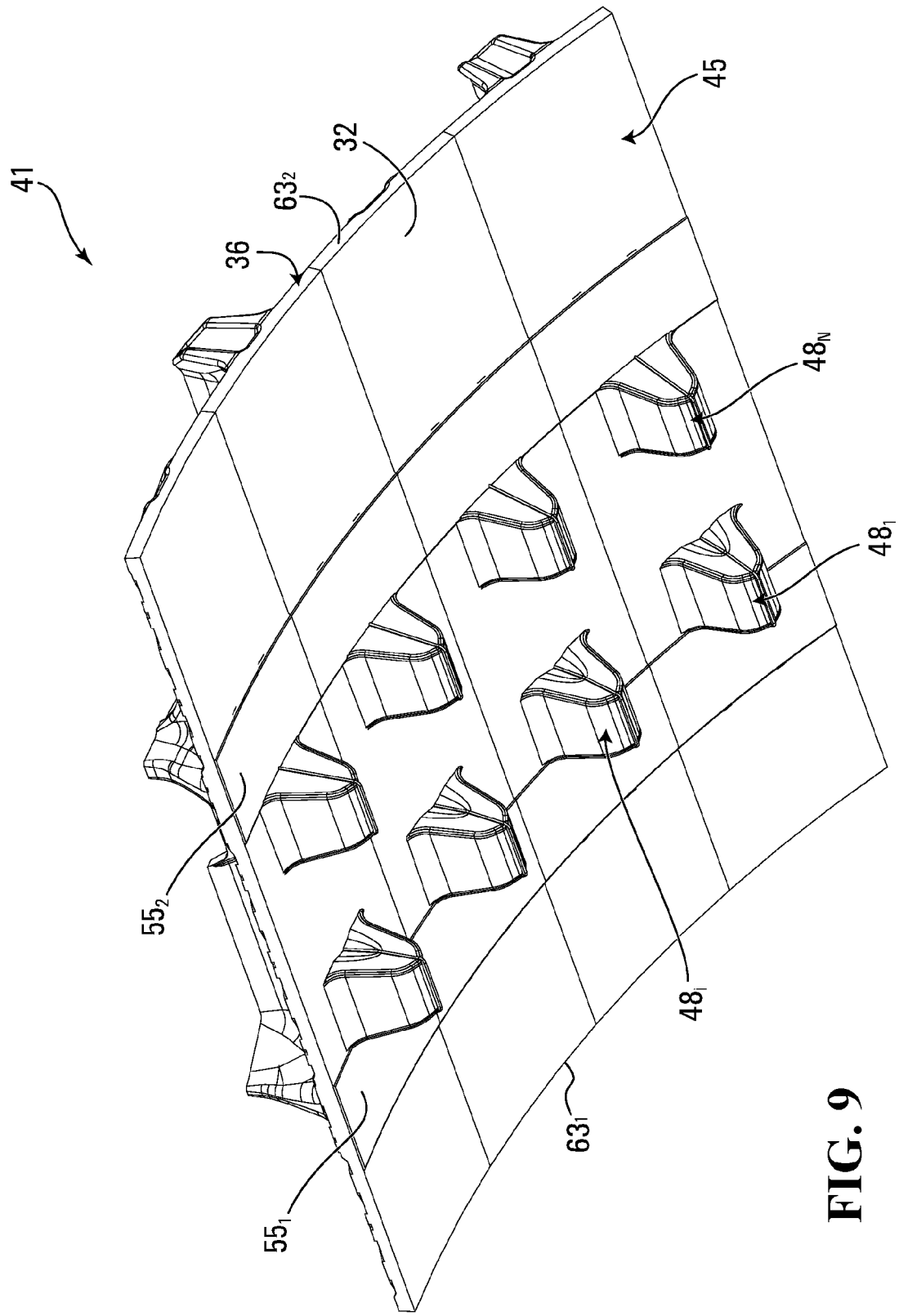
Figure 10:
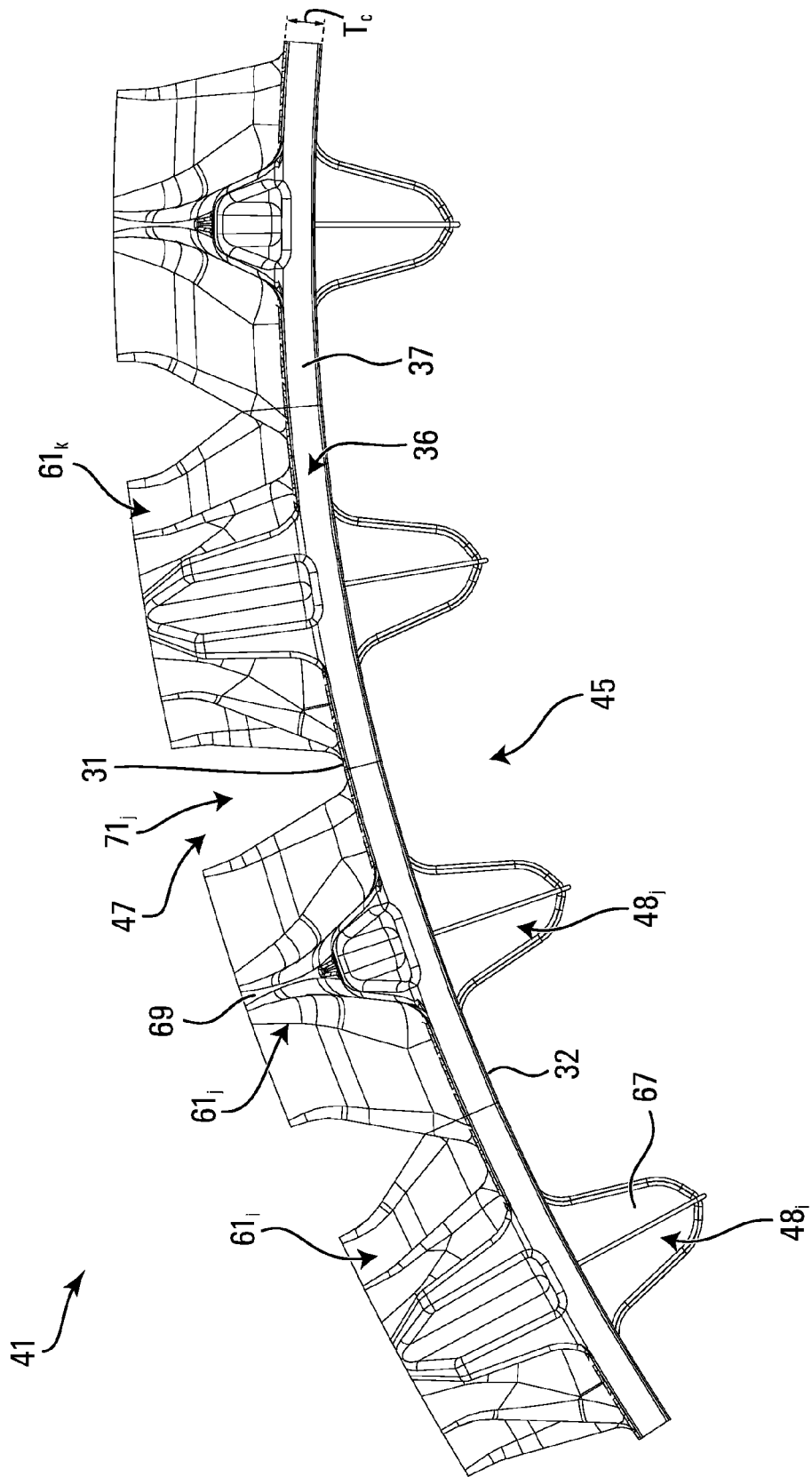
FIG. 10 shows a side view of the track of the track system.
Figure 13:
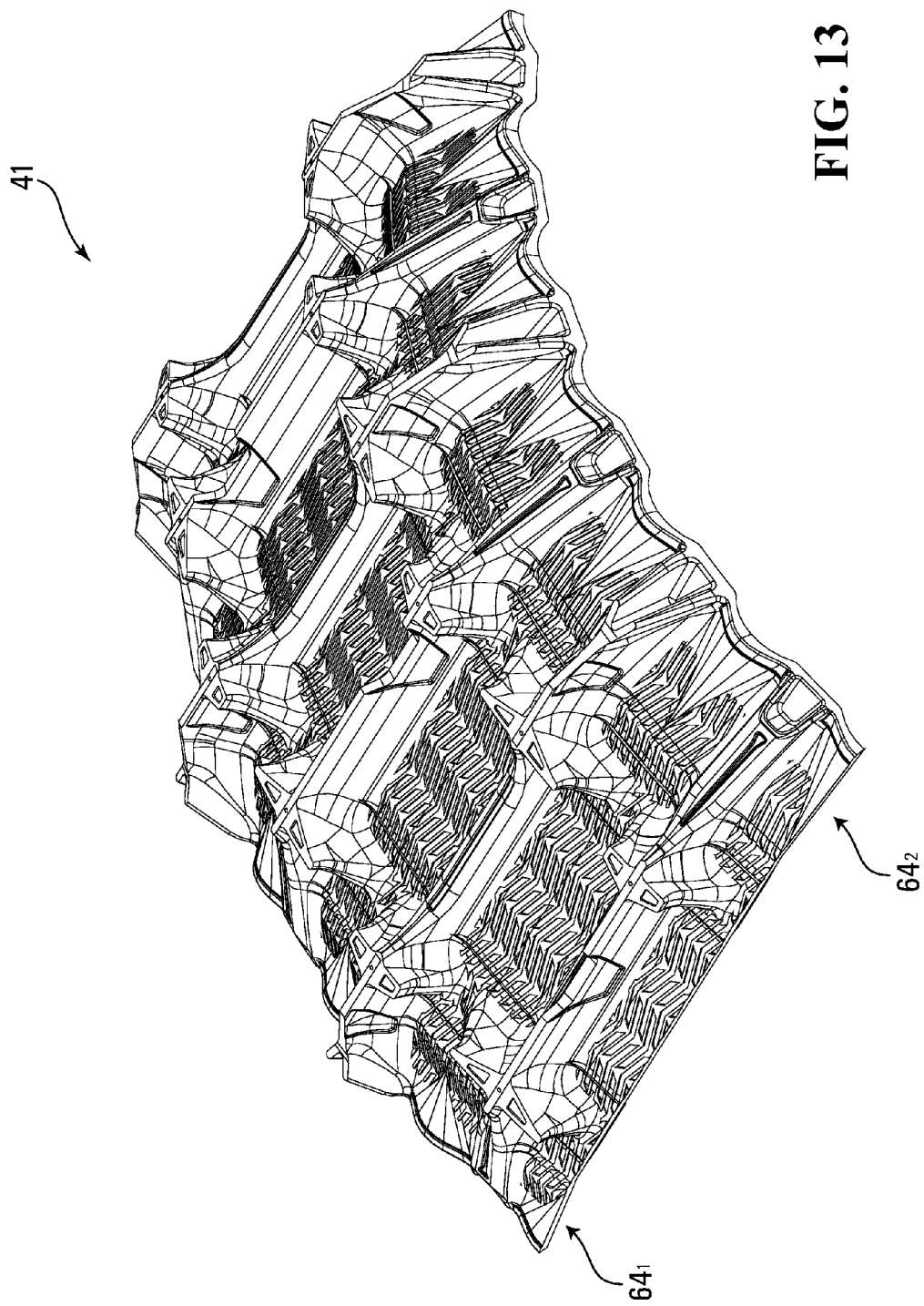
FIGS. 13 and 14 show views of a segment of the track of a front one of the track systems.
Figure 14:
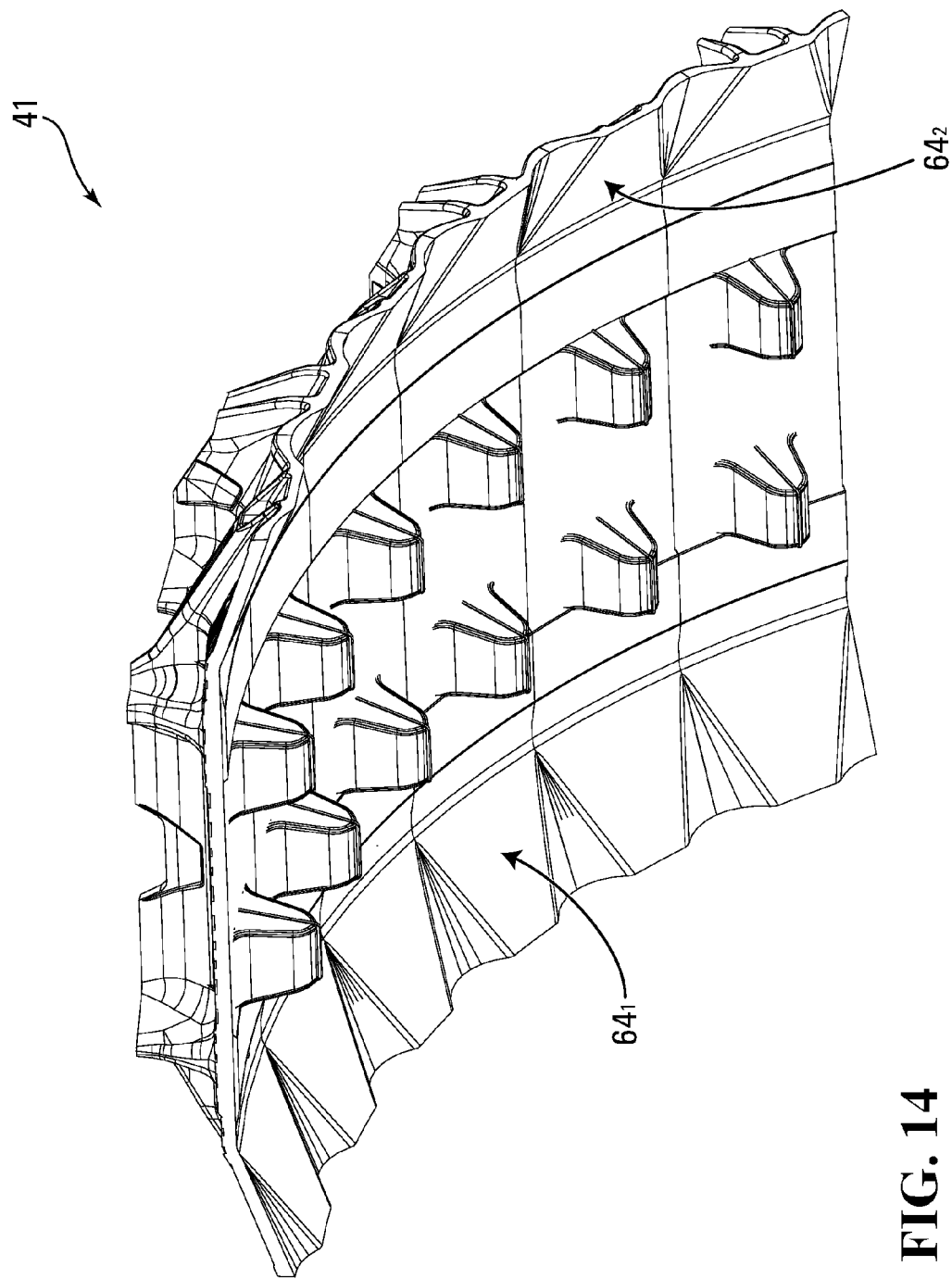

The track 41 shown in FIGS. 7 to 9 is that of a given one of the rear track assemblies $16_3$, $16_4$. FIGS. 13 and 14 show the track 41 of a given one of the front track assemblies $16_1$, $16_2$, which is similar to the track 41 of the given one of the rear track assemblies $16_3$, $16_4$, except that it comprises bent lateral edge portions $64_1$, $64_2$ adjacent its lateral edges $63_1$, $63_2$ to facilitate steering of the given one of the front track assemblies $16_1$, $16_2$ on the ground, by creating a smaller ground-contacting area. More particularly, the carcass 36 of the track 41 of the given one of the front track assemblies $16_1$, $16_2$ is bent inwardly proximate the lateral edges $63_1$, $63_2$ of the track 41 such that its inner surface 32 and ground-engaging outer surface 31 are bent inwardly.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

In this embodiment, the track system $16_i$ comprises a tensioner 68 for maintaining the track 41 in tension. In this example, the tensioner 68 is connected between the frame 44 and the idler wheels $50_1$, $50_{11}$ to urge the idler wheels $50_1$, $50_{11}$ away from one another to maintain the track 41 in tension.

The drive wheel 42 is rotatable about an axis of rotation 49 for driving the track 41 in response to rotation of an axle 21 of the ATV. In this example, the axis of rotation 49 corresponds to an axis of rotation 79 of the axle 21 of the ATV 10. More particularly, in this example, the drive wheel 42 has a hub which is mounted to the axle 21 of the ATV 10 such that power generated by the prime mover 14 and delivered over the powertrain 12 of the ATV 10 rotates the axle 21, which rotates the drive wheel 42, which imparts motion of the track 41. In this embodiment in which the track system $16_i$ is mounted where a ground-engaging wheel $15_i$ could otherwise be mounted, the axle 21 of the ATV 10 is capable of rotating the drive wheel 42 of the track system $16_i$ or the ground-engaging wheel $15_i$.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of teeth $46_1$-$46_T$ distributed circumferentially along its rim to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_{12}$ are not driven by power supplied by the prime mover 14, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_2$ and the idler wheels $50_{11}$, $50_{12}$ are respectively front idler wheels (leading idler wheels) and rear idler wheels (trailing idler wheels) that maintain the track 41 in tension, and can help to support part of the weight of the ATV 10 on the ground via the track 41. The idler wheels $50_3$-$50_{10}$ are roller wheels that roll on the inner side 45 of the track 41 along the bottom run 66 of the track 41 to apply the bottom run 66 on the ground. The idler wheels $50_1$-$50_{12}$ move on respective ones of a plurality of idler wheel paths $55_1$, $55_2$ of the inner surface 32 of the carcass 36 of the track 41. Each of the idler wheel paths $55_1$, $55_2$ extends adjacent to respective ones of the drive/guide lugs $48_1$-$48_N$ to allow these lugs to guide motion of the track 41. As the roller wheels $50_3$-$50_{10}$ roll on respective ones of the idler wheel paths $55_1$, $55_2$, these paths can be referred to as "rolling paths".

The idler wheels $50_1$-$50_{12}$ may be arranged in other configurations and/or the track system $16_i$ may comprise more or less idler wheels in other embodiments.

The frame 44 supports components of the track system $16_i$, including the idler wheels $50_1$-$50_{12}$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_{11}$, $50_{12}$ are mounted to the frame 44 in a rear longitudinal end region of the frame 44 proximate the rear longitudinal end 59 of the track system $16_i$. The roller wheels $50_3$-$50_{10}$ are mounted to the frame 44 in a central region of the frame 44 between the front idler wheels $50_1$, $50_2$ and the rear idler wheels $50_{11}$, $50_{12}$. Each of the roller wheels $50_3$-$50_{10}$ may be rotatably mounted directly to the frame 44 or may be rotatably mounted to a link which is pivotally mounted to the frame 44 to which is rotatably mounted an adjacent one of the roller wheels $50_3$-$50_{10}$, thus forming a "tandem".

The frame 44 is supported at a support area 39. More specifically, in this case, the frame 44 is supported by the axle 21 of the ATV 10 to which is coupled the drive wheel 42, such that the support area 39 is intersected by the axis of rotation 49 of the drive wheel 42.

In this embodiment, the frame 44 is pivotable about a pivot axis 51 to facilitate motion of the track system $16_i$ on uneven terrain and enhance its traction on the ground. More particularly, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42. In yet other embodiments, the frame 44 may not be pivotable.

Also, in this embodiment, the track system $16_i$ comprises an anti-rotation connector 52 to limit a pivoting movement of the track system $16_i$ relative to the frame 11 of the ATV 10. In this example, the anti-rotation connector 52 comprises a spring and a damper and is connected between the frame 44 of the track system $16_i$ and the frame 11 of the ATV 10 (e.g., via one or more mounting brackets and/or fasteners).

The track system $16_i$ may have various features to enhance its traction and/or other aspects of its performance and/or use in various embodiments, examples of which will now be discussed.

I. Adaptation to ATV's Suspension

In some embodiments, with additional reference to FIGS. 16 to 22, the track system $16_i$ may be configured to compensate for and/or otherwise adapt to the suspension 19 of the ATV 10. For instance, the track system $16_i$ may be configured to compensate for and/or otherwise adapt to alignment settings, namely camber (i.e., a camber angle), caster (i.e., a caster angle) and/or toe (i.e., a toe angle), which are implemented by the suspension 19. As the ATV 10 may have been originally designed to travel on the ground-engaging wheels $15_1$-$15_4$ having tires instead of on the track systems $16_1$-$16_4$, the alignment settings may originally have been set to optimize travel, handling, ride quality, etc. of the ATV 10 on the ground-engaging wheels $15_1$-$15_4$. Since the track systems $16_1$-$16_4$ are structurally very different and behave very differently from the ground-engaging wheels $15_1$-$15_4$, the track system $16_i$ may be configured to compensate for and/or otherwise adapt to the alignment settings to enhance its traction and/or other aspects of its performance and/or use.

For example, in this embodiment, the track system $16_i$ comprises a compensator 70 to compensate for one or more of the alignment settings implemented by the suspension 19 of the ATV 10. More particularly, in this embodiment, the compensator 70 compensates for the camber implemented by the suspension 19 of the ATV 10. For instance, in this embodiment, the camber implemented by the suspension 19 of the ATV 10 is negative, i.e., "negative camber", such that, when a ground-engaging wheel $15_i$ is mounted to the suspension 19, a bottom of the ground-engaging wheel $15_i$ is farther out laterally than a top of the ground-engaging wheel $15_i$ when viewed from a front or rear of the ATV 10. This may have been originally implemented to provide better handling and dynamics of the ATV 10 on the ground-engaging wheels $15_1$-$15_4$, especially at higher speeds on the ground. In other embodiments, the camber implemented by the suspension 19 of the ATV 10 may be "positive camber" such that, when the ground-engaging wheel $15_i$ is mounted to the suspension 19, the top of the ground-engaging wheel $15_i$ is farther out laterally than the bottom of the ground-engaging wheel $15_i$ when viewed from the front or rear of the ATV 10.

Figure 15:
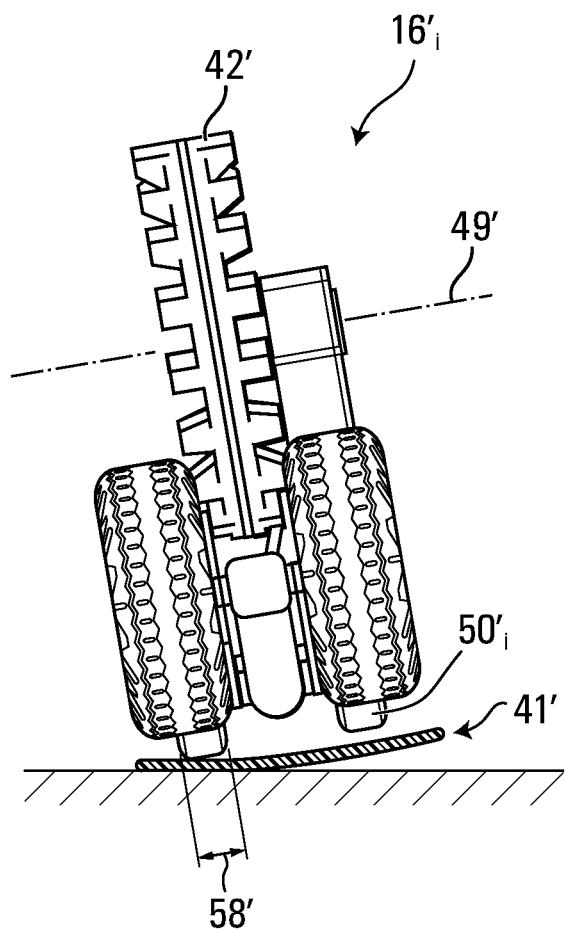
FIG. 15 shows a conventional track system installed on the ATV having a suspension implementing a camber.

For instance, in some cases, as shown in FIG. 15, this may address issues with a conventional track system $16_i'$ in which the camber implemented by the ATV's suspension 19 results in uneven contact of its track 41' with the ground due to only certain ones of its idler wheels $50_1'$-$50_{12}'$ bearing some load while other ones of its idler wheels $50_1'$-$50_{12}'$ are off the ground and unloaded, thereby causing the track's contact patch 58' to extend over a very limited part of the track's width.

The camber compensator 70 is configured such that, even with the camber implemented by the suspension 19 of the ATV 10, when the ground is horizontal, the contact patch 58 of the track 41 with the ground extends over at least a substantial part of the width of the track 41 (i.e., over all or a substantial part of the width of the track 41). That is, in some embodiments, the camber compensator 70 may be configured such that, even with the camber implemented by the suspension 19 of the ATV 10, when the ground is horizontal, the contact patch 58 of the track 41 with the ground may extend over at least 30%, in some cases at least 40%, in some cases at least 50%, in some cases at least 60%, in some cases at least 70%, in some cases at least 80%, in some cases at least 90% and in some cases even more of the width of the track 41. Thus, in some examples of implementation, the camber compensator 70 may be configured such that, even with the camber implemented by the suspension 19 of the ATV 10, when the ground is horizontal, the contact patch 58 of the track 41 with the ground extends over at least a majority of the width of the track 41, and in some cases all or nearly all of the width of the track 41.

Figure 16:
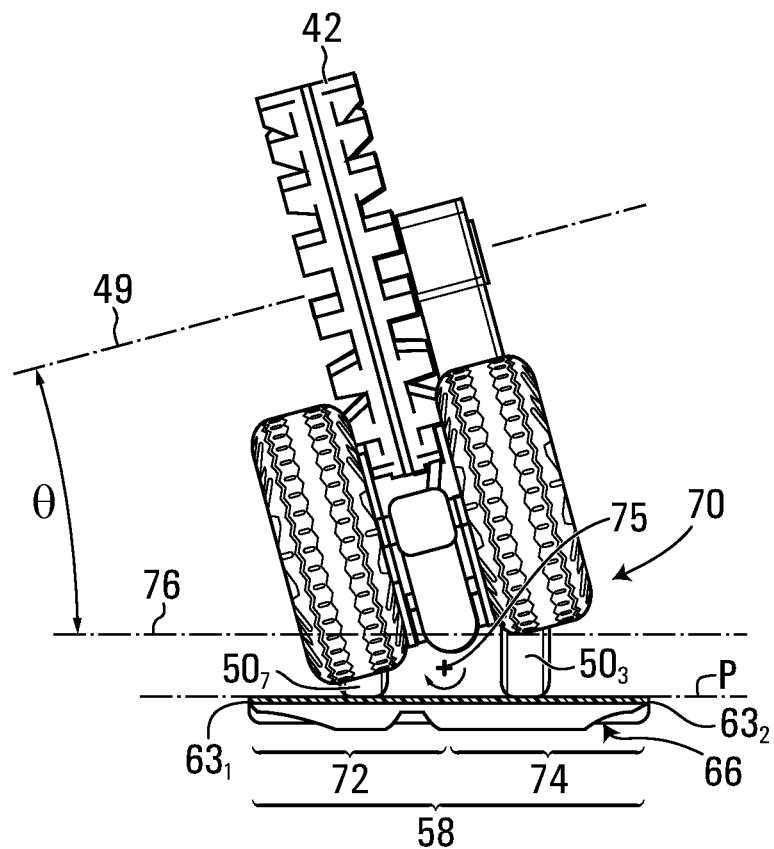
FIG. 16 shows a partial front view of the track system comprising a camber compensator that compensates for the camber implemented by the suspension of the ATV, in accordance with an embodiment of the invention.

For instance, in some embodiments, as depicted in FIG. 16, the camber compensator 70 may be configured such that, even with the camber implemented by the suspension 19 of the ATV 10, when the ground is horizontal, the track-engaging assembly 22 exerts pressure on an area 72 of the bottom run 66 of the track 41 that is inboard of the drive wheel 42 in the widthwise direction of the ATV 10 (i.e., that is located, in the widthwise direction of the ATV 10, between the drive wheel 42 and the lateral edge $63_1$ of the track 41 which is closest to a center of the ATV 10) and an area 74 of the bottom run 66 of track 41 that is outboard of the drive wheel 42 in the widthwise direction of the ATV 10 (i.e., that is located, in the widthwise direction of the ATV 10, between the drive wheel 42 and the lateral edge $63_2$ of the track 41 which is farthest from the center of the ATV 10). Thus, even with the camber implemented by the suspension 19 of the ATV 10, when the ground is horizontal, the contact patch 58 of the track 41 with the ground is disposed inboard and outboard of the drive wheel 42 in the widthwise direction of the ATV 10, i.e., is disposed both (1) between the lateral edge $63_1$ of the track 41 and the drive wheel 42 in the widthwise direction of the ATV 10 and (2) between the lateral edge $63_2$ of the track 41 and the drive wheel 42 in the widthwise direction of the ATV 10.

The camber compensator 70 may be implemented in various ways in various embodiments.

For example, in this embodiment, the camber compensator 70 is configured such that the track-engaging assembly 22 orients at least a substantial part of a cross-section of the bottom run 66 of the track 41 (taken in the widthwise direction of the track 41) transversally to the axis of rotation 49 of the drive wheel 42, i.e., in a plane P transversal (i.e., nonparallel) to the axis of rotation 49 of the drive wheel 42. For instance, in some embodiments, the camber compensator 70 may be configured such that the track-engaging assembly 22 orients at least 30%, in some cases at least 40%, in some cases at least 50%, in some cases at least 60%, in some cases at least 70%, in some cases at least 80%, in some cases at least 90% and in some cases even more of the cross-section of the bottom run 66 of the track 41 transversally to the axis of rotation 49 of the drive wheel 42.

To that end, in this embodiment, the camber compensator 70 is configured to allow an axis of rotation 76 of each of at least some of the idler wheels $50_1$-$50_{12}$ to be transversal (i.e., nonparallel) to the axis of rotation 49 of the drive wheel 42. In this example of implementation, the axis of rotation 76 of each of the idler wheels $50_1$-$50_{12}$ is allowed to be transversal to the axis of rotation 49 of the drive wheel 42.

More particularly, in this embodiment, the camber compensator 70 is configured to allow movement of the axis of rotation 76 of each of the idler wheels $50_1$-$50_{12}$ relative to the drive wheel 42 such that the axis of rotation 76 of each of the idler wheels $50_1$-$50_{12}$ can be in a plurality of different orientations relative to the axis of rotation 49 of the drive wheel 42, including being transversal to the axis of rotation 49 of the drive wheel 42 and being parallel to the axis of rotation 49 of the drive wheel 42. In this example of implementation, the camber compensator 70 allows a motion of the axis of rotation 76 of each of the idler wheels $50_1$-$50_{12}$ that includes a rotation about a "roll" axis 75 parallel to the longitudinal direction of the track system $16_i$. This allows the idler wheels $50_1$-$50_{12}$ to be positioned to compensate for the camber implemented by the suspension 19 of the ATV 10.

The camber compensator 70 can allow the axis of rotation 76 of an idler wheel $50_i$ to diverge from the axis of rotation 49 of the drive wheel 42 by an angle θ in order to compensate for the camber implemented by the suspension 19 of the ATV 10. The angle θ may have any suitable value in various embodiments. For example, in some embodiments, the angle θ between the axis of rotation 76 of the idler wheel $50_i$ and the axis of rotation 49 of the drive wheel 42 may be at least 2°, in some cases at least 3°, in some cases at least 4°, in some cases at least 6°, in some cases at least 8°, in some cases at least 10°, and in some cases even more.

Figure 17:
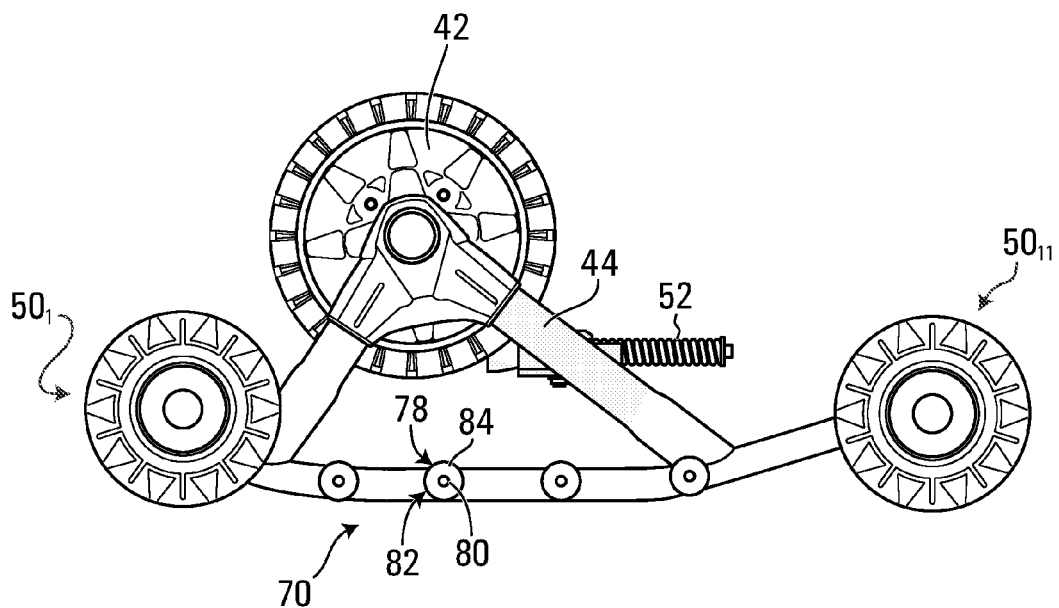
FIG. 17 shows a support comprising a resilient mount of the camber compensator.

In this embodiment, with additional reference to FIG. 17, the camber compensator 70 comprises a support 78 for an axle 80 of each idler wheel $50_i$ that is disposed between the frame 44 of the track system $16_i$ and the axle 80 of the idler wheel $50_i$ and allows movement of the axle 80 of the idler wheel $50_i$ relative to the frame 44.

More particularly, in this embodiment, the support 78 comprises a resilient mount 82 for the axle 80 of the idler wheel $50_i$. The resilient mount 82 is disposed between the frame 44 of the track system $16_i$ and the axle 80 of the idler wheel $50_i$ and is resiliently deformable to allow movement of the axle 80 of the idler wheel $50_i$ relative to the frame 44.

Figure 18:
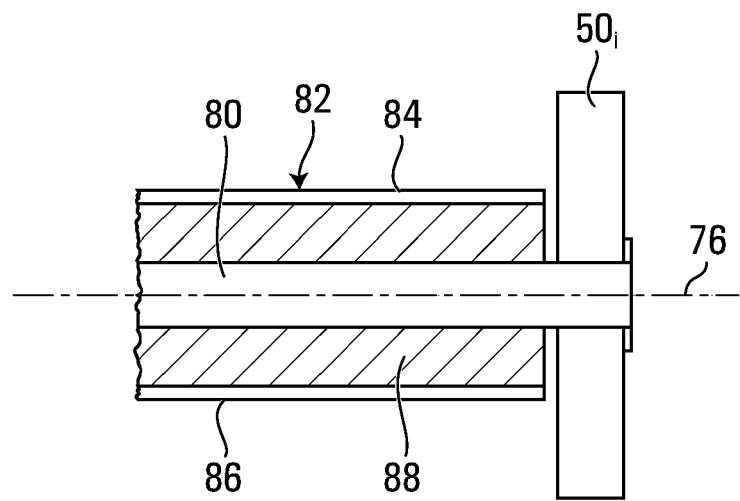
FIG. 18 shows a partial cross-sectional view of the resilient mount including a resilient device receiving an axle of an idler wheel, the resilient device being in a first configuration.
Figure 19:
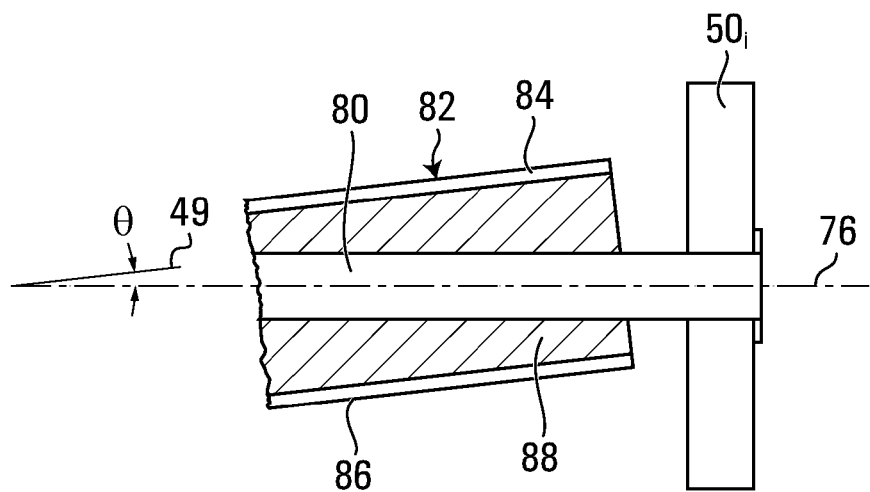
FIG. 19 shows a partial cross-sectional view of the resilient device being in a second configuration.

With additional reference to FIGS. 18 and 19, the resilient mount 82 comprises a resilient device 84 that is deformable (i.e., changeable in configuration) to allow movement of the axle 80 of the idler wheel $50_i$ relative to the frame 44. More particularly, the resilient device 84 is configured to change from a first configuration to a second configuration in response to a load and recover the first configuration in response to removal of the load to allow movement of the axle 80 of the idler wheel $50_i$ relative to the frame 44.

In this embodiment, the resilient device 84 comprises a housing 86 and compliant material 88 for providing compliance to the resilient device 84. The housing 86 extends in the widthwise direction of the track system $16_i$ and the compliant material 88 is at least partially contained within the housing 86. The housing 86 may be attached to the frame 44 of the track system $16_i$ (e.g., via fasteners, welding, or any other suitable fastening technique) or be part of the frame 44. The compliant material 88 is configured to receive the axle 80 of the idler wheel $50_i$ and thus comprises an opening sized such that the axle 80 is received therein.

The compliant material 88 is more flexible and/or softer than a material of the housing 86.

For example, in some embodiments, a ratio of a modulus of elasticity of the compliant material 88 over a modulus of elasticity of the material of the housing 86 may be no more than 0.3, in some cases no more than 0.2, in some cases no more than 0.1, in some cases no more than 0.05, and in some cases even less. This ratio may have any other suitable value in other embodiments. For instance, in some embodiments, the modulus of elasticity of the compliant material 88 may be no more than 0.4 GPa, in some cases no more than 0.2 GPa, in some cases no more than 0.05 GPa, and in some cases even less. The modulus of elasticity of the compliant material 88 may have any other suitable value in other embodiments.

As another example, in some embodiments, a ratio of a hardness of the compliant material 88 over a hardness of the material of the housing 86 may be no more than 0.5, in some cases no more than 0.4, in some cases no more than 0.3, in some cases no more than 0.2, in some cases no more than 0.1, and in some cases even less. This ratio may have any other suitable value in other embodiments. For instance, in some embodiments, the hardness of the compliant material 88 may be no more than 50 Shore D in some cases no more than 20 Shore D in some cases no more than 1 Shore D (60 Shore A) and in some cases even less. The hardness of the compliant material 88 may have any other suitable value in other embodiments.

In this embodiment, the compliant material 88 is elastomeric material. More particularly, in this embodiment, the elastomeric material 88 comprises rubber.

The elastomeric material 88 may comprise any other suitable elastomer (e.g., ethylene-vinyl acetate (EVA)) in other embodiments. The compliant material 88 may be any other suitable material providing suitable compliance in other embodiments (e.g., a gel or other fluid).

As illustrated in FIG. 19, the compliance provided by the elastomeric material 88 of the resilient device 84 allows the axle 80 of the idler wheel $50_i$ and its axis of rotation 76 to pivot about the roll axis 75 by the angle θ to compensate for the camber implemented by the suspension 19 of the ATV 10.

Thus, with the camber implemented by the suspension 19 of the ATV 10, the resilient device 84 deforms elastically to allow the axle 80 of the idler wheel $50_i$ to pivot about the roll axis 75 such as to avoid or minimize a reduction of the contact patch 58 of the track 41. More specifically, a load applied at the axle 80 causes the axle 80 to pivot about the roll axis 75 within a range defined above in respect of the angle θ. Upon removal of the load, the resilient device 84 returns to its initial configuration.

Figure 20:
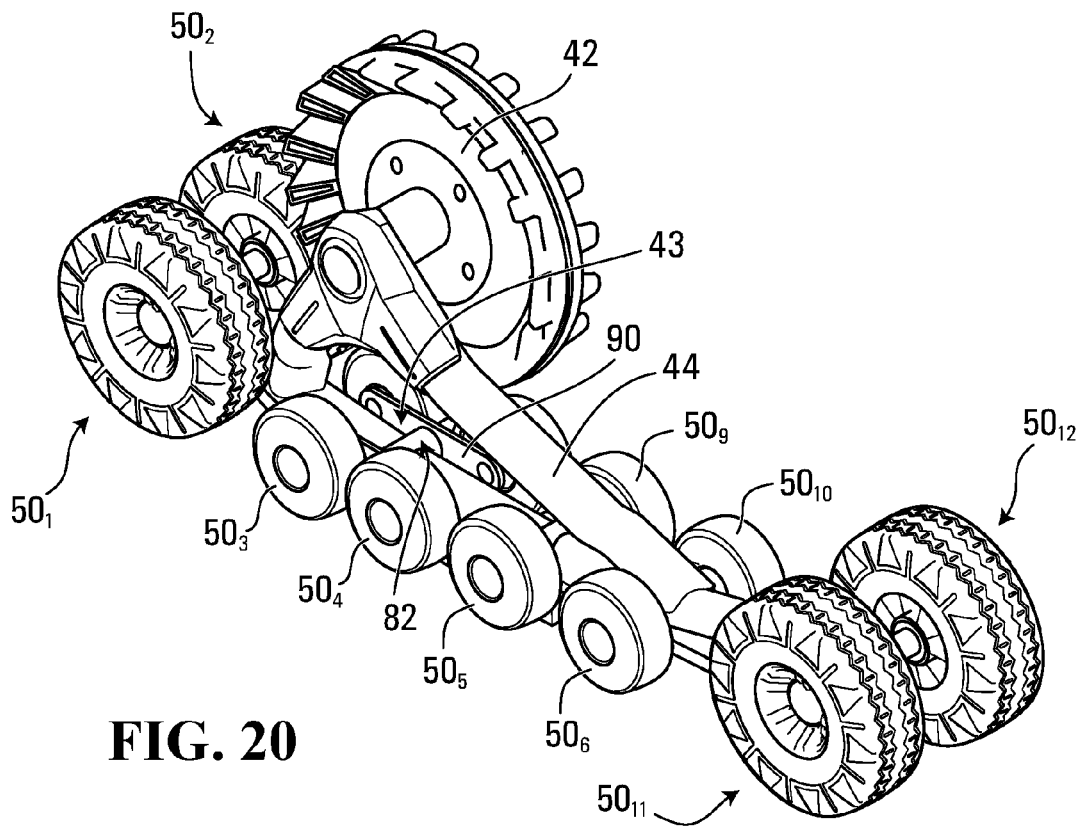
FIGS. 20 and 21 show an example of an embodiment in which the track system comprises a tandem that comprises a resilient mount of the camber compensator.
Figure 21:
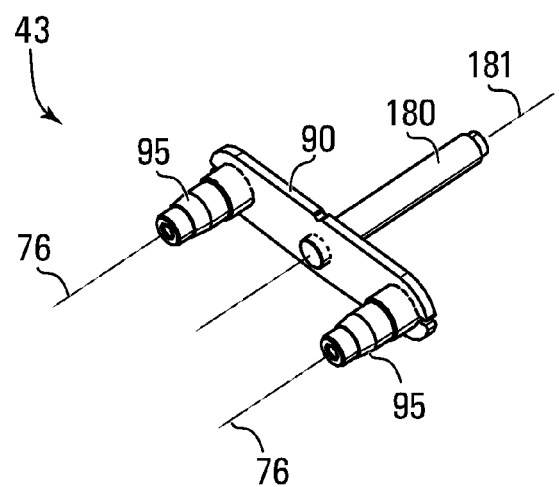
Figure 22:
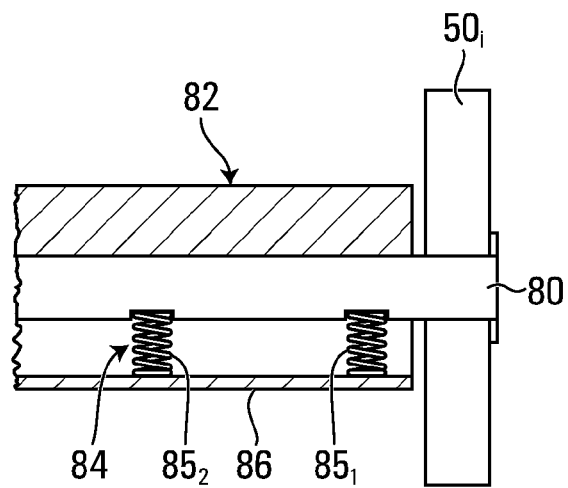
FIG. 22 shows a variant in which the resilient device of the camber compensator comprises a spring.

In a variant, in some embodiments, with additional reference to FIGS. 20 and 21, the camber compensator 70 may be implemented by a tandem 43 of the track system $16_i$. The tandem 43 comprises a link 90 carrying adjacent ones of the roller wheels $50_3$-$50_{10}$ (e.g., roller wheels $50_3$, $50_4$) via mounts 95 each defining the axis of rotation 76 for a respective one of the roller wheels $50_3$, $50_4$. Moreover, the link 90 is mounted on an axle 180 defining a pivot axis 181 about which the link 90 is pivotable. The pivot axis 181 of the link 90 is generally parallel to the axis of rotation 76 of each of the roller wheels $50_3$, $50_4$. As such, the link 90 and the roller wheels $50_3$, $50_4$ are able to pivot relative to the frame 44 of the track system $16_i$. The resilient mount 82 receives the axle 180 in a manner similar to that described above in respect of the axle 80.

Thus, with the camber implemented by the suspension 19 of the ATV 10, the resilient device 84 of the resilient mount 82 deforms resiliently to allow the axle 180 of the tandem 43 to pivot about the roll axis 75 such as to avoid or minimize a reduction of the contact patch 58 of the track 41. More specifically, a load applied at the tandem 43 causes the axle 180 and the pivot axis 181 to pivot about the roll axis 75 by the angle θ to compensate for the camber implemented by the suspension 19 of the ATV 10. In turn this causes the roller wheels $50_3$, $50_4$ to acquire a lower vertical position (i.e., closer to the ground) thus avoiding or minimizing a reduction of the contact patch 58 of the track 41.

The track system $16_i$ may comprise any number of tandems in other embodiments (e.g., another tandem opposite the tandem 43 and inboard of the drive wheel 42).

In a variant, in some embodiments, the resilient device 84 of the resilient mount 82 may comprise a coil spring, a fluid spring or any other suitable type of spring rather than compliant material. For instance, with additional reference to FIG. 22, the resilient device 84 of the resilient mount 82 comprises coil springs $85_1$, $85_2$ for providing compliance. The housing 86 houses the coil springs $85_1$, $85_2$. The coil springs $85_1$, $85_2$ are mounted to the axle 80 which may comprise a surface (e.g., a flat surface section) for mounting an end of each of the coil springs $85_1$, $85_2$ while the housing 86 accommodates another end of each of the coil springs $85_1$, $85_2$ (e.g., via another flat surface section). The compliance provided by the coil springs $85_1$, $85_2$ of the resilient device 84 allows the axle 80 of the idler wheel $50_i$ and its axis of rotation 76 to pivot about the roll axis 75 by the angle θ to compensate for the camber implemented by the suspension 19 of the ATV 10. More specifically, a load applied at the axle 80 can cause the coil springs $85_1$, $85_2$ to be compressed, allowing the axle 80 and its axis of rotation 76 to pivot about the roll axis 75 such as to acquire a lower vertical position (i.e., closer to the ground) and thus avoid or minimize a reduction of the contact patch 58 of the track 41. Upon removal of the load, the coil springs $85_1$, $85_2$ expand again, urging the resilient device 84 back to its original configuration.

Figure 23:
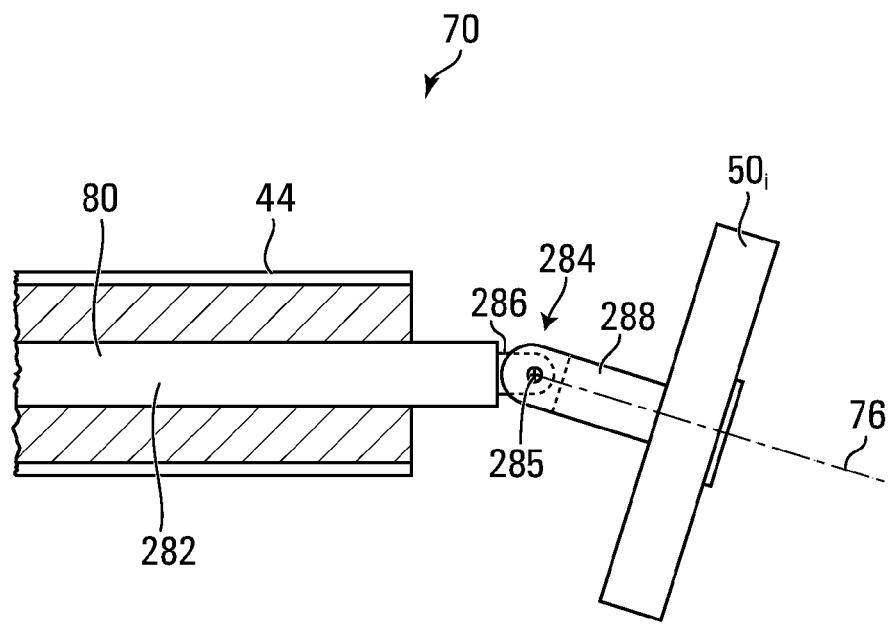
FIG. 23 shows another variant in which the camber compensator comprises a pivot mechanism.

In another variant, in some embodiments, with additional reference to FIG. 23, the camber compensator 70 may be implemented through a pivot mechanism 284. In this example, the axle 80 for the idler wheel $50_i$ comprises a shaft 282 and the pivot mechanism 284 connected to the shaft 282. The shaft 282 is mounted to the frame 44 of the track system $16_i$ and extends in the widthwise direction thereof. The pivot mechanism 284 comprises a fixed portion 286 provided on (e.g., fixedly connected to) the shaft 282 and a pivotable axle portion 288 that is pivotable relative to the fixed portion 286 about a pivot axis 285 extending in the longitudinal direction of the track system $16_i$. The fixed portion 286 may be fixed to the shaft 282 (e.g., via a fastener, welding, press fit, etc.) or integrally manufactured (e.g., cast or molded) with the shaft 282. The idler wheel $50_i$ is mounted on the pivotable axle portion 288 which defines the axis of rotation 76 about which the idler wheel $50_i$ rotates.

Thus, the pivot mechanism 284 allows the pivotable axle portion 288 and the idler wheel $50_i$ to pivot about the pivot axis 285 to compensate for the camber implemented by the suspension 19 of the ATV 10. More specifically, a load applied at the axle 80 causes the pivotable axle portion 288 and its axis of rotation 76 to pivot about the pivot axis 285 such as to acquire a lower vertical position (i.e., closer to the ground) and thus avoid or minimize a reduction of the contact patch 58 of the track 41.

In some embodiments, the pivot mechanism 284 may also comprise a resilient device (e.g., a torsion spring) configured to return the pivot mechanism 284 to its original configuration after the load is no longer applied at the axle 80.

The camber compensator 70 may be implemented elsewhere in the track system $16_i$ than at the axle 80 of an idler wheel $50_i$ or the axle 180 of a tandem 43.

Figure 24:
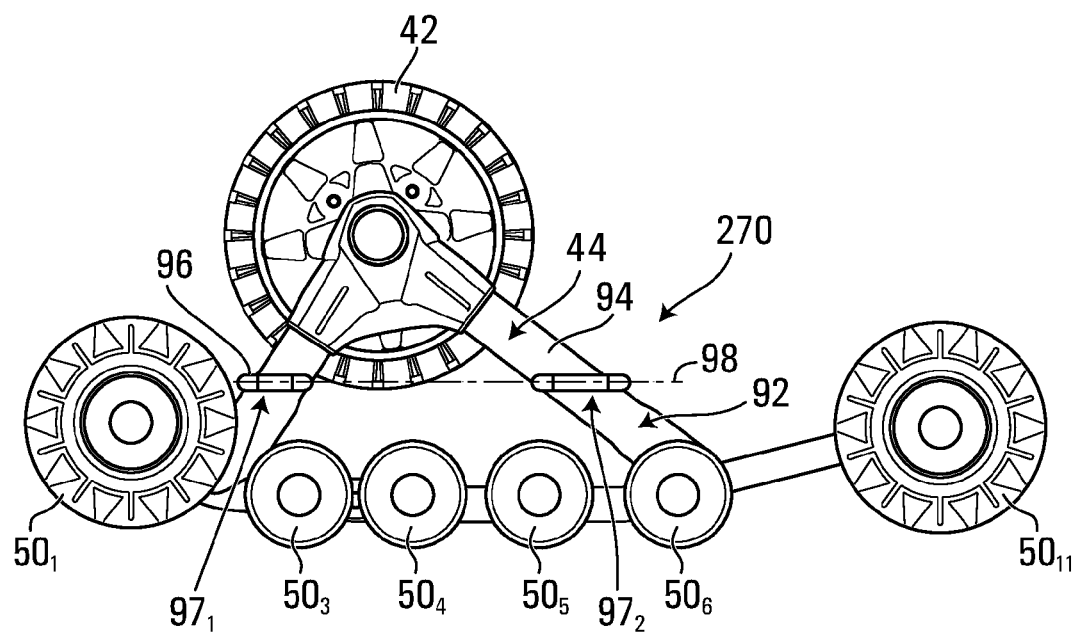
FIG. 24 shows another variant in which the camber compensator comprises a wheel carrier carrying idler wheels of the track system.
Figure 25:
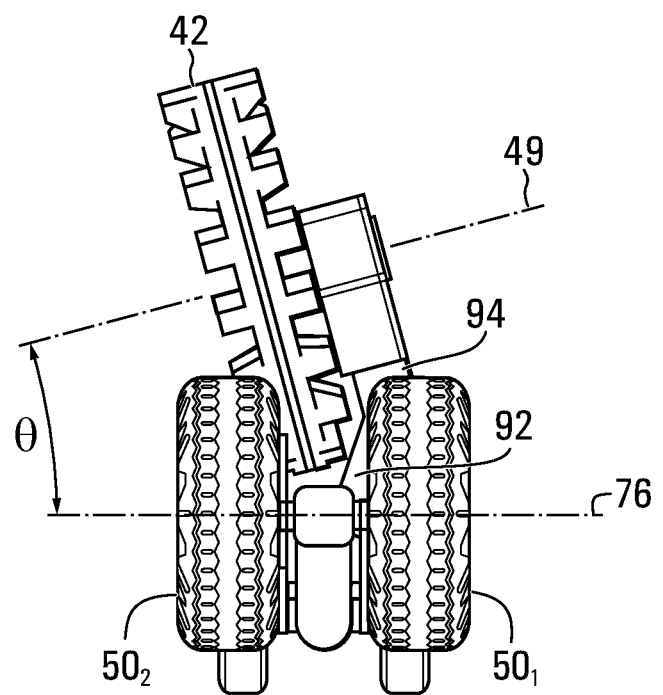
FIG. 25 shows how the wheel carrier compensates for the camber implemented by the suspension of the ATV.
Figure 26:
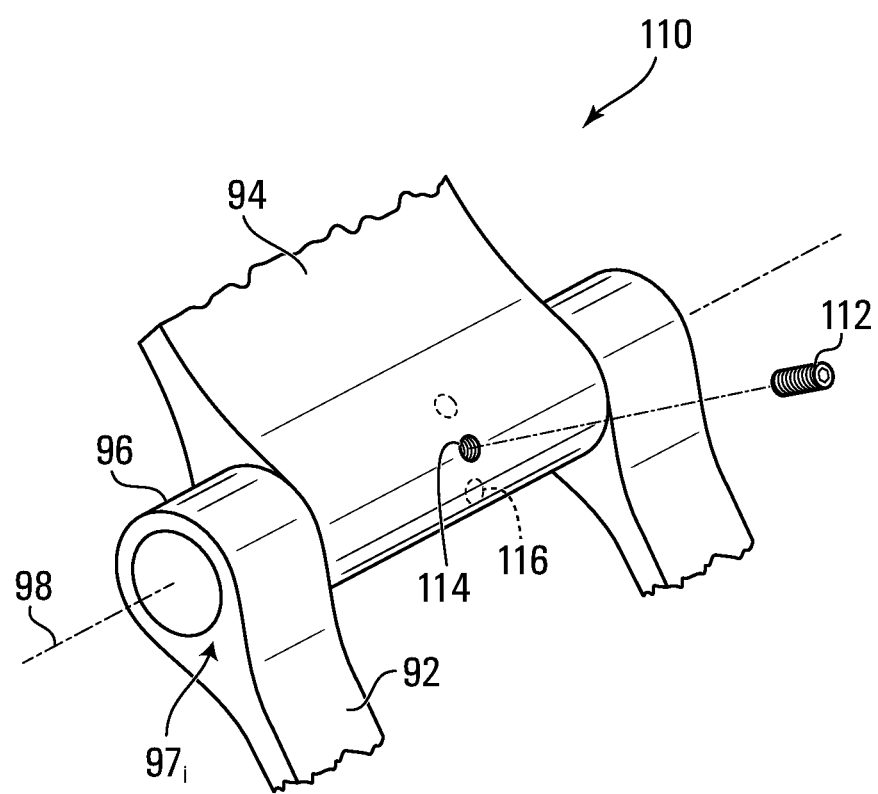
FIG. 26 shows a partial view of a connection between the wheel carrier and a frame structure of a frame of the track system.

For instance, in some embodiments, with additional reference to FIGS. 24 to 26, the camber compensator 70 may comprise a wheel carrier 92 carrying the idler wheels $50_1$-$50_{12}$ and movable relative to the drive wheel 42 such as to allow the axis of rotation 76 of each of the idler wheels $50_1$-$50_{12}$ to be transversal to the axis of rotation 49 of the drive wheel 42.

In this embodiment, the wheel carrier 92 is movable relative to a frame structure 94 forming an upper part of the frame 44 and depending from the axle of the ATV 10. Also, in this embodiment, the wheel carrier 92 is movable relative to the drive wheel 42 by being pivotable relative to the frame structure 94 about a pivot device 96 that is connected between the wheel carrier 92 and the frame structure 94. The pivot device 96 defines a pivot axis 98 that extends in the longitudinal direction of the track system $16_i$.

More particularly, in this embodiment, the pivot device 96 comprises a plurality of pivots $97_1$, $97_2$ spaced from one another and attached to each of the wheel carrier 92 and the frame structure 94. In this example, the pivots $97_1$, $97_2$ are disposed on respective arms of the frame 44 that converge towards the drive wheel 42. The pivot device 96 may comprise any other suitable pivoting mechanism in other embodiments.

The wheel carrier 92 is thus pivotable about the pivot axis 98 such that the axis of rotation 76 of each of the idler wheels $50_1$-$50_{12}$ is allowed to diverge from the axis of rotation 49 of the drive wheel 42 by the angle θ in order to compensate for the camber implemented by the suspension 19 of the ATV 10. The angle θ may have any suitable value in various embodiments. For example, in some embodiments, the angle θ may be at least 2°, in some cases at least 5°, in some cases at least 8°, in some cases at least 10°, and in some cases even more.

Therefore, the wheel carrier 92 and the idler wheels $50_1$-$50_{12}$ are allowed to pivot about the pivot axis 98 to compensate for the camber implemented by the suspension 19 of the ATV 10. More specifically, a load applied at the wheel carrier 92 causes the wheel carrier 92 and the axis of rotation 76 of each of the idler wheels $50_1$-$50_{12}$ to pivot about the pivot axis 98 such as to acquire a lower vertical position (i.e., closer to the ground) and thus avoid or minimize a reduction of the contact patch 58 of the track 41.

Figure 27:
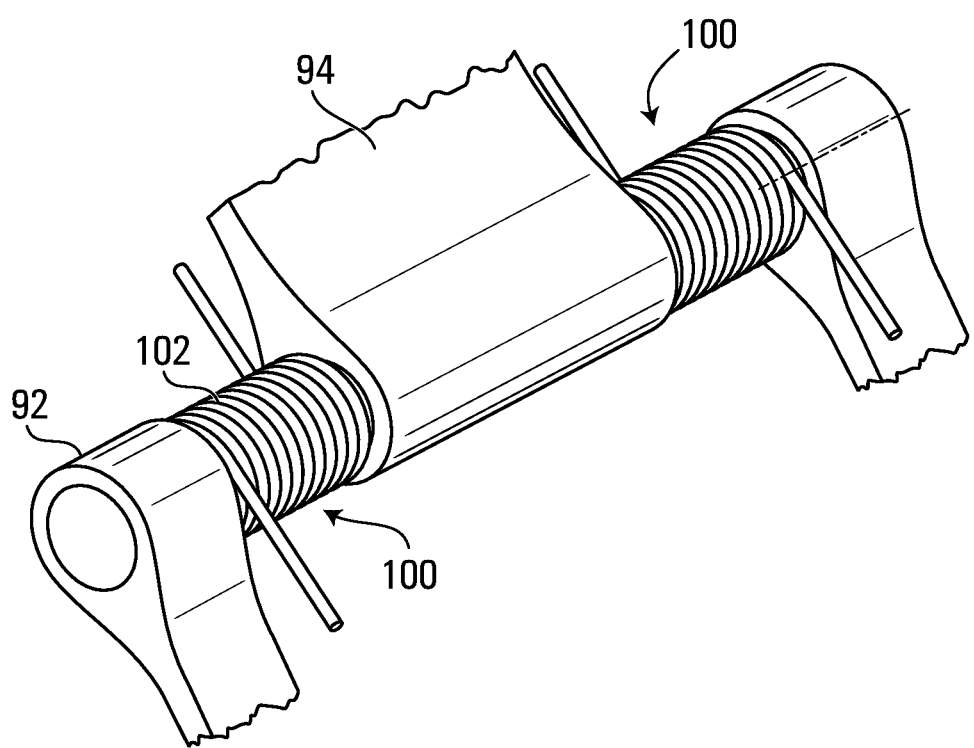
FIG. 27 shows an embodiment in which the connection between the wheel carrier and the frame structure includes a resilient device.

In a variant, in some embodiments, as shown in FIG. 27, the wheel carrier 92 is mounted to the frame structure 94 by a resilient device 100 that is disposed between the wheel carrier 92 and the frame structure 94 and resiliently deformable (i.e., changeable in configuration) such as to allow movement of the wheel carrier 92 relative to the frame structure 94. More specifically, the resilient device 100 is configured to change from a first configuration to a second configuration in response to a load and recover the first configuration in response to removal of the load to allow movement of the wheel carrier 92 relative to the frame structure 94.

For example, in this embodiment, the resilient device 100 comprises a torsion spring 102 mounted to the wheel carrier 92 and the frame structure 94. In a first configuration, the torsion spring 102 may be set such that the axis of rotation 76 of an idler wheel $50_i$ is parallel to the axis of rotation 49 of the drive wheel 42. In response to the application of a load, the torsion spring 102 may acquire a second configuration in which the axis of rotation 76 of each of the idler wheel $50_1$-$50_{12}$ is transversal to the axis of rotation 49 of the drive wheel 42, for example as shown in FIG. 25. Once the load is removed, the torsion spring 102 may reacquire the first configuration.

The resilient device 100 between the wheel carrier 92 and the frame structure 94 may be implemented in any other way in other embodiments. For example, in some embodiments, the resilient device 100 may comprise compliant material housed within a housing, a coil spring, a fluid spring, or any other suitable type of spring rather than a torsion spring.

The camber compensator 70 may be "dynamic" or "static" in various embodiments.

More specifically, the camber compensator 70 may be dynamic so as to adjust to the camber of the suspension 19 of the ATV 10 while the ATV 10 moves on the ground. That is, if the camber of the suspension 19 varies as the ATV 10 moves on the ground, the camber compensator 70 adjusts such that the angle θ between the axis of rotation 49 of the drive wheel 42 and the axis of rotation 76 of an idler wheel $50_i$ varies accordingly. For instance, the embodiments of the camber compensator 70 described above may be embodiments in which the camber compensator 70 is dynamic.

Conversely, in a static implementation of the camber compensator 70, the orientation of the bottom run 66 of the track 41 and the orientation of the axis of rotation 76 of an idler wheel $50_i$ are set and fixed based on a given camber setting of the suspension 19 of the ATV 10. For instance, in some embodiments, as shown in FIG. 26, the camber compensator 70 may be "lockable" and "unlockable" through a locking mechanism 110 such that the camber compensator 70 can be adjusted to compensate for different camber angles (e.g., 5°, 8°, 10°). The track system $16_i$ is therefore able to compensate for different camber settings and thus can be fitted to ATVs having distinct camber angles.

In this example of implementation, the locking mechanism 110 comprises a fastener 112, a fastener-receiving opening 114 located on the pivot device 96, and a plurality of fastener-receiving openings 116 located on a central pin of the pivot device 96. The locking mechanism 110 allows for a user to align the fastener-receiving opening 114 with one of the plurality of fastener-receiving openings 116 and engage the fastener 112 with the aligned fastener-receiving openings 114, 116. In this example, the fastener 112 comprises a set screw having threads on its outer periphery such as to engage threads on the inner surfaces of the fastener-receiving openings 114, 116. The locking mechanism 110 may comprise additional rows of fastener-receiving openings in other embodiments.

The locking mechanism 110 may be implemented in various other ways in other embodiments (e.g., an electromechanical lock).

The camber compensator 70 may be implemented in any other suitable way in other embodiments.

Figure 28:
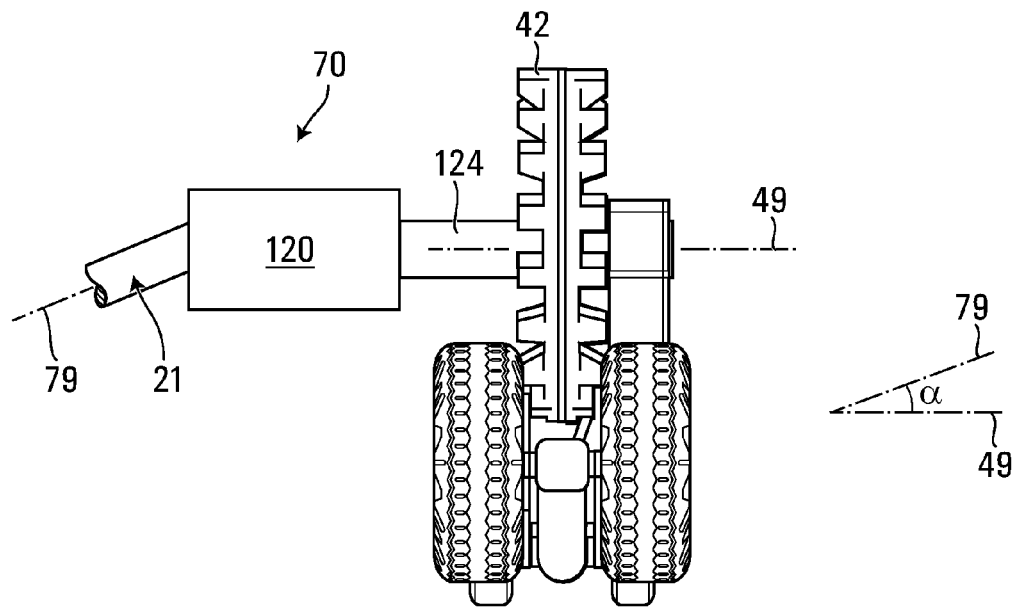
FIGS. 28 and 29 show a variant in which the camber compensator comprises a transmission of the track system.
Figure 29:
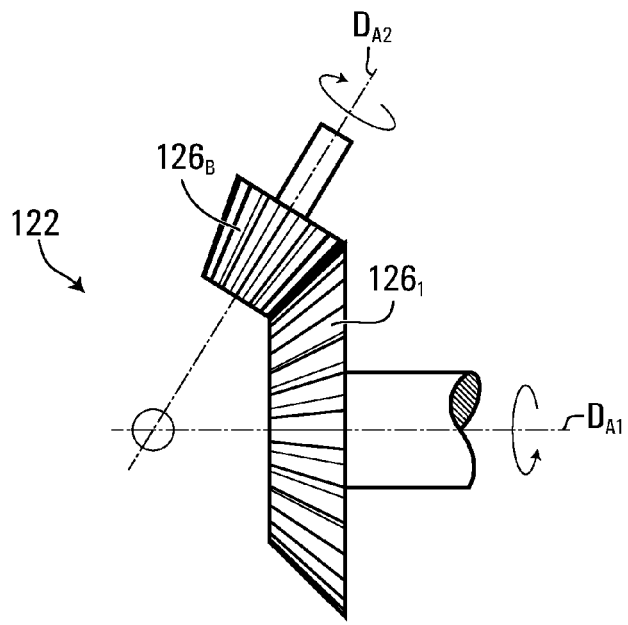

For example, in some embodiments, with additional reference to FIGS. 28 and 29, the camber compensator 70 may comprise a transmission 120 between the ATV's axle 21 and the drive wheel 42 of the track system $16_i$ such that the axis of rotation 49 of the drive wheel 42 is transversal (i.e., nonparallel) to the axis of rotation 79 of the ATV's axle 21. For instance, in some embodiments, the transmission 120 may be such that the drive wheel 42 is oriented vertically as if there was no camber (i.e., the axis of rotation 49 of the drive wheel 42 is horizontal). Basically, in such embodiments, the track system $16_i$ as a whole is mounted to the axle 21 of the ATV 10 to compensate for the camber implemented by the suspension 19 of the ATV 10.

The transmission 120 can allow the axis of rotation 49 of the drive wheel 42 to diverge from the axis of rotation 79 of the ATV's axle 21 by an angle α in order to compensate for the camber implemented by the suspension 19 of the ATV 10. The angle α may have any suitable value in various embodiments. For example, in some embodiments, the angle α may be at least 2°, in some cases at least 3°, in some cases at least 4°, in some cases at least 6°, in some cases at least 8°, in some cases at least 10°, and in some cases even more.

In this embodiment, the transmission 120 comprises gearing 122 which includes a plurality of gears that cooperate to modify an orientation of an output shaft 124 connecting the transmission 120 to the drive wheel 42. The orientation of the output shaft 124 is modified such that the drive wheel 42 is oriented vertically as if there was no camber. In this embodiment, the gearing 122 comprises a set of bevel gears $126_1$-$126_B$ that mesh with one another to modify an orientation of a drive axis DA. For example, as illustrated in FIG. 26, the drive axis $D_A$ changes from its original orientation $D_{A1}$ to a modified orientation $D_{A2}$.

II. Improved Ride Quality

In some embodiments, the track system $16_i$ may be configured to provide improved ride quality to the user of the ATV 10. For instance, the track system $16_i$ may be configured to better absorb impacts or other vibrations within the track system $16_i$ and/or to better accommodate uneven terrain.

Figure 30:
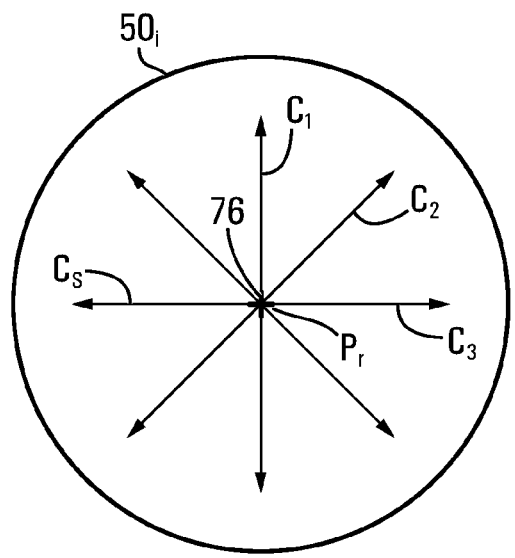
FIG. 30 shows an axis of rotation of an idler of the track system moveable from a rest position in a plurality of directions that are transversal to one another, in accordance with an embodiment of the invention.

For example, in some embodiments, with additional reference to FIG. 30, the track-engaging assembly 22 may be configured to allow movement of the axis of rotation 76 of each of the idler wheels $50_1$-$50_{12}$ relative to the drive wheel 42 such that, upon an impact on an idler wheel $50_i$ when the ground is uneven, the axis of rotation 76 of the idler wheel $50_i$ is movable relative to the drive wheel 42 from a rest position $P_r$ in a plurality of directions $C_1$-$C_S$ that are transversal (i.e., nonparallel) to one another.

Respective ones of the directions $C_1$-$C_S$ of movement of the axis of rotation 76 of the idler wheel $50_i$, e.g., the directions $C_1$, $C_3$, are perpendicular (i.e., orthogonal) to one another. Other ones of the directions $C_1$-$C_S$ of movement of the axis of rotation 76 of the idler wheel $50_i$ may be transversal but not necessarily perpendicular to one another (e.g., the directions $C_1$, $C_2$).

The directions $C_1$-$C_S$ of movement of the axis of rotation 76 of the idler wheel $50_i$ may include at least three, at least five, at least ten, at least twenty directions, or even more directions. In some embodiments, the directions $C_1$-$C_S$ substantially include every direction. That is, the axis of rotation 76 of the idler wheel $50_i$ is omnidirectionally movable relative to the drive wheel 42 from its rest position $P_r$. For example, the idler wheel $50_i$ may be movable in the directions $C_1$-$C_S$ spanning a 360° angle around the rest position $P_r$ of the axis of rotation 76 of the idler wheel $50_i$.

Figure 31:
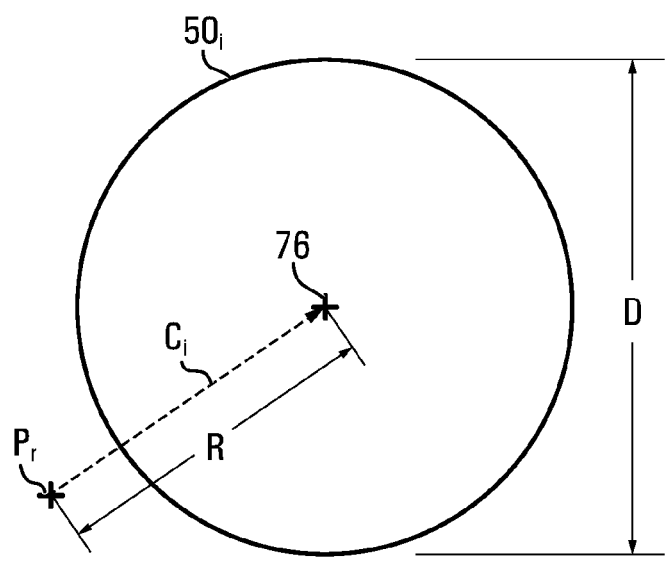
FIG. 31 shows a range of motion in a given direction of the axis of rotation of the idler wheel of FIG. 30.

As shown in FIG. 31, the axis of rotation 76 of the idler wheel $50_i$ may be movable relative to the drive wheel 42 in each of the directions $C_1$-$C_S$ by a distance R, which will be referred to as a "range of motion" of the axis of rotation 76 of the idler wheel $50_i$ in that direction. The range of motion R of the axis of rotation 76 of the idler wheel $50_i$ in each of the directions $C_1$-$C_S$ may have any suitable value to deal with impacts. For example, in some embodiments, a ratio R/D of the range of motion R of the axis of rotation 76 of the idler wheel $50_i$ in each of the directions $C_1$-$C_S$ over a diameter D of the idler wheel $50_i$ may be at least 0.04, in some cases at least 0.1, in some cases at least 0.25, and in some cases even more. Alternatively or additionally, in some embodiments, the range of motion R of the axis of rotation 76 of the idler wheel $50_i$ in each of the directions $C_1$-$C_S$ may be at least 8 mm, in some cases at least 12 mm, in some cases at least 20 mm, and in some cases even more.

Figure 32:
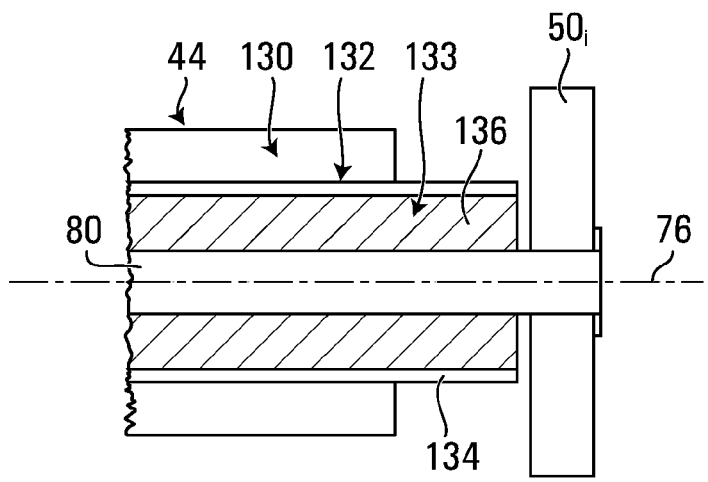
FIG. 32 shows a partial cross-sectional view of a resilient mount to which is mounted the idler of FIG. 30, a resilient device of the resilient mount being in a first configuration.
Figure 33A:
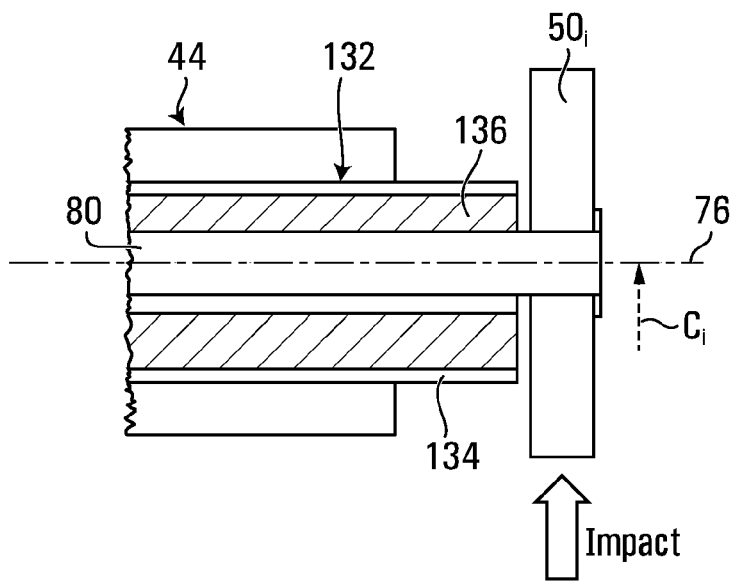
FIG. 33A shows a partial cross-sectional view of the resilient device of FIG. 32, the resilient device being in a second configuration.

In this embodiment, with additional reference to FIGS. 32 and 33A, the track-engaging assembly 22 comprises a support 130 for the axle 80 of the idler wheel $50_i$ that is disposed between the frame 44 of the track system $16_i$ and the axle 80 of the idler wheel $50_i$ and allows movement of the axle 80 of the idler wheel $50_i$ relative to the frame 44 and the drive wheel 42.

More particularly, in this embodiment, the support 130 comprises a resilient mount 132 for the axle 80 of the idler wheel $50_i$. The resilient mount 132 is disposed between the frame 44 of the track system $16_i$ and the axle 80 of the idler wheel $50_i$ and is resiliently deformable to allow movement of the axle 80 of the idler wheel $50_i$ relative to the frame 44 and the drive wheel 42.

The resilient mount 132 comprises a resilient device 133 that is deformable (i.e., changeable in configuration) to allow movement of the axle 80 of the idler wheel $50_i$ relative to the frame 44. More specifically, the resilient device 133 is configured to change from a first configuration to a second configuration in response to a load and recover the first configuration in response to removal of the load to allow movement of the axle 80 of the idler wheel $50_i$ relative to the frame 44 and the drive wheel 42.

In this embodiment, the resilient device 133 comprises a housing 134 and compliant material 136 for providing compliance to the resilient device 133. The housing 134 extends in the widthwise direction of the track system $16_i$ and the compliant material 136 is at least partially contained within the housing 134. The housing 134 may be attached to the frame 44 of the track system $16_i$ (e.g., via fasteners, welding, or any other suitable fastening technique) or be part of the frame 44. The compliant material 136 is configured to receive the axle 80 of the idler wheel $50_i$ and thus comprises an opening sized such that the axle 80 is received therein.

The compliant material 136 is more flexible and/or softer than a material of the housing 134.

For example, in some embodiments, a ratio of a modulus of elasticity of the compliant material 136 over a modulus of elasticity of the material of the housing 134 may be no more than 0.3, in some cases no more than 0.2, in some cases no more than 0.1, in some cases no more than 0.05, and in some cases even less. This ratio may have any other suitable value in other embodiments. For instance, in some embodiments, the modulus of elasticity of the compliant material 136 may be no more than 0.4 GPa, in some cases no more than 0.2 GPa, in some cases no more than 0.05 GPa, and in some cases even less. The modulus of elasticity of the compliant material 136 may have any other suitable value in other embodiments.

As another example, in some embodiments, a ratio of a hardness of the compliant material 136 over a hardness of the material of the housing 134 may be no more than 0.5, in some cases no more than 0.4, in some cases no more than 0.3, in some cases no more than 0.2, in some cases no more than 0.1, and in some cases even less. This ratio may have any other suitable value in other embodiments. For instance, in some embodiments, the hardness of the compliant material 136 may be no more than 50 Shore D, in some cases no more than 20 Shore D, in some cases no more than 1 Shore D (60 Shore A), and in some cases even less. The hardness of the compliant material 136 may have any other suitable value in other embodiments.

In this embodiment, the compliant material 136 is elastomeric material. More particularly, in this embodiment, the elastomeric material 136 comprises rubber. The elastomeric material 136 may comprise any other suitable elastomer (e.g., ethylene-vinyl acetate (EVA)) in other embodiments. The compliant material 136 may be any other suitable material providing suitable compliance in other embodiments (e.g., a gel or other fluid).

Thus, in this example of implementation, as shown in FIG. 33A, an impact on the idler wheel $50_i$ (e.g., because the ground is uneven) may generate a force at the idler wheel $50_i$ that urges the axle 80 of the idler wheel $50_i$ in a given direction $C_i$ of the plurality of directions $C_1$-$C_S$. The force may cause the axle 80 of the idler wheel $50_i$ to travel a given distance in the direction $C_i$, the distance being within the range of motion R of the axle 80. This causes deformation (e.g., compression) of the elastomeric material 136 by the axle 80. While the distance traveled by the axle 80 depends on the magnitude of the force generated by the impact, it also depends on mechanical properties of the elastomeric material 136 and more specifically on a stiffness of the elastomeric material 136. Once the force has dissipated, the resilient device 133 urges the axle 80 of the idler wheel $50_i$ to its initial configuration, which corresponds to the rest position $P_r$ of the axis of rotation 76 of the axle 80.

Figure 33B:
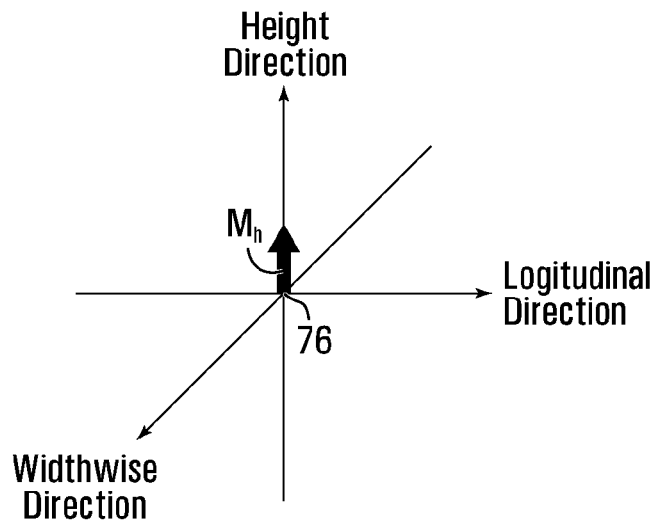
FIGS. 33B and 33C show examples of movement of the axis of rotation of the idler wheel of FIG. 30.

In some cases, the direction $C_i$ in which the axle 80 of the idler wheel $50_i$ moves may be the height direction of the track system $16_i$. An example of such a movement is represented by arrow $M_h$ in FIG. 33B, where the arrow $M_h$ represents a velocity vector of the axis of rotation 76 of the idler wheel $50_i$ at an instant at which the movement of the axle 80 of the idler wheel $50_i$ relative to the frame 44 and the drive wheel 42 begins. Thus, the resilient device 133 allows vertical movement of the axle 80 of the idler wheel $50_i$ relative to the frame 44 and the drive wheel 42.

Figure 33C:
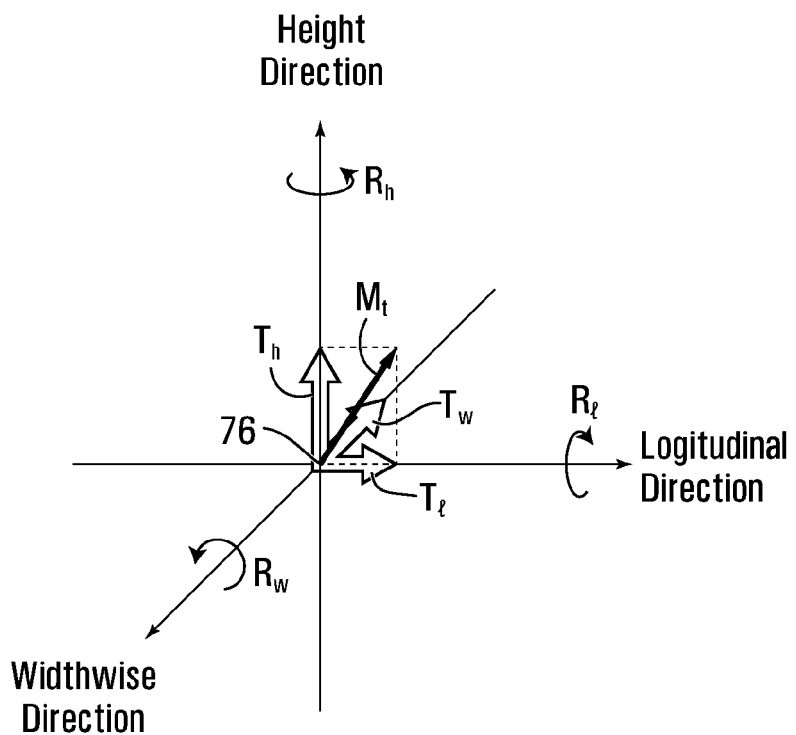

In other cases, the direction $C_i$ in which the axle 80 of the idler wheel $50_i$ moves may be transversal to the height direction of the track system $16_i$. An example of such a movement is represented by arrow Mt in FIG. 33C, where the arrow Mt represents a velocity vector of the axis of rotation 76 of the idler wheel $50_i$ at an instant at which the movement of the axle 80 of the idler wheel 50$_i$ relative to the frame 44 and the drive wheel 42 begins. As such, the resilient device 133 allows movement of the axle 80 of the idler wheel 50$_i$ relative to the frame 44 and the drive wheel 42 in a non-vertical direction (i.e., a direction not purely vertical).

A movement of the axle 80 of the idler wheel 50$_i$ relative to the frame 44 and the drive wheel 42 in the direction $C_i$ transversal to the height direction of the track system 16$_i$ induces a displacement of the axle 80 of the idler wheel 50$_i$ relative to the frame 44 and the drive wheel 42 that can be viewed as including at least one of: (i) a translation of the axle 80 of the idler wheel 50$_i$ relative to the frame 44 and the drive wheel 42 in the longitudinal direction of the track system 16$_i$, as represented by arrow $T_l$ in FIG. 33C; (ii) a translation of the axle 80 of the idler wheel 50$_i$ relative to the frame 44 and the drive wheel 42 in the widthwise direction of the track system 16$_i$, as represented by arrow $T_w$ in FIG. 33C; (iii) a rotation of the axle 80 of the idler wheel 50$_i$ relative to the frame 44 and the drive wheel 42 about an axis of rotation $R_l$ generally parallel to the longitudinal direction of the track system 16$_i$; and (iv) a rotation of the axle 80 of the idler wheel 50$_i$ relative to the frame 44 and the drive wheel 42 about an axis of rotation $R_w$ generally parallel to the widthwise direction of the track system 16$_i$. This displacement may also include at least one of: (i) a translation of the axle 80 of the idler wheel 50$_i$ relative to the frame 44 and the drive wheel 42 in the height direction of the track system 16$_i$, as represented by arrow $T_h$ in FIG. 33C; and (ii) a rotation of the axle 80 of the idler wheel 50$_i$ relative to the frame 44 and the drive wheel 42 about an axis of rotation $R_h$ generally parallel to the height direction of the track system 16$_i$.

This ability of the axle 80 of the idler wheel 50$_i$ to move relative to the frame 44 and the drive wheel 42 transversally to the height direction of the track system 16$_i$ thus provides additional degrees of freedom of movement of the idler wheel 50$_i$. For example, in this embodiment, the ability of the axle 80 of the idler wheel 50$_i$ to translate relative to the frame 44 and the drive wheel 42 in the widthwise direction of the track system 16$_i$ (arrow $T_w$) and rotate relative to the frame 44 and the drive wheel 42 about the axis of rotation $R_l$ generally parallel to the longitudinal direction of the track system 16$_i$ provides a "roll" capability to the axle 80 of the idler wheel 50$_i$. In that sense, the axis of rotation $R_l$ of the axle 80 of the idler wheel 50$_i$ relative to the frame 44 and the drive wheel 42 can be viewed as a "roll" axis. Furthermore, the ability of the axle 80 of the idler wheel 50$_i$ to translate relative to the frame 44 and the drive wheel 42 in the longitudinal direction of the track system 16$_i$ (arrow $T_l$) and rotate relative to the frame 44 and the drive wheel 42 about the axis of rotation $R_w$ generally parallel to the widthwise direction of the track system 16$_i$ provides a "pitch" capability to the idler wheel 50$_i$. In that sense, the axis of rotation $R_w$ of the axle 80 of the idler wheel 50$_i$ can be viewed as an additional "pitch" axis.

The resilient device 133 may be implemented in any other suitable way in other embodiments. For example, in some embodiments, the resilient device 133 may comprise a coil spring, a fluid spring or any other suitable type of spring rather than compliant material. For instance, in some embodiments, the resilient device may comprise an air bladder which may surround the axle 80 of the idler wheel 50$_i$ such that it may deform in each of the directions $C_1$-$C_S$ when subjected to a load.

Figure 33D:
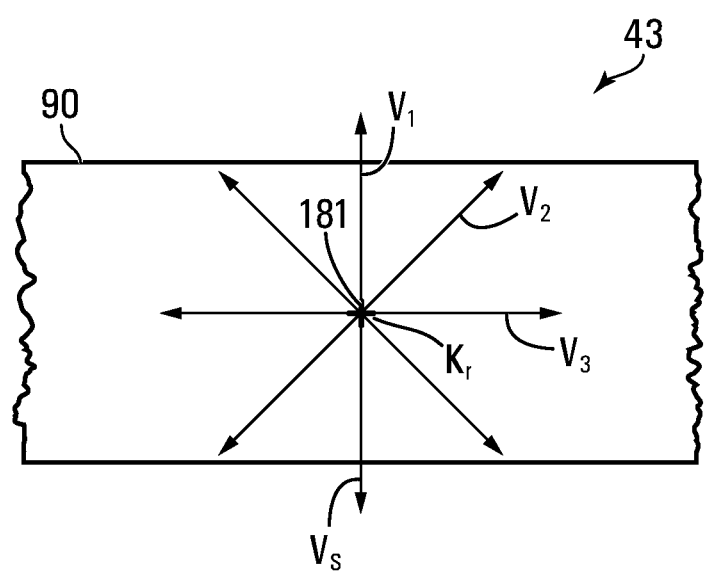
FIGS. 33D to 33F show a variant in which a pivot axis of a tandem of the track system is moveable from a rest position in a plurality of directions that are transversal to one another, in accordance with an embodiment of the invention.
Figure 33E:
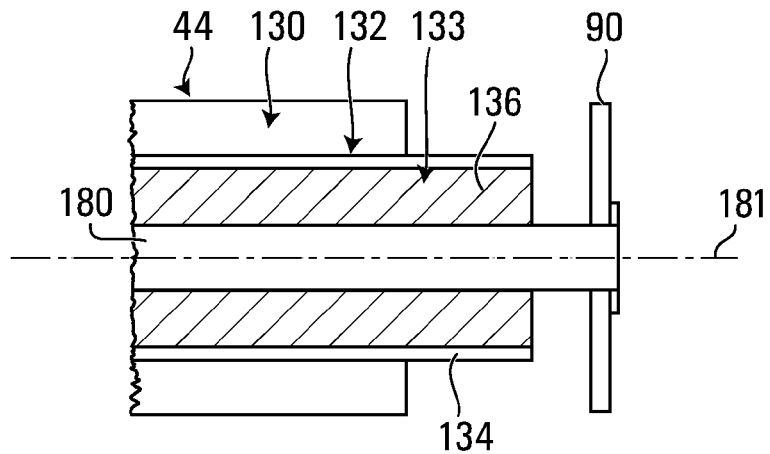
Figure 33F:
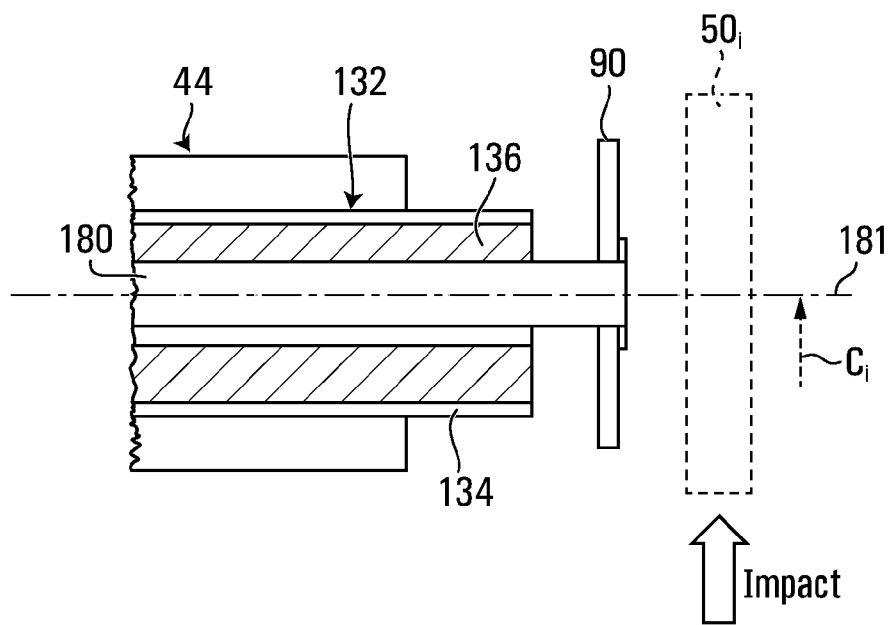

In some embodiments, as shown in FIGS. 33D to 33F, the track-engaging assembly 22 may be configured to allow movement of the pivot axis 181 of a tandem 43 carrying given ones of the idler wheels 50$_1$-50$_{12}$ relative to the drive wheel 42 such that, upon an impact on an idler wheel 50$_i$ carried by the tandem 43 when the ground is uneven, the pivot axis 181 of the tandem 43 is movable relative to the drive wheel 42 from a rest position $K_r$ in a plurality of directions $V_1$-$V_S$ that are transversal (i.e., nonparallel) to one another, similar to that described above in relation to the directions $C_1$-$C_S$ of the axis of rotation 76 of an idler wheel 50$_i$.

III. Enhanced Adjustment of Track about Track-Engaging Assembly

Figure 34:
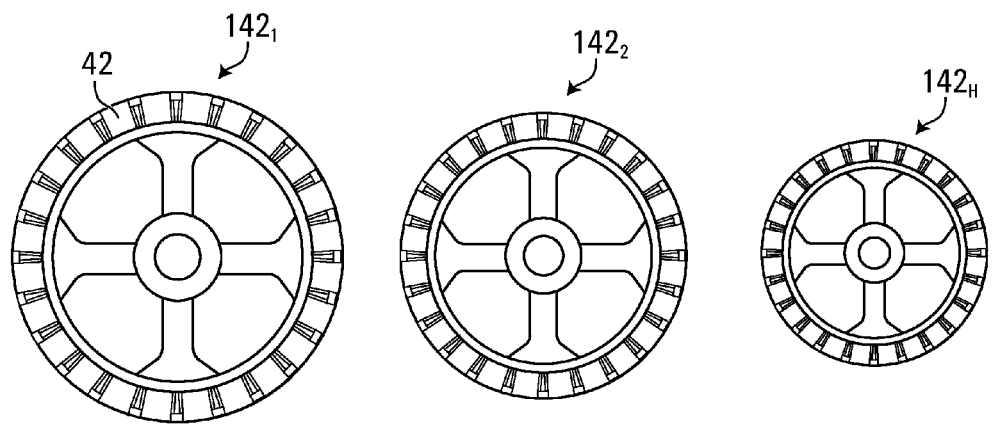
FIG. 34 shows a plurality of drive wheels of different sizes that may be part of the track system.

In some embodiments, the track system 16$_i$ may be configured to facilitate adjustment of the track 41 about the track-engaging assembly 22. For instance, in some cases, with additional reference to FIG. 34, this may be done to take into account that the drive wheel 42 may be one of a plurality of drive wheels 142$_1$-142$_H$ of different sizes (e.g., different diameters, different number of teeth in case of sprockets, etc.) that are usable within the track system 16$_i$.

Figure 35:
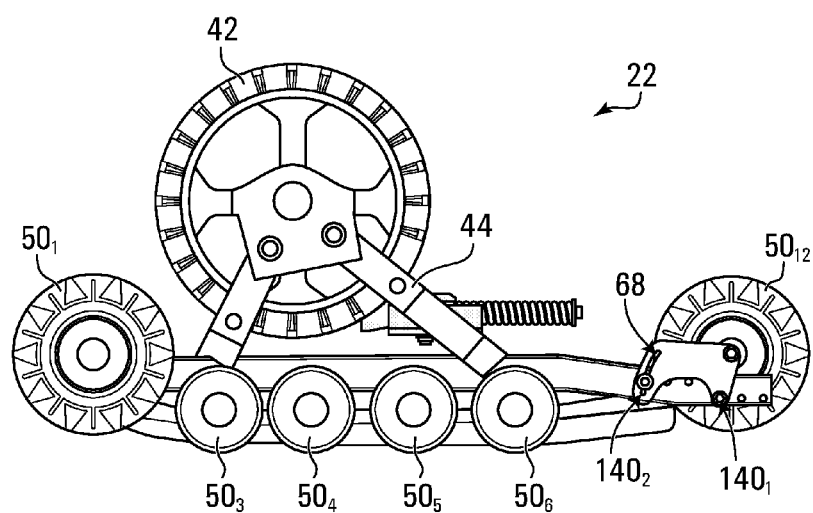
FIG. 35 shows a tensioner of the track system comprising a plurality of track adjusters in accordance with an embodiment of the invention.
Figure 36:
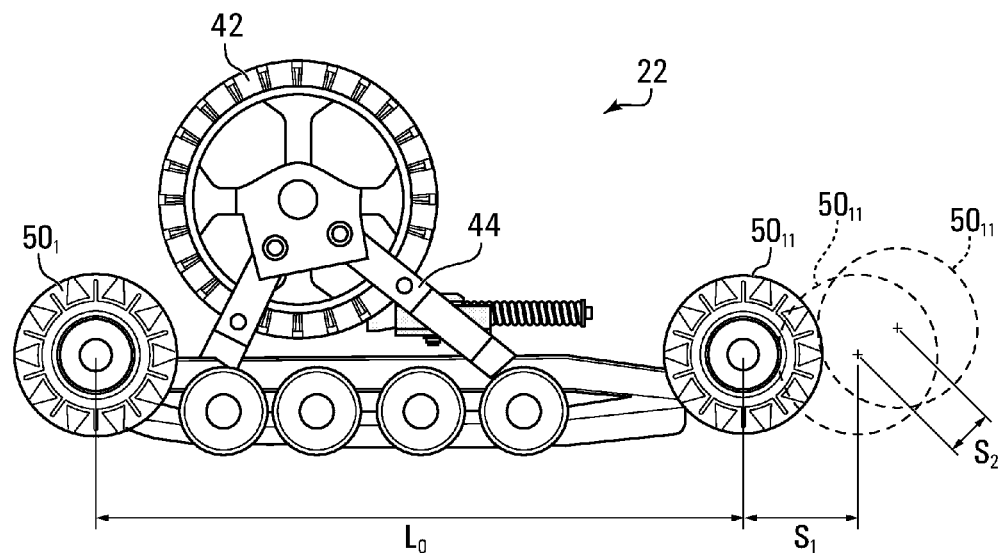
FIG. 36 shows a range of motion of each of a first one and a second one of the track adjusters.

For example, in some embodiments, with additional reference to FIGS. 35 and 36, the tensioner 68 may comprise a plurality of adjusters 140$_1$, 140$_2$ that allow different degrees of adjustment, i.e., different resolutions of adjustment, of the tension of the track 41. To this end, the adjusters 140$_1$, 140$_2$ allow different degrees of displacement (i.e., ranges of motion) $S_1$, $S_2$ of the leading and trailing idler wheels 50$_1$, 50$_{11}$ relative to one another.

For instance, as shown in FIG. 36, when the adjusters 140$_1$, 140$_2$ are set at their minimum extension setting, i.e., when the tensioner 68 is completely retracted, the leading and trailing idlers wheels 50$_1$, 50$_{11}$ are distanced by a distance $L_0$. When the adjuster 140$_1$ is set to its maximum extension setting, a distance between the leading and trailing idler wheels 50$_1$, 50$_{11}$ is increased by the range of motion $S_1$ of the adjuster 140$_1$. Likewise, when the adjuster 140$_2$ is set to its maximum extension setting, a distance between the leading and trailing idler wheels 50$_1$, 50$_{11}$ is increased by the range of motion $S_2$ of the adjuster 140$_2$.

In this embodiment, the adjuster 140$_1$ is a "macro" adjuster allowing a relatively greater degree of adjustment of the tension of the track 41 compared to the adjuster 140$_2$ (i.e., allows a greater range of motion $S_1$ of the idler wheels 50$_1$, 50$_{11}$ relative to one another), while the adjuster 140$_2$ is a "micro" adjuster allowing a relatively smaller degree of adjustment of the tension of the track 41 compared to the adjuster 140$_1$ (i.e., allows a smaller range of motion $S_2$ of the idler wheels 50$_1$, 50$_{11}$ relative to one another).

The ranges of motion $S_1$, $S_2$ of the macro and micro adjusters 140$_1$, 140$_2$ may have any suitable values. For instance, in some embodiments, a ratio $S_1/S_2$ of the range of motion $S_1$ of the macro adjuster 140$_1$ over the range of motion $S_2$ of the micro adjuster 140$_2$ may be at least 1.3, in some cases at least 1.5, in some cases at least 2, and in some cases even more (e.g., 3 or 4). This ratio may have any other suitable value in other embodiments.

More particularly, in this embodiment, the macro adjuster 140$_1$ is configured to adjust the tension of the track 41 based on a size of the drive wheel 42 of the plurality of drive wheels 142$_1$-142$_H$ that is installed on the track system 16$_i$. In contrast, the micro adjuster 140$_2$ is configured to fine tune the tension of the track 41 once the track 41 has already been adjusted to the drive wheel 42. That is, once the tension of the track 41 has been adjusted by the macro adjuster 140$_1$ in accordance with the size of the drive wheel 42, then the micro adjuster 140$_2$ is used to adjust the tension of the track 41 with a higher degree of sensitivity.

Various sizes of the drive wheels $142_1$-$142_H$ may be accommodated by the macro and micro adjusters $140_1$, $140_2$. For example, in some embodiments, a range of diameters of the drive wheels $142_1$-$142_H$ that the track system can accommodate may be from 200 to 630 mm, in some cases from 250 to 520 mm, and in some cases from 310 to 440 mm. As another example, in some embodiments, a range of numbers of teeth of the drive wheels $142_1$-$142_H$ that the track system $16_i$ can accommodate may be from 10 to 30 teeth, in some cases from 12 to 25 teeth, and in some cases from 15 to 21 teeth.

In this embodiment, with additional reference to FIGS. 37 to 39, the macro and micro adjusters $140_1$, $140_2$ of the tensioner 68 comprise a shared adjustment structure 150 that is mounted to the frame 44 of the track system $16_i$ and is configured to hold the axle 80 of the idler wheels $50_{11}$, $50_{12}$. More specifically, in this embodiment, the adjustment structure 150 is mounted to the frame 44 at two longitudinally distant points and is mounted at a third point to the axle 80 of the idler wheels $50_{11}$, $50_{12}$.

The adjustment structure 150 defines first and second longitudinal end portions 153, 155 and comprises an axle-receiving opening 152 adapted to receive the axle 80 of the idler wheels $50_{11}$, $50_{12}$, a fastener-receiving opening 154, and a curved slot 156 having a center of curvature coincidental with a center point of the fastener-receiving opening 154. The axle-receiving opening 152 and the fastener-receiving opening 154 are located adjacent the first longitudinal end portion 153 of the adjustment structure 150, while the curved slot 156 is located adjacent the second longitudinal end portion 155.

The frame 44 of the track system $16_i$ is configured to be connected to the adjustment structure 150. To this end, and as best shown in FIG. 39, the frame 44 comprises a first set of holes $162_1$-$162_H$ and a second set of holes $164_1$-$164_H$. Each hole $162_i$ of the first set of holes $162_1$-$162_H$ is spaced from an adjacent hole $162_j$ by a distance $D_H$ and, in a similar manner, each hole $164_i$ of the second set of holes $164_1$-$164_H$ is spaced from an adjacent hole $164_j$ by the same distance $D_H$. This distance $D_H$ defines an increment of the range of motion $S_1$ of the macro adjuster $140_1$ and thus the range of motion $S_1$ of the macro adjuster $140_1$ is a multiple of the distance $D_H$. Moreover, each hole $162_i$ is spaced apart from a corresponding hole $164_j$ by a distance $R_C$ corresponding to a radius of curvature of the curved slot 156.

In order to adjust the tension of the track 41, a "rough" adjustment is first carried out through the macro adjuster $140_1$ in order to position the axle 80 of the idler wheels $50_{11}$, $50_{12}$ at an approximate desired position, i.e., achieving an approximate desired tension of the track 41. The rough adjustment consists of first moving the adjustment structure 150 so as to align its fastener-receiving opening 154 with a hole $162_i$ on the frame 44. This results in a translation of the axle 80 of the idler wheels $50_{11}$, $50_{12}$ in the longitudinal direction of the track system $16_i$ by a multiple of the distance $D_H$. In other words, the smallest possible displacement of the axle 80 through the macro adjuster $140_1$ is equal to the distance $D_H$ while the largest possible displacement of the axle 80 through the macro adjuster $140_1$ is equal to the range of motion $S_1$. The first fastener 158 is then inserted into the fastener-receiving opening 154 and engaged with the hole $162_i$.

A "fine" adjustment of the tension of the track 41 can then be carried out through the micro adjuster $140_2$. This is achieved by pivoting the adjustment structure 150 about the fastener-receiving opening 154 (and the fastener 158) which causes the axle 80 of the idler wheels $50_{11}$, $50_{12}$ to be displaced in a curvilinear motion corresponding to a rotation centered about the fastener-receiving opening 154 and having a radius of curvature equal to a distance between the fastener-receiving opening 154 and the axle-receiving opening 152. The micro adjuster $140_2$ thus allows the axle 80 to be displaced along the longitudinal and height directions of the track system $16_i$. Moreover, the range of motion $S_2$ of the micro adjuster $140_2$ is not subject to increments (e.g., as in the increments $D_H$ of the range of motion $S_1$) since the curved slot 156 is an open channel allowing an infinite number of positions within its boundaries, i.e., its length.

Once the desired tension of the track 41 is achieved, the fastener 158 is securely fastened to the hole $162_i$ and the fastener 160 is inserted into the curved slot 156 and securely fastened to the hole $164_i$ thus fixing the adjustment structure 150 in place.

In this embodiment, the macro adjuster $140_1$ is a discrete adjuster. That is, the macro adjuster $140_1$ allows the axle 80 of the idler wheels $50_{11}$, $50_{12}$ to occupy a finite number of positions relative to the idler wheel $50_1$. More particularly, since the first set of holes $162_1$-$162_H$ comprises three holes, then this allows the axle 80 of the idler wheels $50_{11}$, $50_{12}$ to occupy three distinct positions, each position distanced to an adjacent position by the increment $D_H$ of the range of motion $S_1$. Conversely, the micro adjuster $140_2$ is a continuous adjuster. That is, the micro adjuster $140_2$ allows the axle 80 of the idler wheels $50_{11}$, $50_{12}$ to occupy a substantially infinite number of positions. More particularly, because the curved slot 156 is an open channel, the axle 80 of the idler wheels $50_{11}$, $50_{12}$ can occupy an infinite number of positions that is only limited by the boundaries of the curved slot 156, i.e., its length.

Moreover, in this embodiment, the range of motion $S_2$ of the micro adjuster $140_2$ is equal to or greater than the increment $D_H$ of the range of motion $S_1$. This can allow the axle 80 of the idler wheels $50_{11}$, $50_{12}$ to occupy any position between the finite number of positions offered by the macro adjuster $140_1$.

The adjustment structure 150 and/or the frame 44 to which it is coupled may be configured in any other suitable way in other embodiments. For example, although in this embodiment each set of holes on the frame 44 is illustrated as comprising three holes, in other embodiments each set of holes may comprise any number of holes equal or greater than two. As another example, in some embodiments, the curved slot 156 and the set of holes $164_1$-$164_H$ may be interchanged. That is, in some embodiments, the adjustment structure 150 may comprise a hole in place of the curved slot 156, and the frame 44 may comprise a set of curved slots in place of the set of holes $164_1$-$164_H$. In such embodiments, an additional fastener component may be used to receive the fastener 160.

Each of the adjusters $140_1$, $140_2$ of the tensioner 68 may be implemented using any other suitable mechanism in other embodiments.

Figure 40:
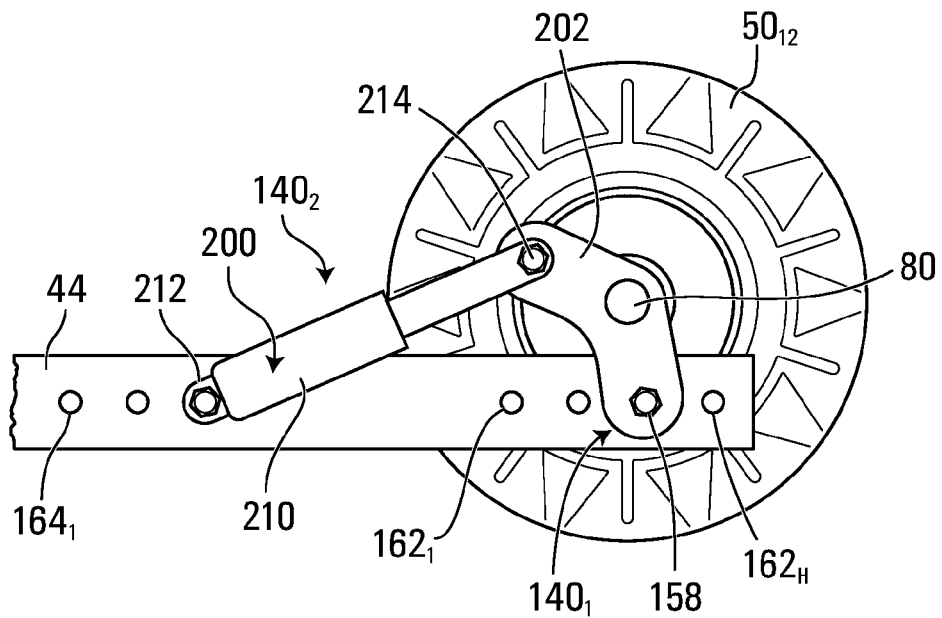
FIG. 40 shows an embodiment in which one of the adjusters of the tensioner is implemented by a resilient device.

For example, in some embodiments, with additional reference to FIG. 40, the micro adjuster $140_2$ may comprise a resilient device 200. In this example, the tensioner 68 comprises a support plate 202 configured for connecting the frame 44 of the track system $16_i$ with the axle 80 of the idler wheels $50_{11}$, $50_{12}$. The support plate 202 is configured to receive the axle 80 at an axle-receiving opening and can be mounted at one end portion to a hole $162_i$ of the set of holes $162_1$-$162_H$. Another end portion of the support plate 202 may be connected to the frame 44 via the resilient device 200 which is mounted to the frame 44 at a hole $164_i$ of the set of holes 1641-164H.

In use, the macro adjuster $140_1$ is adjusted by mounting the support plate 202 to a given hole $162_x$ and mounting the resilient device 200 at a corresponding hole $164_x$. This allows the macro adjuster $140_1$ to displace the position of the axle 80 of the idler wheels $50_{11}$, $50_{12}$ in the longitudinal direction of the track system $16_i$.

In this example, the resilient device 200 comprises a hydraulic actuator 210 that can selectively extend and retract its length. At one end, the hydraulic actuator 210 is mounted to the frame 44 at a hole $164_i$ via a pin 212 and is pivotable about the pin 212. At its other end, the hydraulic actuator 210 is mounted to the support plate 202 at a point 214.

Thus, in use, the micro adjuster $140_2$ is adjusted by extending or retracting the length of the hydraulic actuator 210. This causes a pivoting motion of the support plate 202 about the given hole $162_x$ to which the support plate 202 is mounted which in turn causes the axle 80 of the idler wheels $50_{11}$, $50_{12}$ to be displaced in a curvilinear motion corresponding to a rotation centered about the fastener 158 and having a radius of curvature equal to a distance between the fastener 158 and the axle 80. The micro adjuster $140_2$ thus allows the axle 80 to be displaced along the longitudinal and height directions of the track system $16_i$.

Other resilient devices may be used instead of a hydraulic actuator in other embodiments (e.g., a pneumatic actuator, a coil spring, etc.).

Figure 41:
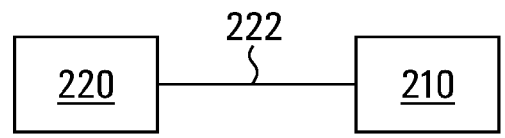
FIG. 41 shows how the resilient device of the tensioner of FIG. 40 may be controlled automatically.

In some embodiments, as shown in FIG. 41, the adjusters $140_1$, $140_2$ may be configured to automatically adjust the position of the axle 80 of the idler wheels $50_{11}$, $50_{12}$ in response to an input of the user on a control 220. The control 220 may comprise any control that is able to receive an input from the user (e.g., a lever, a button, etc., which may be physical or virtual on a display). Moreover, the control 220 may be located at any place on the track system $16_i$ that is accessible to the user.

For instance, in this embodiment, as illustrated in FIG. 41, the hydraulic actuator 210 may be actuated (i.e., extend or retract its length) in response to an input from the user on the control 220. To this end, the control 220 comprises a connection 222 linking the hydraulic actuator 210 to the control 220 and configured to transmit a signal received from the control 220 to the hydraulic actuator 210.

Although in the above embodiment there are two adjusters $140_1$, $140_2$, the tensioner 68 may comprise three, four or more adjusters that allow different degrees of adjustment of the tension of the track 41 in other embodiments.

IV. Enhanced Adjustment of Track System on ATV

In some embodiments, the track system $16_i$ may be configured to facilitate its installation and adjustment on the ATV 10. For instance, the track system $16_i$ may be configured to help properly orient the track system $16_i$ relative to the frame 11 of the ATV 10 to reduce potential for abnormal wear and/or performance of the track system $16_i$.

Figure 42:
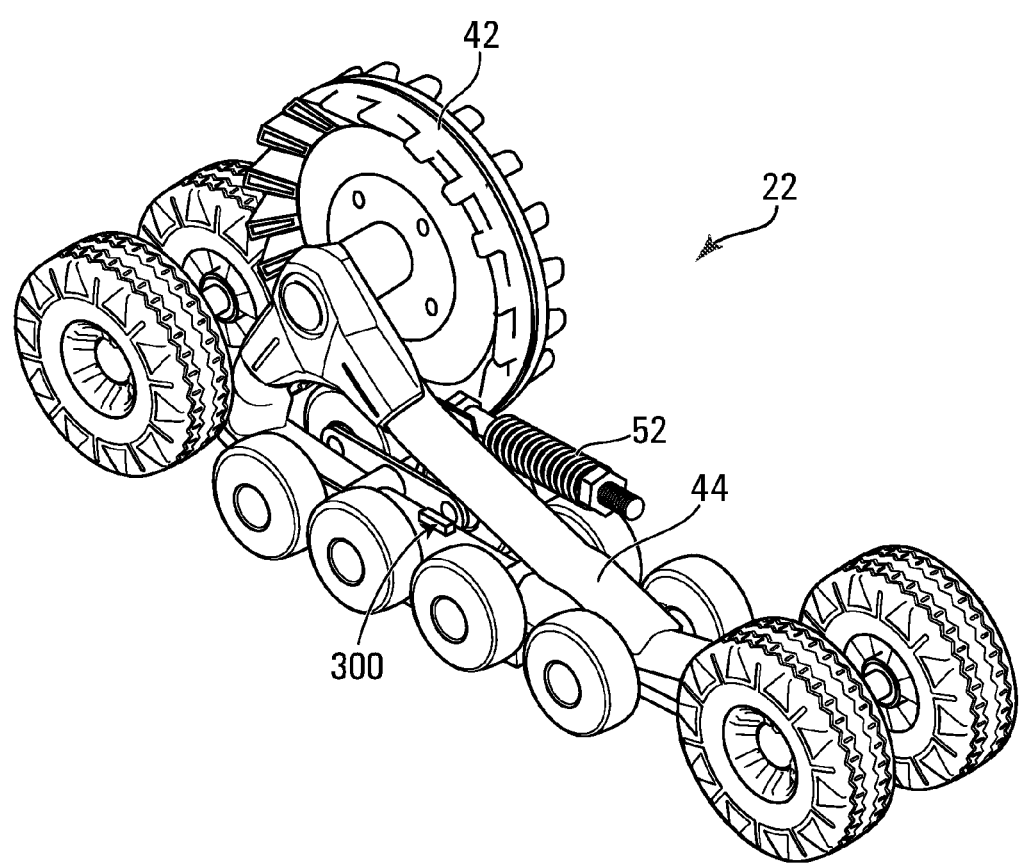
FIG. 42 shows an indicator for indicating whether the track system is properly oriented in accordance with an embodiment of the invention.
Figure 43:
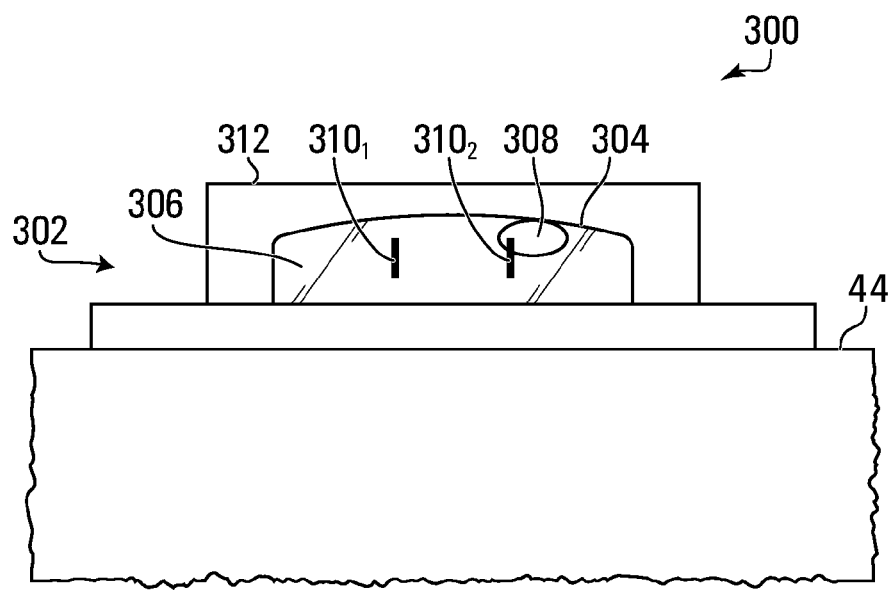
FIGS. 43 and 44 show an embodiment in which the indicator comprises a level.

For example, in some embodiments, with additional reference to FIGS. 42 and 43, the ATV 10 equipped with the track system $16_i$ may comprise an indicator 300 providing an indication of an orientation of the track system $16_i$ relative to the frame 11 of the ATV 10 to indicate whether the track system $16_i$ is properly oriented.

In this embodiment, the indicator 300 helps to adjust the caster (i.e., caster angle) of the track system $16_i$ located at the front of the ATV 10. The caster of the track system $16_i$ is the angle between a vertical axis traversing the axle of the drive wheel 42 and the steering axis 29. Adjusting the caster of the track system $16_i$ correctly such that the track system $16_i$ is properly oriented may allow the track system $16_i$ to perform more optimally. Conversely, an incorrect adjustment of the caster of the track system $16_i$ can cause abnormal wear of the track system $16_i$ and have an overall negative effect on the performance of the track system $16_i$.

The indication provided by the indicator 300 can be provided in various ways in various embodiments.

In this embodiment, the indication provided by the indicator 300 includes a visual indication of the caster of the track system $16_i$. For example, the indicator 300 may comprise a component that is moveable such that its position provides the visual indication of the caster of the track system $16_i$. To this end, the indicator 300 is positioned on the track system $16_i$ in an area that is visible to the user such that the visual indication of the indicator 300 may be perceived by the user. In this example, the indicator 300 is located on a lower portion of the frame 44.

Figure 44:
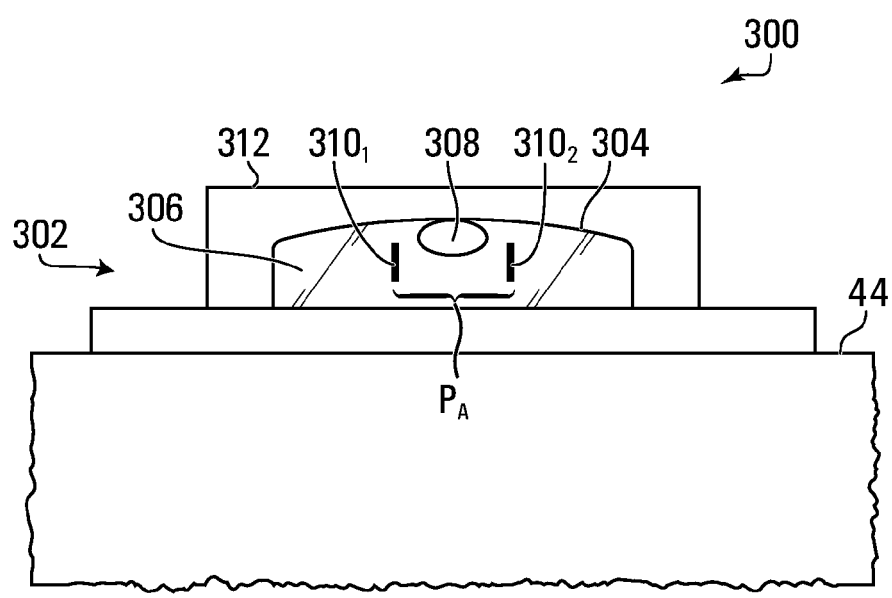

In some examples of implementation, as shown in FIG. 43, the indicator 300 provides the visual indication of the proper orientation of the track system $16_i$ through a fluid 306. For example, in this embodiment, the indicator 30 comprises a level 302 configured to help the user adjust the caster of the track system $16_i$. The level 302 comprises a vial 304 containing the fluid 306 and a bubble 308 (e.g., an air bubble) and may be encased in a housing 312. The fluid 306 and the bubble 308 are moveable within the vial 304 according to the orientation of the track system $16_i$. That is, when the orientation of the track system $16_i$ changes, the fluid 306 moves within the vial 304 and a position of the bubble 308 is shifted accordingly. As shown in FIGS. 43 and 44, the bubble 308 moves from a first position at a first orientation of the track system $16_i$ to a second position at a second orientation of the track system $16_i$.

The level 302 is configured such that an adjusted position PA of the bubble 308 within the vial 304 is indicative of the proper orientation of the track system $16_i$. To aid the user in placing the bubble 308 in the adjusted position PA, the vial 304 may comprise a plurality of marks $310_1$, $310_2$ on its outer periphery to act as a visual guide for the user. For instance, the adjusted position PA may be indicated by the plurality of marks $310_1$, $310_2$ such that when the bubble 308 is placed in an area demarcated by the plurality of marks $310_1$, $310_2$, the caster of the track system $16_i$ is properly adjusted and thus the track system $16_i$ is properly oriented. In some embodiments, the vial 304 may comprise a single mark to which the bubble 308 may be centered in order for the track system $16_i$ to be properly oriented.

Figure 45:
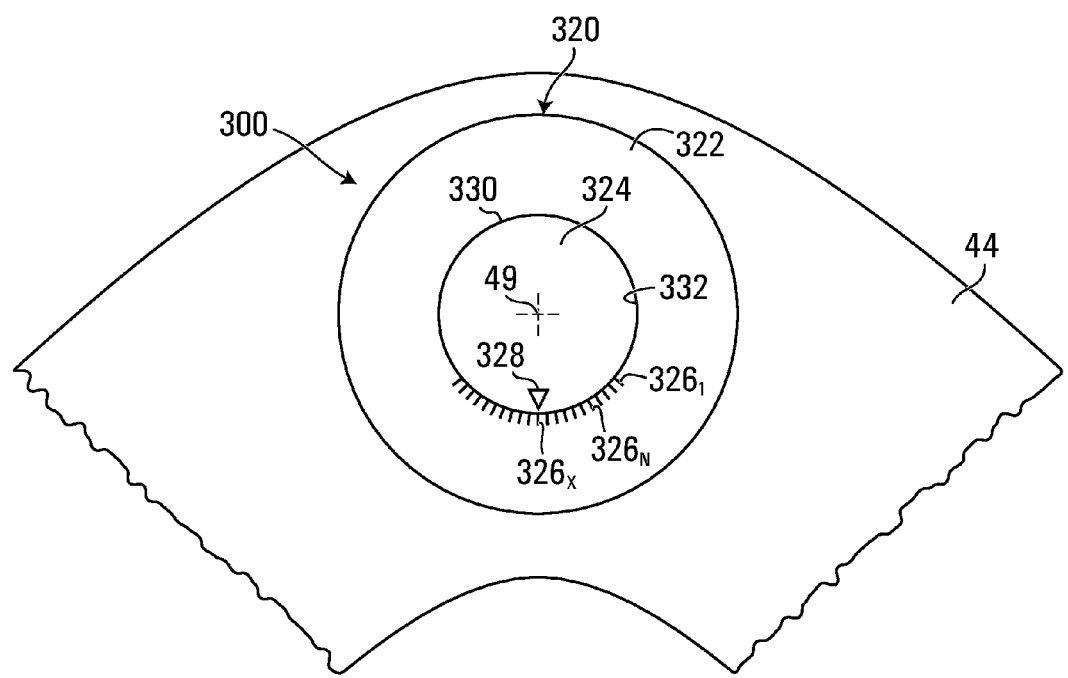
FIGS. 45 and 46 show a variant of the indicator that comprises a dial.
Figure 46:
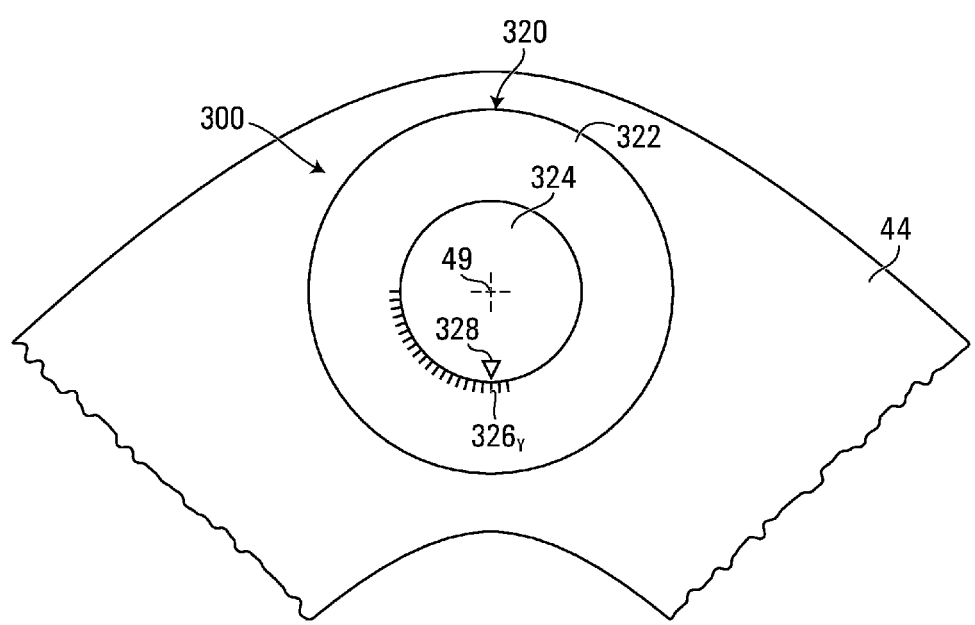

In other examples of implementation, as shown in FIGS. 45 and 46, the indicator 300 may provide the visual indication of the adjustment of the caster of the track system $16_i$ through a reference line 328. For instance, in this embodiment, the indicator 300 comprises a dial 320 including the reference line 328 that provides the user installing the track system $16_i$ on the ATV 10 with a reading indicative of the orientation of the track system $16_i$.

In this embodiment, the dial 320 is mounted on the frame 44 of the track system $16_i$ at a hub of the drive wheel 42 and is thus coincident with the axis of rotation 49 of the drive wheel 42. The dial 320 comprises a first part 322 and a second part 324, the first and second parts 322, 324 being configured to be moveable (i.e., rotatable) relative to one another.

The first part 322 is fixed to the frame 44 of the track system $16_i$ and thus is precluded from changing orientation relative to the frame 44. In some embodiments, the first part 322 may be made integrally with the frame 44. In addition, the first part 322 comprises a plurality of marks $326_1$-$326_N$ that are distributed along an inner periphery 330 of the first part 322. The plurality of marks 3261-326N may have an associated reading adjacent each mark $326_i$ (e.g., 1°, 2°, 3°, etc.).

The second part 324 is configured to consistently indicate a specific direction. To this end, the second part 324 is rotatable relative to the frame 44. For example, the second part 324 may be mounted to the frame 44 via a bearing. In this embodiment, the second part 324 comprises the reference line 328 that consistently points vertically downwards and is located at an outer periphery 330 of the second part 324. That is, the reference line 328 always points in a direction normal to the ground assuming that the ground is horizontal. This may be achieved in various ways. For example, the second part 324 may be made imbalanced. For instance, a section of the second part 324 in which the reference line 328 is located may be made heavier such that when the second part 324 rotates freely, the reference line 328 always ends up pointing vertically downwards.

Thus in use, when the track system $16_i$ is installed on the ATV 10 and is at a first position defining a first caster angle, the reference line 328 points vertically downwards and coincides with a given mark $326_x$ of the first part 322. The given mark $326_x$ which may be associated with a caster reading (e.g., 0°) may indicate to the user that the track system $16_i$ is not set at its proper caster setting. Thus, as the user modifies the caster of the track system $16_i$, the frame 44 pivots about the axis of rotation 49, such that the first part 322 pivots about the second part 324 while the second part 324 maintains its orientation (i.e., the reference line 328 points vertically downwards). At a second position, the reference line 328 is aligned with another mark $326_y$ that may be associated with a reading (e.g., 6°) that indicates to the user that the caster of the track system $16_i$ is correctly adjusted and thus the track system $16_i$ is properly oriented.

Figure 47:
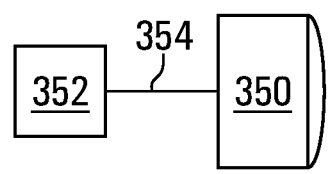
FIGS. 47 and 48 show another variant in which the indicator comprises a lighting element.
Figure 48:
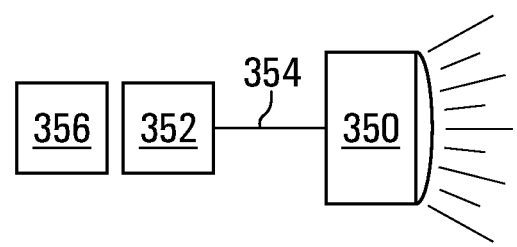

In other examples of implementation, as shown in FIGS. 47 and 48, the indicator 300 provides the visual indication of the proper orientation of the track system $16_i$ by a luminous signal conveyed via a lighting element 350 (e.g., a light). For instance, in this embodiment, the lighting element 350 is configured to change its state of illumination (e.g., illuminate or cease being illuminated) when the caster of the track system $16_i$ is properly adjusted.

More particularly, in this embodiment, the lighting element 350 is connected to a switch 352 via a connection 354. In this embodiment, the switch 352 is a magnetic switch (i.e., a switch that reacts to an applied magnetic field), however the switch 352 may be any other suitable type of switch in other embodiments (e.g., pressure switch, toggle switch, etc.). Moreover, the switch 352 is a normally open switch such that an electrical signal is precluded from travelling through an electrical circuit of the switch 352 unless the switch 352 is actuated.

A contact 356 is configured to actuate the switch 352 when the track system $16_i$ is properly oriented. To this end, the contact 356 may be fixed to the track system $16_i$ at a location that is proximate to the switch 352 when the caster of the track system $16_i$ is correctly adjusted. In this embodiment, the contact 356 is a magnetized contact, i.e., having a magnetic field.

When the contact 356 is moved proximate to the switch 352 (i.e., the caster of the track system $16_i$ is correctly adjusted), the magnetic field of the contact 356 actuates the switch 352 causing the electrical circuit of the switch 352 to close. This causes an electrical voltage to be sent to the lighting element 350 which consequently illuminates. The lighting element 350 thus provides a light signal that is visible to the user and indicates that the caster of the track system $16_i$ has been correctly adjusted.

Figure 49:
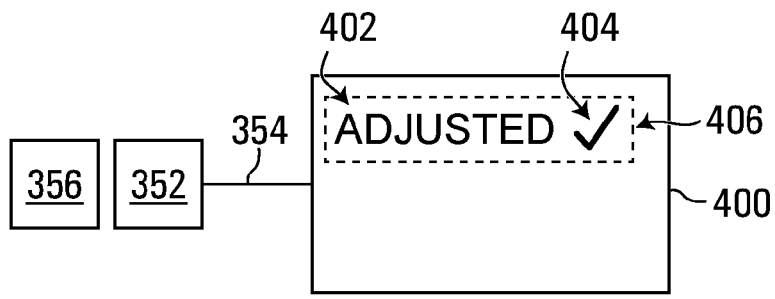
FIG. 49 shows another variant in which the indicator comprises a notification displayed on a display.

In other examples of implementation, as shown in FIG. 49, the indicator 300 provides the visual indication of the proper orientation of the track system $16_i$ by a notification 406 (e.g., a message, an icon or other graphic, etc.) displayed on a display 400 and alerting the user that the track system $16_i$ is or is not properly oriented.

For instance, in this embodiment, the display 400 is connected to the switch 352 via the connection 354. When the switch 352 is actuated by the contact 356, a signal is sent to the display 400 which responds by displaying the notification 406. For example, the notification 406 may comprise a message 402, a graphic 404 and/or any other suitable visual indication that alerts the user that the track system $16_i$ is or is not properly oriented.

The indicator 300 may be implemented in various other ways in other embodiments.

Figure 50:
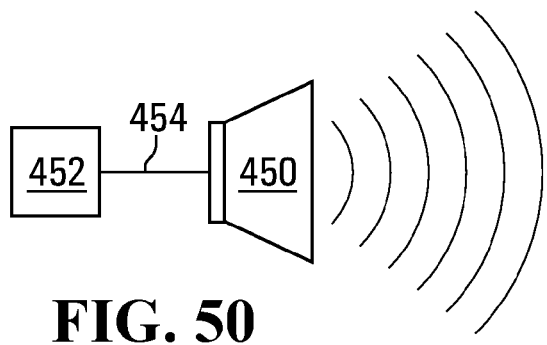
FIGS. 50 and 51 show another variant in which the indicator provides an audible signal.
Figure 51:
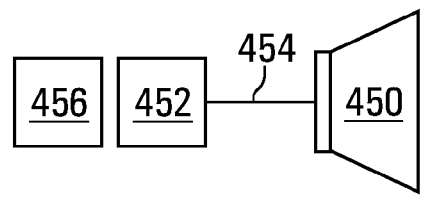

For instance, in some embodiments, the indicator 300 may instead or additionally emit an audible signal to indicate that the track system $16_i$ is or is not correctly adjusted. In one example of implementation, with additional reference to FIGS. 50 and 51, a speaker 450 is connected to a switch 452 via a connection 454. In this example, the switch 452 is a normally closed switch such that an electrical circuit of the switch 452 is closed when the switch 452 is not actuated. The speaker 450 emits a sound (e.g., an alarm) when the electrical circuit of the switch 452 is closed (i.e., in a non-actuated state of the switch 452). A contact 456 is configured to actuate the switch 452. That is, when the contact 456 is moved proximate to the switch 352 (i.e., the track system $16_i$ is properly oriented), the contact 456 actuates the switch 452 causing the electrical circuit of the switch 452 to open. Consequently, the speaker 450 does not emit sound. This may indicate to the user that the track system $16_i$ is properly oriented.

In yet other embodiments, the indicator 300 may indicate that the track system $16_i$ is properly or improperly oriented by selectively allowing or preventing use of the track system $16_i$. Thus, the indication of the proper orientation of the track system $16_i$ provided by the indicator 300 in such embodiments is implicit, whereas the indication of the proper orientation of the track system $16_i$ provided by the indicator 300 in embodiments considered previously is explicit (e.g., a visual and/or audible indication).

Figure 52:
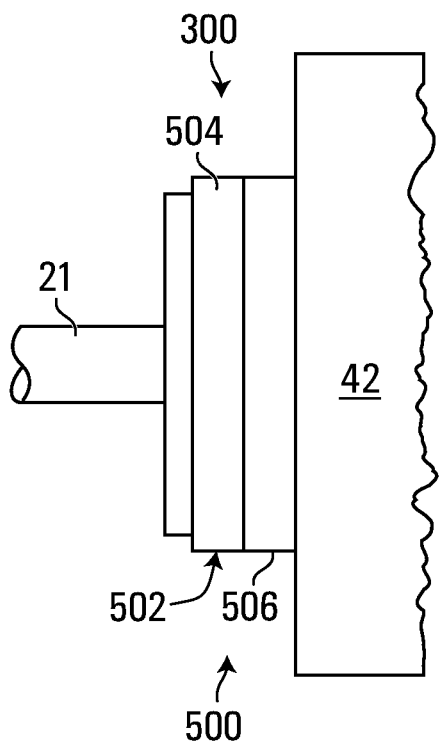
FIG. 52 shows another variant in which the indicator comprises a locking mechanism configured to indicate whether the track system is properly oriented by selectively preventing or allowing the track system to operate.

For instance, with additional reference to FIG. 52, the indicator 300 may comprise a locking mechanism 500 for selectively allowing or preventing the drive wheel 42 from being driven by the axle 21 of the ATV 10. The locking mechanism 500 thus provides the user with a "lock indication" whereby the drive wheel 42 being driven by the axle 21 of the ATV 10 serves as an implicit indication that the caster of the track system $16_i$ is correctly adjusted. More specifically, in this embodiment, the locking mechanism 500 comprises a clutch 502 comprising a driving part 504 that is fixedly engaged and rotated by the axle 21 of the ATV 10, and a driven part 506 that can be selectively engaged and disengaged from being rotated by the driving part 504. The driving part 504 of the clutch 502 is engaged to the axle 21 of the ATV 10 in any suitable way (e.g., bolting onto a hub of the ATV 10) while the driven part 506 of the clutch 502 is selectively engaged to the driving part 504 via a releasable engagement (e.g., a releasable frictional engagement). For instance, in this embodiment, the driven part 506 is selectively engaged to the driving part 504 via a friction disc in each of the driving and driven parts 504, 506. When the friction discs of each of the driving and driven parts 504, 506 are engaged to one another (i.e., pressed together), the driven part 504 is driven by the driving part 506 such that the driven part 504 acquires the rotational motion of the driving part 504.

Figure 53:
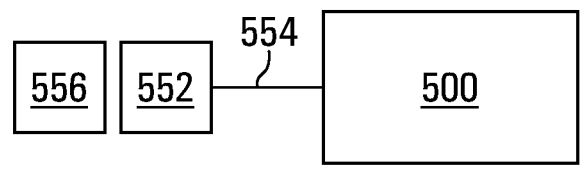
FIG. 53 shows how the locking mechanism is controlled automatically.

The locking mechanism 500 is actuated automatically such that the clutch 502 acquires an engaged or disengaged state in response to a signal. In this embodiment, with reference to FIG. 53, the locking mechanism 500 is connected to a switch 552 similar to the switch 352 described above via a connection 554. The switch 552 is responsive to a contact 556 configured to actuate the switch 552 when the track system 16$_i$ is properly oriented. For instance, the contact 556 may be fixed to the track system 16$_i$ at a location that is proximate to the switch 552 when the caster of the track system 16$_i$ is correctly adjusted.

In use, when the contact 556 is moved proximate to the switch 552 (i.e., the caster of the track system 16$_i$ is correctly adjusted), the contact 556 actuates the switch 552. This causes the switch 552 to send a signal to the locking mechanism 500 which is actuated in response to the signal (i.e., the driven part 506 of the clutch 502 is engaged to the driving part 504). In this way, the drive wheel 42 can only be driven and impart motion to the track 41 when the caster of the track system 16$_i$ is correctly adjusted. On the other hand, when the caster of the track system 16$_i$ is not correctly adjusted, the locking mechanism 500 prevents the drive wheel 42 from being driven by the axle 21 of the ATV 10.

The locking mechanism 500 may be implemented in any other suitable way in other embodiments.

In some embodiments, the indicator 300 may indicate the proper orientation of the track system 16$_i$ via a combination of two or more of a visual indication, an audible indication, and a lock indication.

While in this embodiment the indicator 300 is part of the track system 16$_i$, the indicator 300 may be part of the ATV 10 but outside of the track system 16$_i$ in other embodiments.

For instance, in some embodiments, the indicator 300 may be located adjacent to the track system 16$_i$. For example, the indicator 300 may be located on the frame 11 of the ATV 10 and adjacent to the track system 16$_i$.

In other embodiments, the indicator 300 may be part of the user interface 20 of the ATV 10. For example, the lighting element 350 and/or the display 400 may be part of the user interface 20 such that when the user is on the ATV 10.

Figure 54:
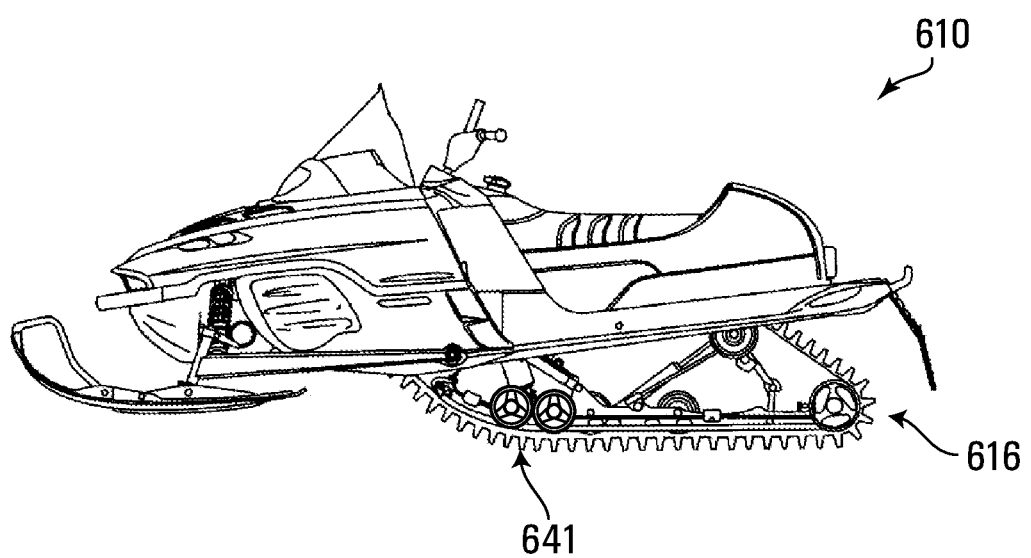
FIG. 54 shows a track system of a snowmobile in accordance with an embodiment of the invention.

While in this embodiment the track system 16$_i$ is part of an ATV, in other embodiments, a track system constructed according to principles discussed herein may be used as part of other types of off-road vehicles. For example, in some embodiments, as shown in FIG. 54, a track system 616 including a track 641 constructed according to principles discussed herein may be used as part of a snowmobile 610.

The ATV 10 and the snowmobile 610 considered above are examples of recreational vehicles. While they can be used for recreational purposes, such recreational vehicles may also be used for utility purposes in some cases. Also, while these examples pertain to recreational vehicles, a track system constructed according to principles discussed herein may be used as part of off-road vehicles other than recreational ones.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track system for traction of an off-road vehicle, the track system being configured to be mounted in place of a ground-engaging wheel of the off-road vehicle, the track system comprising:
   a track comprising a ground-engaging outer surface for engaging the ground and an inner surface opposite to the ground-engaging outer surface;
   a track-engaging assembly around which the track is disposed, the track-engaging assembly comprising a drive wheel for driving the track and a plurality of idler wheels contacting a bottom run of the track; and
   a compensator to compensate for an alignment setting of a suspension of the off-road vehicle when the track system is mounted in place of the ground-engaging wheel of the off-road vehicle, the compensator comprising a resilient mount connected to a given one of the idler wheels and allowing movement of an axis of rotation of the given one of the idler wheels relative to an axis of rotation of the drive wheel, the resilient mount comprising compliant material receiving an axle and resiliently deformable to allow the movement of the axis of rotation of the given one of the idler wheels relative to the axis of rotation of the drive wheel, the resilient mount being configured to allow the movement of the axis of rotation of the given one of the idler wheels relative to the axis of rotation of the drive wheel such that the axis of rotation of the given one of the idler wheels becomes transversal to the axis of rotation of the drive wheel.

2. The track system of claim 1, wherein the compensator is configured such that a contact patch of the ground-engaging outer surface of the track when the ground is horizontal extends over at least 30% of a width of the track.

3. The track system of claim 1, wherein the compensator is configured to such that a contact patch of the ground-engaging outer surface of the track when the ground is horizontal extends over at least a majority of a width of the track.

4. The track system of claim 1, wherein the compensator is configured such that a contact patch of the ground-engaging outer surface of the track when the ground is horizontal extends over substantially an entirety of a width of the track.

5. The track system of claim 1, wherein the compensator is configured such that the track-engaging assembly exerts pressure on an area of a bottom run of the track that is inboard of the drive wheel in a widthwise direction of the off-road vehicle and an area of the bottom run of track that is outboard of the drive wheel in the widthwise direction of the off-road vehicle.

6. The track system of claim 1, wherein the compensator is configured such that the track-engaging assembly orients at least 30% of a cross-section of a bottom run of the track transversally to the axis of rotation of the drive wheel.

7. The track system of claim 1, wherein the compensator is configured such that the track-engaging assembly orients at least a majority of a cross-section of a bottom run of the track transversally to the axis of rotation of the drive wheel.

8. The track system of claim 1, wherein the compensator is configured such that the track-engaging assembly orients at least 90% of a cross-section of a bottom run of the track transversally to the axis of rotation of the drive wheel.

9. The track system of claim 1, wherein the compensator is configured to allow axes of rotation of the idler wheels to be transversal to the axis of rotation of the drive wheel.

10. The track system of claim 1, wherein: the track-engaging assembly comprises a plurality of idler wheels contacting a bottom run of the track; the compensator is configured to allow an axis of rotation of a given one of the idler wheels to be transversal to an axis of rotation of the drive wheel; and the compensator is configured to allow an angle between the axis of rotation of the given one of the idler wheels and the axis of rotation of the drive wheel of at least 4°.

11. The track system of claim 1, wherein: the track-engaging assembly comprises a plurality of idler wheels contacting a bottom run of the track; the compensator is configured to allow an axis of rotation of a given one of the idler wheels to be transversal to an axis of rotation of the drive wheel; and the compensator is configured to allow an angle between the axis of rotation of the given one of the idler wheels and the axis of rotation of the drive wheel of at least 8°.

12. The track system of claim 1, wherein: the compensator is configured to allow rotation of the axis of rotation of the given one of the idler wheels relative to the axis of rotation of the drive wheel about an axis transversal to a widthwise direction of the track system.

13. The track system of claim 12, wherein the axis transversal to the widthwise direction of the track system is parallel to a longitudinal direction of the track system.

14. The track system of claim 1, wherein the resilient mount engages an axle of the given of the idler wheels.

15. The track system of claim 1, wherein: the given one of the idler wheels is a first one of the idler wheels; the track-engaging assembly comprises a frame and a link that carries the first one of the idler wheels and a second one of the idler wheels and is pivotable relative to the frame about an axle defining a pivot axis; and the resilient mount engages the axle defining the pivot axis of the link.

16. The track system of claim 1, wherein the compliant material receives the axis of rotation of the given one of the idler wheels.

17. The track system of claim 1, wherein: the given one of the idler wheels is a first one of the idler wheels; the track-engaging assembly comprises a frame and a link that carries the first one of the idler wheels and a second one of the idler wheels and is pivotable relative to the frame about an axle defining a pivot axis; and the compliant material receives the axle defining the pivot axis.

18. The track system of claim 1, wherein the resilient mount is configured such that the axis of rotation of the given one of the idler wheels is movable relative to the drive wheel from a rest position in a plurality of directions of movement that are transversal to one another.

19. The track system of claim 18, wherein the directions of movement of the axis of rotation of the given one of the idler wheels include at least three directions of movement that are transversal to one another.

20. The track system of claim 18, wherein the directions of movement of the axis of rotation of the given one of the idler wheels include at least five directions of movement that are transversal to one another.

21. The track system of claim 18, wherein the directions of movement of the axis of rotation of the given one of the idler wheels include at least ten directions of movement that are transversal to one another.

22. The track system of claim 18, wherein the axis of rotation of the given one of the idler wheels is omnidirectionally movable relative to the drive wheel from the rest position.

23. The track system of claim 18, wherein a ratio of (i) a distance by which the axis of rotation of the given one of the idler wheels is moveable relative to the drive wheel in each of the directions of movement over (ii) a diameter of the given one of the idler wheels is at least 0.04.

24. The track system of claim 18, wherein a ratio of (i) a distance by which the axis of rotation of the given one of the idler wheels is moveable relative to the drive wheel in each of the directions of movement over (ii) a diameter of the given one of the idler wheels is at least 0.1.

25. The track system of claim 18, wherein a ratio of (i) a distance by which the axis of rotation of the given one of the idler wheels is moveable relative to the drive wheel in each of the directions of movement over (ii) a diameter of the given one of the idler wheels is at least 0.25.

26. The track system of claim 1, wherein the compensator comprises a spring allowing movement of the axis of rotation of the given one of the idler wheels relative to the drive wheel.

27. The track system of claim 26, wherein the compliant material is more flexible than material of the housing.

28. The track system of claim 27, wherein a ratio of a modulus of elasticity of the compliant material over a modulus of elasticity of the material of the housing is no more than 0.3.

29. The track system of claim 27, wherein a ratio of a modulus of elasticity of the compliant material over a modulus of elasticity of the material of the housing is no more than 0.1.

30. The track system of claim 27, wherein the compliant material is softer than material of the housing.

31. The track system of claim 30, wherein a ratio of a hardness of the compliant material over a hardness of the material of the housing is no more than 0.5.

32. The track system of claim 30, wherein a ratio of a hardness of the compliant material over a hardness of the material of the housing is no more than 0.1.

33. The track system of claim 1, wherein the compliant material is elastomeric material.

34. The track system of claim 33, wherein the elastomeric material comprises rubber.

35. The track system of claim 1, wherein the compensator comprises a spring allowing the movement of the axis of rotation of the given one of the idler wheels relative to the axis of rotation of the drive wheel.

36. The track system of claim 1, wherein the alignment setting of ground engaging the suspension of the off-road vehicle is camber of the suspension of the off-road vehicle.

37. The track system of claim 36, wherein the camber of ground-engaging the suspension of the off-road vehicle is negative camber.

38. The track system of claim 1, wherein the movement of the axis of rotation of the given one of the idler wheels relative to the axis of rotation of the drive wheel includes a rotation of the axis of rotation of the given one of the idler wheels relative to the axis of rotation of the drive wheel about an axis generally parallel to a longitudinal direction of the track system.

39. A track system for traction of an off-road vehicle, the track system comprising:
a track comprising a ground-engaging outer surface for engaging the ground and an inner surface opposite to the ground-engaging outer surface; and
a track-engaging assembly around which the track is disposed, the track-engaging assembly comprising:
a drive wheel for driving the track;
a plurality of idler wheels spaced apart in a longitudinal direction of the track system; and
a resilient mount connected to a given one of the idler wheels, the resilient mount comprising compliant material receiving an axle and resiliently deformable to allow movement of an axis of rotation of the given one of the idler wheels relative to an axis of rotation of the drive wheel, the resilient mount being configured to allow the movement of the axis of rotation of the given one of the idler wheels relative to the axis of rotation of the drive wheel such that the axis of rotation of the given one of the idler wheels becomes transversal to the axis of rotation of the drive wheel.

40. The track system of claim 39, wherein the axle defines the axis of rotation of the given one of the idler wheels.

41. The track system of claim 39, wherein: the given one of the idler wheels is a first one of the idler wheels; the track-engaging assembly comprises a frame and a link that carries the first one of the idler wheels and a second one of the idler wheels and is pivotable relative to the frame; and the axle defines a pivot axis of the link relative to the frame.

42. The track system of claim 39, wherein the compliant material is elastomeric material.

43. The track system of claim 42, wherein the elastomeric material comprises rubber.

44. The track system of claim 39, wherein the axis of rotation of the given one of the idler wheels is omnidirectionally movable relative to the drive wheel.

45. The track system of claim 39, wherein the resilient mount is configured such that the axis of rotation of the given one of the idler wheels is movable relative to the drive wheel from a rest position in a plurality of directions of movement that are transversal to one another.

46. The track system of claim 45, wherein the directions of movement of the axis of rotation of the given one of the idler wheels include at least three directions of movement that are transversal to one another.

47. The track system of claim 45, wherein the directions of movement of the axis of rotation of the given one of the idler wheels include at least five directions of movement that are transversal to one another.

48. The track system of claim 45, wherein the directions of movement of the axis of rotation of the given one of the idler wheels include at least ten directions of movement that are transversal to one another.

49. The track system of claim 45, wherein a ratio of (i) a distance by which the axis of rotation of the given one of the idler wheels is moveable relative to the drive wheel in each of the directions of movement over (ii) a diameter of the given one of the idler wheels is at least 0.04.

50. The track system of claim 45, wherein a ratio of (i) a distance by which the axis of rotation of the given one of the idler wheels is moveable relative to the drive wheel in each of the directions of movement over (ii) a diameter of the given one of the idler wheels is at least 0.1.

51. The track system of claim 45, wherein a ratio of (i) a distance by which the axis of rotation of the given one of the idler wheels is moveable relative to the drive wheel in each of the directions of movement over (ii) a diameter of the given one of the idler wheels is at least 0.25.

52. The track system of claim 39, wherein the movement of the axis of rotation of the given one of the idler wheels relative to the axis of rotation of the drive wheel includes a rotation of the axis of rotation of the given one of the idler wheels relative to the axis of rotation of the drive wheel about an axis generally parallel to the longitudinal direction of the track system.

53. The track system of claim 39, wherein the resilient mount is configured to allow an angle between the axis of rotation of the given one of the idler wheels and the axis of rotation of the drive wheel of at least 2°.

54. The track system of claim 39, wherein the resilient mount is configured to allow an angle between the axis of rotation of the given one of the idler wheels and the axis of rotation of the drive wheel of at least 4°.

55. The track system of claim 39, wherein the resilient mount is configured to allow an angle between the axis of rotation of the given one of the idler wheels and the axis of rotation of the drive wheel of at least 8°.

* * * * *

UNITED STATES PATENT AND TRADEMARK OFFICE
CERTIFICATE OF CORRECTION

PATENT NO. : 10,266,215 B2
APPLICATION NO. : 14/987441
DATED : April 23, 2019
INVENTOR(S) : Bernard Jean, Jeremie Zuchoski and Tommy Leduc It is certified that error appears in the above-identified patent and that said Letters Patent is hereby corrected as shown below:

In the Claims

Column 32, Lines 25 to 28 – Claim 26:
Delete "wherein the compensator comprises a spring allowing movement of the axis of rotation of the given one of the idler wheels relative to the drive wheel."
And insert --wherein the resilient mount comprises a housing containing the compliant material--.

Column 32, Line 39 – Claim 30:
Delete "The track system of claim 27"
And insert --The track system of claim 26--.

Column 32, Lines 55-56 – Claim 36:
Delete "wherein the alignment setting of ground engaging the suspension"
And insert --wherein the alignment setting of the suspension--.

Column 32, Lines 58-59 – Claim 37:
Delete "wherein the camber of ground-engaging the suspension"
And insert --wherein the camber of the suspension--.

Signed and Sealed this
Twenty-sixth Day of May, 2020

Andrei Iancu
*Director of the United States Patent and Trademark Office*